(12) United States Patent
Jannard et al.

(10) Patent No.: US 10,120,646 B2
(45) Date of Patent: Nov. 6, 2018

(54) EYEWEAR WITH DETACHABLE ADJUSTABLE ELECTRONICS MODULE

(71) Applicant: Oakley, Inc., Foothill Ranch, CA (US)

(72) Inventors: James H. Jannard, Eastsound, WA (US); Carlos D. Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 3 days.

(21) Appl. No.: 15/483,197

(22) Filed: Apr. 10, 2017

(65) Prior Publication Data

US 2017/0251315 A1 Aug. 31, 2017

Related U.S. Application Data

(63) Continuation of application No. 14/281,696, filed on May 19, 2014, now Pat. No. 9,619,201, which is a
(Continued)

(51) Int. Cl.
*G02C 11/00* (2006.01)
*G06F 3/16* (2006.01)
(Continued)

(52) U.S. Cl.
CPC ............ *G06F 3/167* (2013.01); *G02B 27/01* (2013.01); *G02B 27/017* (2013.01); *G02C 9/04* (2013.01);
(Continued)

(58) Field of Classification Search
CPC ......... G06F 3/167; G06F 3/16; G02B 27/017; G02B 27/01; G02C 9/04; G02C 9/00;
(Continued)

(56) References Cited

U.S. PATENT DOCUMENTS 1,026,272 A  5/1912  Leveque
1,370,806 A  3/1921  Garner
(Continued)

FOREIGN PATENT DOCUMENTS

CA  2 307 869  4/2000
CH   660531    4/1987
(Continued)

OTHER PUBLICATIONS

Ajluni, Cheryl. "Wearable Wireless Redefines Computer Usage", Wireless Systems Design, pp. 14-16, Dec. 2002.
(Continued)

*Primary Examiner* — William R Alexander
(74) *Attorney, Agent, or Firm* — Sterne, Kessler, Goldstein & Fox P.L.L.C.

(57) ABSTRACT

A detachable adjustable electronics module may be removably or permanently connected to eyewear. The module may include electronics for processing audio and/or video input and/or output signals. The module may be provided with an adjustable arm, for adjustably carrying a speaker. The module and/or the speaker may be adjusted relative to the wearer in any of the anterior-posterior direction, the inferior-superior direction and laterally. Rotation adjustments may also be accomplished. Eyewear may be provided with only a single module, on a single side, or with two modules, one on each side, such as to provide stereo audio or dual mono sound.

17 Claims, 53 Drawing Sheets

Related U.S. Application Data continuation of application No. 13/196,835, filed on Aug. 2, 2011, which is a continuation-in-part of application No. 12/730,106, filed on Mar. 23, 2010, now Pat. No. 7,988,283, which is a continuation of application No. 12/331,327, filed on Dec. 9, 2008, now Pat. No. 7,692,018, which is a continuation of application No. 11/352,938, filed on Feb. 13, 2006, now Pat. No. 7,461,936.

(60) Provisional application No. 60/652,272, filed on Feb. 11, 2005, provisional application No. 60/652,937, filed on Feb. 14, 2005, provisional application No. 60/729,645, filed on Oct. 24, 2005.

(51) Int. Cl.

| | | |
|---|---|---|
| *G02C 9/04* | (2006.01) | |
| *H04M 1/60* | (2006.01) | |
| *G02B 27/01* | (2006.01) | |
| *G02C 11/06* | (2006.01) | |
| *H04R 1/10* | (2006.01) | |

(52) U.S. Cl.
CPC ............... *G02C 11/10* (2013.01); *G06F 3/16* (2013.01); *H04M 1/6066* (2013.01); *H04R 1/1066* (2013.01); *G02B 2027/0156* (2013.01); *G02B 2027/0178* (2013.01); *G02C 11/00* (2013.01); *G02C 11/06* (2013.01); *H04R 1/1016* (2013.01); *H04R 2201/023* (2013.01)

(58) Field of Classification Search
CPC ...... G02C 11/10; G02C 11/00; H04M 1/6066; H04R 1/1066
USPC .......................................................... 351/158
See application file for complete search history.

(56) References Cited

U.S. PATENT DOCUMENTS

| | | |
|---|---|---|
| 2,237,567 A | 4/1941 | Land |
| D130,310 S | 11/1941 | Monjar |
| 2,424,935 A | 7/1947 | Kimmel |
| 2,482,195 A | 9/1949 | Martin |
| 2,504,524 A | 4/1950 | Hayward |
| 2,688,900 A | 9/1954 | Silverman |
| 2,856,466 A | 10/1958 | Gustafson et al. |
| 2,882,348 A | 4/1959 | Erickson |
| 2,915,598 A | 12/1959 | Brunton |
| 2,947,822 A | 8/1960 | Matsuura |
| 2,999,136 A | 9/1961 | Holt et al. |
| 3,104,290 A | 9/1963 | Rosemond et al. |
| 3,119,903 A | 1/1964 | Rosemond et al. |
| D201,050 S | 5/1965 | Gieseking et al. |
| 3,247,330 A | 4/1966 | Hinman |
| D207,919 S | 6/1967 | Lui Fai |
| 3,327,836 A | 6/1967 | Burt |
| 3,371,979 A | 3/1968 | Catanzaro |
| D212,863 S | 12/1968 | Roberts |
| 3,495,898 A | 2/1970 | Del Vecchio |
| 3,536,385 A | 10/1970 | Johnston |
| 3,588,384 A | 6/1971 | Negley |
| 3,665,122 A | 5/1972 | Weiss |
| D228,677 S | 10/1973 | Wichers |
| 3,769,663 A | 11/1973 | Pearl |
| D229,974 S | 1/1974 | Wichers et al. |
| 3,809,829 A | 5/1974 | Viginni et al. |
| 3,853,393 A | 12/1974 | Fila et al. |
| 3,883,701 A | 5/1975 | Delorenzo |
| 3,943,925 A | 3/1976 | Leight |
| 3,957,184 A | 5/1976 | Shurman |
| 4,006,974 A | 2/1977 | Resnick |
| 4,149,780 A | 4/1979 | Young |
| 4,247,178 A | 1/1981 | Cook |
| 4,283,127 A | 8/1981 | Rosenwinkel et al. |
| 4,294,792 A | 10/1981 | Arons et al. |
| 4,516,157 A | 5/1985 | Campbell |
| 4,537,612 A | 8/1985 | Borrelli et al. |
| 4,550,984 A | 11/1985 | Reymond |
| 4,584,721 A | 4/1986 | Yamamoto |
| 4,600,077 A | 7/1986 | Drever |
| D287,021 S | 12/1986 | Johnson |
| 4,636,048 A | 1/1987 | Jones |
| 4,683,587 A | 7/1987 | Silverman |
| D292,986 S | 12/1987 | Magestro |
| 4,712,244 A | 12/1987 | Zwicker |
| 4,773,095 A | 9/1988 | Zwicker |
| 4,803,487 A | 2/1989 | Willard et al. |
| 4,806,008 A | 2/1989 | Tarloff |
| 4,806,011 A | 2/1989 | Bettinger |
| 4,856,086 A | 8/1989 | McCullough |
| 4,869,575 A | 9/1989 | Kubik |
| 4,877,320 A | 10/1989 | Holden |
| 4,882,769 A | 11/1989 | Gallimore |
| 4,901,355 A | 2/1990 | Moore |
| 4,902,120 A | 2/1990 | Weyer |
| 4,904,078 A | 2/1990 | Gorike |
| 4,942,629 A | 7/1990 | Stadlmann |
| 4,943,152 A | 7/1990 | Whelen |
| 5,020,150 A | 5/1991 | Shannon |
| 5,029,216 A | 7/1991 | Jhabvala |
| 5,050,150 A | 9/1991 | Ikeda |
| D325,590 S | 4/1992 | Galy |
| 5,123,726 A | 6/1992 | Webster |
| 5,137,342 A | 8/1992 | Jannard |
| 5,159,639 A | 10/1992 | Shannon et al. |
| 5,185,620 A | 2/1993 | Cooper |
| 5,249,001 A | 9/1993 | Jannard |
| 5,260,997 A | 11/1993 | Gattey |
| 5,281,957 A | 1/1994 | Schoolman |
| 5,321,443 A | 6/1994 | Huber et al. |
| 5,327,178 A | 7/1994 | McManigal |
| 5,335,285 A | 8/1994 | Gluz |
| 5,353,378 A | 10/1994 | Hoffman et al. |
| 5,367,345 A | 11/1994 | da Silva |
| 5,369,415 A | 11/1994 | Richard et al. |
| 5,381,114 A | 1/1995 | Pena-Finol et al. |
| 5,404,385 A | 4/1995 | Ben-Haim |
| 5,406,340 A | 4/1995 | Hoff |
| 5,452,480 A | 9/1995 | Ryden |
| RE35,051 E | 10/1995 | Moore |
| 5,459,533 A | 10/1995 | McCooeye et al. |
| 5,467,104 A | 11/1995 | Furness, III et al. |
| 5,481,763 A | 1/1996 | Brostrom et al. |
| 5,483,303 A | 1/1996 | Hirschman |
| 5,483,691 A | 1/1996 | Heck et al. |
| 5,533,130 A | 7/1996 | Staton |
| 5,557,444 A | 9/1996 | Melville et al. |
| 5,563,951 A | 10/1996 | Wang et al. |
| 5,579,400 A | 11/1996 | Ballein |
| 5,581,492 A | 12/1996 | Janik |
| 5,583,584 A | 12/1996 | Friedman |
| 5,585,871 A | 12/1996 | Linden |
| 5,590,417 A | 12/1996 | Rydbeck |
| 5,596,339 A | 1/1997 | Furness, III et al. |
| 5,606,743 A | 2/1997 | Vogt et al. |
| 5,608,808 A | 3/1997 | da Silva |
| 5,613,222 A | 3/1997 | Guenther |
| 5,617,477 A | 4/1997 | Boyden |
| 5,634,201 A | 5/1997 | Mooring |
| 5,654,786 A | 8/1997 | Bylander |
| 5,658,502 A | 8/1997 | Hughes |
| 5,668,867 A | 9/1997 | Nagai |
| 5,671,035 A | 9/1997 | Barnes |
| 5,671,037 A | 9/1997 | Ogasawara et al. |
| 5,680,465 A | 10/1997 | Boyden |
| 5,682,434 A | 10/1997 | Boyden |
| 5,694,475 A | 12/1997 | Boyden |
| 5,703,670 A | 12/1997 | Callard |
| 5,708,724 A | 1/1998 | Burris et al. |
| 5,715,323 A | 2/1998 | Walker |
| 5,715,337 A | 2/1998 | Spitzer |
| 5,717,479 A | 2/1998 | Rickards |

(56) References Cited

U.S. PATENT DOCUMENTS

| | | |
|---|---|---|
| 5,721,783 A | 2/1998 | Anderson |
| D392,990 S | 3/1998 | Hall et al. |
| 5,737,436 A | 4/1998 | Boyden |
| 5,757,929 A | 5/1998 | Wang et al. |
| 5,760,868 A | 6/1998 | Jannard et al. |
| 5,777,715 A | 7/1998 | Kruegle et al. |
| 5,781,272 A | 7/1998 | Bright et al. |
| 5,796,341 A | 8/1998 | Stratiotis |
| 5,805,261 A | 9/1998 | Houston et al. |
| 5,815,126 A | 9/1998 | Fan et al. |
| 5,835,185 A | 11/1998 | Kallman et al. |
| 5,853,005 A | 12/1998 | Scanlon |
| 5,867,572 A | 2/1999 | MacDonald et al. |
| 5,886,822 A | 3/1999 | Spitzer |
| 5,889,843 A | 3/1999 | Singer et al. |
| 5,892,564 A | 4/1999 | Rahn |
| 5,903,395 A | 5/1999 | Rallison et al. |
| 5,909,498 A | 6/1999 | Smith |
| 5,924,868 A | 7/1999 | Rod |
| 5,953,000 A | 9/1999 | Weirich |
| 5,953,434 A | 9/1999 | Boyden |
| 5,971,538 A | 10/1999 | Heffner |
| 5,973,728 A | 10/1999 | Levitan |
| 5,978,689 A | 11/1999 | Tuoriniemi et al. |
| 5,986,813 A | 11/1999 | Saikawa et al. |
| 5,988,812 A | 11/1999 | Wingate |
| 5,991,085 A | 11/1999 | Rallison et al. |
| 5,995,592 A | 11/1999 | Shirai et al. |
| D418,153 S | 12/1999 | Haney |
| 6,006,115 A | 12/1999 | Wingate |
| 6,007,035 A | 12/1999 | Feinbloom et al. |
| 6,010,216 A | 1/2000 | Jesiek |
| 6,012,812 A | 1/2000 | Rickards |
| 6,013,108 A | 1/2000 | Karolys et al. |
| 6,018,742 A | 1/2000 | Herbert, III |
| 6,023,241 A | 2/2000 | Clapper |
| 6,023,372 A | 2/2000 | Spitzer et al. |
| 6,030,342 A | 2/2000 | Amano et al. |
| 6,046,712 A * | 4/2000 | Beller .............. G02B 27/017 345/7 |
| 6,057,966 A | 5/2000 | Carroll et al. |
| D426,845 S | 6/2000 | Green et al. |
| 6,074,060 A | 6/2000 | Bruce |
| 6,084,555 A | 7/2000 | Mizoguchi et al. |
| 6,084,556 A | 7/2000 | Zwern |
| 6,091,546 A | 7/2000 | Spitzer |
| 6,091,812 A | 7/2000 | Iglehart et al. |
| 6,091,832 A | 7/2000 | Shurman et al. |
| D430,145 S | 8/2000 | Boyden et al. |
| 6,106,116 A | 8/2000 | Houston et al. |
| 6,108,197 A | 8/2000 | Janik |
| 6,110,110 A | 8/2000 | Dublin, Jr. et al. |
| 6,126,595 A | 10/2000 | Amano et al. |
| 6,142,623 A | 11/2000 | Jones |
| 6,149,272 A | 11/2000 | Bergner et al. |
| D435,058 S | 12/2000 | Green et al. |
| 6,157,533 A | 12/2000 | Sallam et al. |
| 6,169,543 B1 | 1/2001 | Wehmeyer |
| 6,176,576 B1 | 1/2001 | Green et al. |
| 6,181,956 B1 | 1/2001 | Koskan |
| 6,192,253 B1 | 2/2001 | Charlier et al. |
| 6,204,974 B1 | 3/2001 | Spitzer |
| 6,211,799 B1 | 4/2001 | Post et al. |
| 6,212,414 B1 | 4/2001 | Alameh et al. |
| 6,212,424 B1 | 4/2001 | Robinson |
| 6,218,958 B1 | 4/2001 | Eichstaedt et al. |
| D441,388 S | 5/2001 | Lightman |
| 6,225,897 B1 | 5/2001 | Doyle et al. |
| 6,230,327 B1 | 5/2001 | Briand et al. |
| 6,231,181 B1 | 5/2001 | Swab |
| 6,233,344 B1 | 5/2001 | Clegg et al. |
| 6,233,345 B1 | 5/2001 | Urwyler |
| 6,239,778 B1 | 5/2001 | Palffy-Muhoray et al. |
| 6,243,578 B1 | 6/2001 | Koike |
| 6,252,970 B1 | 6/2001 | Poon et al. |
| D445,416 S | 7/2001 | Glezerman |
| 6,272,359 B1 | 8/2001 | Kivela et al. |
| 6,280,838 B1 | 8/2001 | Bernards et al. |
| 6,285,757 B1 | 9/2001 | Carroll et al. |
| 6,292,213 B1 | 9/2001 | Jones |
| 6,301,050 B1 | 10/2001 | DeLeon |
| 6,301,367 B1 | 10/2001 | Boyden et al. |
| 6,301,593 B1 | 10/2001 | Toyosato |
| 6,307,526 B1 | 10/2001 | Mann |
| 6,311,155 B1 | 10/2001 | Vaudrey et al. |
| 6,312,811 B1 | 11/2001 | Frigoli et al. |
| 6,314,091 B1 | 11/2001 | LaRowe, Jr. et al. |
| 6,325,507 B1 | 12/2001 | Jannard et al. |
| 6,325,513 B1 | 12/2001 | Bergner et al. |
| 6,344,727 B1 | 2/2002 | Desai et al. |
| 6,347,095 B1 | 2/2002 | Tang et al. |
| 6,349,001 B1 | 2/2002 | Spitzer |
| 6,350,129 B1 | 2/2002 | Gorlick |
| 6,351,468 B1 | 2/2002 | LaRowe, Jr. et al. |
| 6,353,422 B1 | 3/2002 | Perlman |
| 6,353,503 B1 | 3/2002 | Spitzer et al. |
| 6,356,392 B1 | 3/2002 | Spitzer |
| 6,374,177 B1 | 4/2002 | Lee et al. |
| 6,381,484 B1 | 4/2002 | Ayanruoh |
| 6,384,982 B1 | 5/2002 | Spitzer |
| 6,392,798 B1 | 5/2002 | Newkirk |
| 6,409,338 B1 | 6/2002 | Jewell |
| 6,417,969 B1 | 7/2002 | DeLuca et al. |
| 6,421,031 B1 | 7/2002 | Ronzani et al. |
| 6,424,820 B1 | 7/2002 | Burdick et al. |
| 6,431,705 B1 | 8/2002 | Linden |
| 6,442,018 B1 | 8/2002 | Dinkin |
| D462,708 S | 9/2002 | Miller et al. |
| D462,946 S | 9/2002 | Beraut et al. |
| 6,445,805 B1 | 9/2002 | Grugel |
| 6,452,572 B1 | 9/2002 | Fan et al. |
| 6,452,699 B1 | 9/2002 | Athale et al. |
| 6,456,721 B1 | 9/2002 | Fukuda |
| 6,474,816 B2 | 11/2002 | Butler |
| 6,476,815 B1 | 11/2002 | Ando |
| 6,483,483 B2 | 11/2002 | Kosugi et al. |
| 6,490,362 B1 | 12/2002 | Clegg et al. |
| 6,493,136 B2 | 12/2002 | Chang et al. |
| 6,510,325 B1 | 1/2003 | Mack, II et al. |
| 6,517,203 B1 | 2/2003 | Blum et al. |
| 6,519,475 B1 | 2/2003 | Kim |
| 6,523,006 B1 | 2/2003 | Ellis et al. |
| 6,529,804 B1 | 3/2003 | Draggon et al. |
| 6,538,799 B2 | 3/2003 | Spitzer |
| 6,540,347 B1 | 4/2003 | Radziwon et al. |
| 6,542,081 B2 | 4/2003 | Torch |
| 6,546,101 B1 | 4/2003 | Murray et al. |
| 6,549,122 B2 | 4/2003 | Depta |
| 6,554,763 B1 | 4/2003 | Amano et al. |
| 6,560,029 B1 | 5/2003 | Dobbie et al. |
| 6,560,449 B1 | 5/2003 | Liu |
| 6,564,047 B1 | 5/2003 | Steele et al. |
| 6,567,651 B2 | 5/2003 | Whitley |
| 6,580,405 B1 | 6/2003 | Yamazaki et al. |
| 6,582,075 B1 | 6/2003 | Swab et al. |
| 6,614,407 B2 | 9/2003 | Perlman |
| 6,618,099 B1 | 9/2003 | Spitzer |
| 6,629,076 B1 | 9/2003 | Haken |
| 6,639,706 B2 | 10/2003 | Ziv et al. |
| 6,650,894 B1 | 11/2003 | Berstis et al. |
| 6,657,673 B2 | 12/2003 | Ishikawa |
| 6,687,486 B2 | 2/2004 | Grzeczkowski |
| 6,690,807 B1 | 2/2004 | Meyer |
| 6,691,028 B2 | 2/2004 | Bullock et al. |
| 6,717,533 B2 | 4/2004 | Seaberg et al. |
| 6,724,354 B1 | 4/2004 | Spitzer et al. |
| 6,725,022 B1 | 4/2004 | Clayton et al. |
| 6,728,531 B1 | 4/2004 | Lee et al. |
| 6,729,726 B2 | 5/2004 | Miller et al. |
| 6,731,908 B2 | 5/2004 | Berliner et al. |
| 6,733,130 B2 | 5/2004 | Blum et al. |
| 6,735,435 B2 | 5/2004 | Newell et al. |
| 6,736,759 B1 | 5/2004 | Stubbs et al. |
| 6,739,873 B1 | 5/2004 | Rod et al. |

(56) References Cited

U.S. PATENT DOCUMENTS

| | | |
|---|---|---|
| 6,763,119 B2 | 7/2004 | Lee |
| 6,766,182 B2 | 7/2004 | Janninck et al. |
| 6,769,767 B2 | 8/2004 | Swab et al. |
| 6,783,501 B2 | 8/2004 | Takahashi et al. |
| 6,816,314 B2 | 11/2004 | Shimizu et al. |
| 6,834,192 B1 | 12/2004 | Watanabe et al. |
| 6,834,509 B2 | 12/2004 | Palfy et al. |
| 6,851,805 B2 | 2/2005 | Blum et al. |
| 6,871,951 B2 | 3/2005 | Blum et al. |
| 6,873,862 B2 | 3/2005 | Reshefsky |
| 6,879,443 B2 | 4/2005 | Spitzer |
| 6,885,848 B2 | 4/2005 | Lee |
| 6,911,172 B2 | 6/2005 | Swab et al. |
| 6,912,386 B1 | 6/2005 | Himberg et al. |
| 6,920,283 B2 | 7/2005 | Goldstein |
| 6,929,365 B2 | 8/2005 | Swab et al. |
| 6,937,400 B2 | 8/2005 | Olsson |
| 6,937,803 B2 | 8/2005 | Bruegl |
| 6,941,248 B2 | 9/2005 | Friedrich et al. |
| 6,947,014 B2 | 9/2005 | Wooten |
| 6,950,531 B2 | 9/2005 | Rickards |
| 6,957,890 B2 | 10/2005 | Shapiro |
| 6,966,647 B2 | 11/2005 | Jannard et al. |
| 6,975,667 B2 | 12/2005 | Mattisson et al. |
| 6,978,162 B2 | 12/2005 | Russell et al. |
| 6,990,082 B1 | 1/2006 | Zehavi et al. |
| 7,004,582 B2 | 2/2006 | Jannard et al. |
| 7,013,009 B2 | 3/2006 | Warren |
| 7,023,621 B2 | 4/2006 | Dietrich |
| 7,031,483 B2 | 4/2006 | Boone et al. |
| 7,031,667 B2 | 4/2006 | Horiguchi |
| 7,044,615 B2 | 5/2006 | Gesten |
| 7,062,796 B1 | 6/2006 | Dixon |
| 7,084,736 B2 | 8/2006 | Ritter |
| 7,093,742 B2 | 8/2006 | Steven, III et al. |
| 7,097,300 B2 | 8/2006 | Himmele |
| 7,099,464 B2 | 8/2006 | Lucey et al. |
| 7,106,676 B2 | 9/2006 | Matos |
| 7,116,976 B2 | 10/2006 | Thomas et al. |
| 7,124,425 B1 | 10/2006 | Anderson |
| 7,133,532 B2 | 11/2006 | Rickards |
| 7,147,324 B2 | 12/2006 | Jannard et al. |
| 7,149,475 B2 | 12/2006 | Kawamura |
| 7,150,526 B2 | 12/2006 | Jannard et al. |
| 7,158,096 B1 | 1/2007 | Spitzer |
| 7,158,499 B2 | 1/2007 | Anderson et al. |
| 7,162,281 B2 | 1/2007 | Kim |
| 7,168,804 B2 | 1/2007 | Velazquez |
| 7,170,057 B2 | 1/2007 | Filipovich et al. |
| 7,185,983 B2 | 3/2007 | Nelson et al. |
| 7,187,948 B2 | 3/2007 | Alden |
| 7,187,960 B2 | 3/2007 | Abreu |
| 7,192,136 B2 | 3/2007 | Howell et al. |
| 7,192,137 B2 | 3/2007 | Ishibashi et al. |
| 7,195,353 B2 | 3/2007 | Blum et al. |
| 7,211,778 B1 | 5/2007 | Smith et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,242,527 B2 | 7/2007 | Spitzer |
| 7,245,273 B2 | 7/2007 | Eberl et al. |
| 7,249,846 B2 | 7/2007 | Grand et al. |
| 7,253,791 B2 | 8/2007 | Kahan et al. |
| 7,255,437 B2 | 8/2007 | Howell et al. |
| 7,261,409 B1 | 8/2007 | Taber |
| 7,264,350 B2 | 9/2007 | Jannard et al. |
| 7,278,734 B2 | 10/2007 | Jannard et al. |
| 7,289,640 B2 | 10/2007 | Tsai et al. |
| 7,289,767 B2 | 10/2007 | Lai |
| 7,292,703 B2 | 11/2007 | Kaulfuss et al. |
| 7,308,231 B2 | 12/2007 | Tung |
| 7,312,699 B2 | 12/2007 | Chornenky |
| 7,313,246 B2 | 12/2007 | Miller et al. |
| 7,321,785 B2 | 1/2008 | Harris |
| 7,331,666 B2 | 2/2008 | Swab et al. |
| 7,376,434 B2 | 5/2008 | Thomas et al. |
| 7,380,936 B2 | 6/2008 | Howell et al. |
| 7,381,952 B2 | 6/2008 | Teich et al. |
| 7,395,090 B2 | 7/2008 | Alden |
| 7,401,918 B2 | 7/2008 | Howell et al. |
| 7,409,234 B2 | 8/2008 | Glezerman |
| 7,410,254 B2 | 8/2008 | Goodis |
| 7,436,568 B1 | 10/2008 | Kuykendall, Jr. |
| 7,438,409 B2 | 10/2008 | Jordan |
| 7,438,410 B1 | 10/2008 | Howell et al. |
| 7,445,332 B2 | 11/2008 | Jannard et al. |
| 7,451,056 B2 | 11/2008 | Flentov et al. |
| 7,452,073 B2 | 11/2008 | Jannard et al. |
| 7,461,936 B2 | 12/2008 | Jannard |
| 7,467,866 B2 | 12/2008 | Chao |
| 7,481,531 B2 | 1/2009 | Howell et al. |
| 7,484,847 B2 | 2/2009 | Fuziak, Jr. |
| 7,488,294 B2 | 2/2009 | Torch |
| 7,490,936 B2 | 2/2009 | Blum et al. |
| 7,494,216 B2 | 2/2009 | Jannard et al. |
| 7,496,293 B2 | 2/2009 | Shamir et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,520,614 B2 | 4/2009 | Joos et al. |
| 7,527,375 B2 | 5/2009 | Blum et al. |
| 7,530,688 B2 | 5/2009 | Grogan et al. |
| 7,543,934 B2 | 6/2009 | Howell et al. |
| 7,547,101 B2 | 6/2009 | Fuziak |
| 7,576,800 B2 | 8/2009 | Swain |
| 7,576,919 B2 | 8/2009 | Durner et al. |
| 7,581,833 B2 | 9/2009 | Howell et al. |
| 7,617,071 B2 | 11/2009 | Darley et al. |
| 7,621,634 B2 | 11/2009 | Howell et al. |
| 7,631,968 B1 | 12/2009 | Dobson et al. |
| 7,639,209 B2 | 12/2009 | Sprague et al. |
| 7,647,400 B2 | 1/2010 | Abbott et al. |
| 7,648,236 B1 | 1/2010 | Dobson |
| D610,184 S | 2/2010 | Pearson et al. |
| 7,665,845 B2 | 2/2010 | Kiderman et al. |
| 7,675,683 B2 | 3/2010 | Dobson |
| 7,677,722 B1 | 3/2010 | Mednick et al. |
| 7,677,723 B2 | 3/2010 | Howell et al. |
| 7,682,018 B2 | 3/2010 | Jannard |
| 7,724,210 B2 | 5/2010 | Sprague et al. |
| 7,729,688 B2 | 6/2010 | Cheung et al. |
| 7,740,353 B2 | 6/2010 | Jannard |
| 7,744,213 B2 | 6/2010 | Jannard et al. |
| 7,753,523 B2 | 7/2010 | Kiderman et al. |
| 7,758,185 B2 | 7/2010 | Lewis |
| 7,760,898 B2 | 7/2010 | Howell et al. |
| 7,771,046 B2 | 8/2010 | Howell et al. |
| 7,784,935 B2 | 8/2010 | Jackson et al. |
| 7,786,424 B2 | 8/2010 | Durner et al. |
| 7,792,552 B2 | 9/2010 | Thomas et al. |
| 7,798,638 B2 | 9/2010 | Fuziak, Jr. |
| 7,806,525 B2 | 10/2010 | Howell et al. |
| 7,810,750 B2 | 10/2010 | Abreu |
| 7,843,403 B2 | 11/2010 | Spitzer |
| 7,856,173 B2 | 12/2010 | Chujo et al. |
| 7,866,818 B2 | 1/2011 | Schroeder et al. |
| 7,869,128 B2 | 1/2011 | Yamaguchi et al. |
| 7,874,669 B2 | 1/2011 | Moritz et al. |
| 7,890,128 B1 | 2/2011 | Thomas et al. |
| 7,893,965 B2 | 2/2011 | Heim et al. |
| 7,900,068 B2 | 3/2011 | Spitzer |
| 7,918,556 B2 | 4/2011 | Lewis |
| 7,922,321 B2 | 4/2011 | Howell et al. |
| 7,931,367 B2 | 4/2011 | Jackson et al. |
| 7,931,373 B2 | 4/2011 | Hillis et al. |
| 7,959,287 B1 | 6/2011 | Saffra |
| 7,967,433 B2 | 6/2011 | Jannard et al. |
| 7,967,435 B1 | 6/2011 | Seeto |
| 7,971,994 B2 | 7/2011 | Blum et al. |
| 7,988,283 B2 | 8/2011 | Jannard |
| 7,997,723 B2 | 8/2011 | Pienimaa et al. |
| 8,010,156 B2 | 8/2011 | Warren |
| D645,492 S | 9/2011 | Zhao |

(56) References Cited

U.S. PATENT DOCUMENTS

| | | |
|---|---|---|
| D645,493 S | 9/2011 | Zhao |
| 8,020,989 B2 | 9/2011 | Jannard et al. |
| 8,025,398 B2 | 9/2011 | Jannard |
| D646,316 S | 10/2011 | Zhao |
| 8,068,169 B2 | 11/2011 | Chang |
| 8,086,287 B2 | 12/2011 | Mooney et al. |
| 8,104,892 B2 | 1/2012 | Hillis et al. |
| 8,109,629 B2 | 2/2012 | Howell et al. |
| 8,112,104 B1 | 2/2012 | Thomas et al. |
| 8,123,351 B2 | 2/2012 | Moritz et al. |
| 8,128,606 B2 | 3/2012 | Anderson et al. |
| 8,136,170 B2 | 3/2012 | DiPaola |
| 8,188,880 B1 | 5/2012 | Chi et al. |
| 8,204,435 B2 | 6/2012 | Seshadri et al. |
| 8,212,855 B2 | 7/2012 | Gupta et al. |
| 8,243,973 B2 | 8/2012 | Rickards et al. |
| 8,259,159 B2 | 9/2012 | Hu |
| 8,269,159 B2 | 9/2012 | Filipovich et al. |
| 8,280,419 B1 | 10/2012 | Thomas et al. |
| 8,289,231 B2 | 10/2012 | Budd et al. |
| 8,310,555 B2 | 11/2012 | Ludlow |
| 8,313,192 B2 | 11/2012 | Jannard |
| 8,325,263 B2 | 12/2012 | Kato et al. |
| 8,333,475 B2 | 12/2012 | Sugio et al. |
| 8,337,013 B2 | 12/2012 | Howell et al. |
| 8,337,014 B2 | 12/2012 | Kokonaski et al. |
| D674,834 S | 1/2013 | Esson |
| 8,353,594 B2 | 1/2013 | Lewis |
| 8,378,924 B2 | 2/2013 | Jacobsen et al. |
| 8,414,131 B2 | 4/2013 | Tanaka |
| 8,430,507 B2 | 4/2013 | Howell et al. |
| 8,430,510 B2 | 4/2013 | Sugio et al. |
| 8,431,881 B2 | 4/2013 | Filipovich et al. |
| 8,434,863 B2 | 5/2013 | Howell et al. |
| 8,434,868 B2 | 5/2013 | Sato et al. |
| 8,446,676 B2 | 5/2013 | Sugihara et al. |
| 8,449,116 B2 | 5/2013 | Sato et al. |
| 8,465,151 B2 | 6/2013 | Howell et al. |
| 8,473,004 B2 | 6/2013 | Warren |
| 8,482,488 B2 | 7/2013 | Jannard |
| 8,500,271 B2 | 8/2013 | Howell et al. |
| 8,503,703 B2 | 8/2013 | Eaton et al. |
| 8,523,352 B2 | 9/2013 | Jannard et al. |
| 8,550,621 B2 | 10/2013 | Jannard |
| 8,550,649 B2 | 10/2013 | Nelson et al. |
| 8,553,910 B1 | 10/2013 | Dong et al. |
| 8,566,962 B2 | 10/2013 | Cornelius |
| 8,622,885 B2 | 1/2014 | Mersky |
| 8,721,562 B2 | 5/2014 | Abreu |
| 8,737,978 B1 | 5/2014 | Thomas et al. |
| 8,744,113 B1 | 6/2014 | Rickards |
| 8,744,407 B2 | 6/2014 | Cheung et al. |
| 8,758,021 B2 | 6/2014 | Takahashi |
| 8,770,742 B2 | 7/2014 | Howell et al. |
| 8,787,970 B2 | 7/2014 | Warren |
| 8,801,174 B2 | 8/2014 | Willey |
| 8,854,429 B2 | 10/2014 | Seo et al. |
| 8,855,719 B2 | 10/2014 | Jacobsen et al. |
| 8,876,285 B2 | 11/2014 | Jannard |
| 8,878,914 B2 | 11/2014 | Mashitani et al. |
| 8,891,817 B2 | 11/2014 | Wexler et al. |
| 8,902,303 B2 | 12/2014 | Na'aman et al. |
| 8,905,542 B2 | 12/2014 | Howell et al. |
| 8,920,013 B2 | 12/2014 | Nakamura |
| 8,928,752 B2 | 1/2015 | DeKeyser |
| 9,016,857 B2 | 4/2015 | Benko et al. |
| 9,028,062 B2 | 5/2015 | Kokonaski et al. |
| 9,028,123 B2 | 5/2015 | Nichol et al. |
| 9,451,068 B2 | 9/2016 | Warren |
| 9,494,807 B2 | 11/2016 | Jannard |
| 2001/0009410 A1 | 7/2001 | Fujita |
| 2001/0038491 A1 | 11/2001 | Fergason |
| 2001/0045978 A1 * | 11/2001 | McConnell ............ A63F 13/00 348/42 |
| 2002/0197961 A1 | 3/2002 | Warren |
| 2002/0039063 A1 | 4/2002 | Ritter |
| 2002/0039170 A1 | 4/2002 | Jannard et al. |
| 2002/0044152 A1 | 4/2002 | Abbott, III et al. |
| 2002/0085175 A1 | 7/2002 | Butler |
| 2002/0085843 A1 | 7/2002 | Mann |
| 2002/0087330 A1 | 7/2002 | Lee et al. |
| 2002/0093466 A1 | 7/2002 | Ben-Arie |
| 2002/0098877 A1 | 7/2002 | Glezerman |
| 2002/0098878 A1 | 7/2002 | Mooney et al. |
| 2002/0111197 A1 | 8/2002 | Fitzgerald |
| 2002/0118825 A1 | 8/2002 | Mitra |
| 2002/0143912 A1 | 10/2002 | Michels |
| 2002/0159023 A1 | 10/2002 | Swab et al. |
| 2002/0169539 A1 | 11/2002 | Menard et al. |
| 2002/0170147 A1 | 11/2002 | Heller |
| 2002/0176330 A1 | 11/2002 | Ramonowski et al. |
| 2002/0186180 A1 | 12/2002 | Duda |
| 2003/0003969 A1 | 1/2003 | Tong et al. |
| 2003/0018274 A1 | 1/2003 | Takahashi et al. |
| 2003/0022690 A1 | 1/2003 | Beyda et al. |
| 2003/0026586 A1 | 2/2003 | Bruegl et al. |
| 2003/0036360 A1 | 2/2003 | Russell et al. |
| 2003/0058406 A1 | 3/2003 | Blum et al. |
| 2003/0067585 A1 | 4/2003 | Miller et al. |
| 2003/0068057 A1 | 4/2003 | Miller et al. |
| 2003/0073460 A1 | 4/2003 | van Pelt et al. |
| 2003/0090439 A1 | 5/2003 | Spitzer |
| 2003/0156725 A1 | 8/2003 | Boone et al. |
| 2003/0162510 A1 | 8/2003 | Kim |
| 2004/0000733 A1 | 1/2004 | Swab et al. |
| 2004/0015403 A1 | 1/2004 | Moskowitz et al. |
| 2004/0029582 A1 | 2/2004 | Swab et al. |
| 2004/0044418 A1 | 3/2004 | Goldstein |
| 2004/0044427 A1 | 3/2004 | Neuhaus |
| 2004/0048569 A1 | 3/2004 | Kawamura |
| 2004/0072134 A1 | 4/2004 | Takahashi |
| 2004/0120035 A1 | 6/2004 | Hoffmann |
| 2004/0128399 A1 | 7/2004 | Kurrasch |
| 2004/0128737 A1 | 7/2004 | Gesten |
| 2004/0132509 A1 | 7/2004 | Glezerman |
| 2004/0136293 A1 | 7/2004 | Matos |
| 2004/0156012 A1 | 8/2004 | Jannard et al. |
| 2004/0157649 A1 | 8/2004 | Jannard et al. |
| 2004/0160571 A1 | 8/2004 | Jannard et al. |
| 2004/0160572 A1 | 8/2004 | Jannard et al. |
| 2004/0160573 A1 | 8/2004 | Jannard et al. |
| 2004/0212776 A1 | 10/2004 | Spitzer et al. |
| 2004/0239874 A1 | 12/2004 | Swab et al. |
| 2004/0240404 A1 | 12/2004 | Ibrahim et al. |
| 2005/0001981 A1 | 1/2005 | Anderson et al. |
| 2005/0040192 A1 | 2/2005 | Steven, III et al. |
| 2005/0041297 A1 | 2/2005 | He et al. |
| 2005/0046789 A1 | 3/2005 | Jannard et al. |
| 2005/0046790 A1 | 3/2005 | Jannard et al. |
| 2005/0052537 A1 | 3/2005 | Mizusawa |
| 2005/0128431 A1 | 6/2005 | Jannard et al. |
| 2005/0159182 A1 | 7/2005 | Lai |
| 2005/0174651 A1 | 8/2005 | Spitzer |
| 2005/0185815 A1 | 8/2005 | Rickards |
| 2005/0186993 A1 | 8/2005 | Yueh |
| 2005/0201585 A1 | 9/2005 | Jannard et al. |
| 2005/0202857 A1 | 9/2005 | Seshadri et al. |
| 2005/0208457 A1 | 9/2005 | Fink et al. |
| 2005/0208893 A1 | 9/2005 | Yueh |
| 2005/0219152 A1 | 10/2005 | Budd et al. |
| 2005/0225867 A1 | 10/2005 | Ishibashi et al. |
| 2005/0238194 A1 | 10/2005 | Chornenky |
| 2005/0239502 A1 | 10/2005 | Swab et al. |
| 2005/0248722 A1 | 11/2005 | Nelis |
| 2005/0264502 A1 | 12/2005 | Sprague et al. |
| 2005/0275714 A1 | 12/2005 | Ishikawa et al. |
| 2005/0283263 A1 | 12/2005 | Eaton et al. |
| 2006/0009154 A1 | 1/2006 | Tung |
| 2006/0018027 A1 * | 1/2006 | Yamasaki ............ G02B 27/017 359/631 |
| 2006/0023158 A1 | 2/2006 | Howell et al. |
| 2006/0028400 A1 | 2/2006 | Lapstun et al. |
| 2006/0030360 A1 | 2/2006 | Yeh |
| 2006/0034478 A1 | 2/2006 | Davenport |

(56) References Cited

U.S. PATENT DOCUMENTS

| | | |
|---|---|---|
| 2006/0046656 A1 | 3/2006 | Yang |
| 2006/0046736 A1 | 3/2006 | Pering |
| 2006/0072067 A1 | 4/2006 | Jannard et al. |
| 2006/0093178 A1 | 5/2006 | Chen |
| 2006/0109350 A1 | 5/2006 | Yeh |
| 2006/0132382 A1 | 6/2006 | Jannard |
| 2006/0146277 A1 | 7/2006 | Jannard et al. |
| 2006/0160573 A1 | 7/2006 | Montvay |
| 2006/0183427 A1 | 8/2006 | Warren |
| 2006/0187404 A1 | 8/2006 | Ifergan |
| 2006/0192306 A1 | 8/2006 | Giller |
| 2006/0197907 A1 | 9/2006 | Jannard et al. |
| 2006/0203183 A1 | 9/2006 | Jannard et al. |
| 2006/0203184 A1 | 9/2006 | Jannard et al. |
| 2007/0000033 A1 | 1/2007 | Dixon |
| 2007/0008484 A1 | 1/2007 | Jannard |
| 2007/0013863 A1 | 1/2007 | Zelazowski |
| 2007/0013864 A1 | 1/2007 | Dietz |
| 2007/0030442 A1 | 2/2007 | Howell et al. |
| 2007/0037520 A1 | 2/2007 | Warren |
| 2007/0046887 A1 | 3/2007 | Howell et al. |
| 2007/0064311 A1 | 3/2007 | Park |
| 2007/0081123 A1 | 4/2007 | Lewis |
| 2007/0081124 A1 | 4/2007 | Lewis |
| 2007/0081125 A1 | 4/2007 | Lewis |
| 2007/0201000 A1 | 8/2007 | Jackson et al. |
| 2007/0208531 A1 | 9/2007 | Darley et al. |
| 2007/0222940 A1 | 9/2007 | Cohen |
| 2007/0225550 A1 | 9/2007 | Gattani et al. |
| 2008/0013037 A1 | 1/2008 | Carollo |
| 2008/0055410 A1 | 3/2008 | DeKeyser |
| 2008/0058681 A1 | 3/2008 | Casali et al. |
| 2008/0089545 A1 | 4/2008 | Jannard et al. |
| 2008/0144854 A1 | 6/2008 | Abreu |
| 2008/0158506 A1 | 7/2008 | Fuziak |
| 2008/0165317 A1 | 7/2008 | Wilson |
| 2008/0169998 A1 | 7/2008 | Jacobsen et al. |
| 2008/0192114 A1 | 8/2008 | Pearson et al. |
| 2008/0198324 A1 | 8/2008 | Fuziak |
| 2008/0204589 A1 | 8/2008 | Chang |
| 2008/0239232 A1 | 10/2008 | Guerrero |
| 2008/0246694 A1 | 10/2008 | Fischer |
| 2008/0273084 A1 | 11/2008 | MacDougall et al. |
| 2008/0284974 A1 | 11/2008 | Siu |
| 2008/0309586 A1 | 12/2008 | Vitale |
| 2009/0015929 A1 | 1/2009 | DeJong et al. |
| 2009/0040361 A1 | 2/2009 | Heim et al. |
| 2009/0059381 A1 | 3/2009 | Jannard |
| 2009/0066910 A1 | 3/2009 | Jannard et al. |
| 2009/0073330 A1 | 3/2009 | Viala |
| 2009/0086159 A1 | 4/2009 | Jannard |
| 2009/0122253 A1 | 5/2009 | Clay |
| 2009/0128700 A1 | 5/2009 | Oshino et al. |
| 2009/0180194 A1 | 7/2009 | Yamaguchi et al. |
| 2009/0180195 A1 | 7/2009 | Cakmakci et al. |
| 2009/0190026 A1 | 7/2009 | Chen |
| 2009/0201460 A1 | 8/2009 | Blum et al. |
| 2009/0201466 A1 | 8/2009 | Knecht et al. |
| 2009/0213236 A1 | 8/2009 | Chiou et al. |
| 2009/0251661 A1 | 10/2009 | Fuziak, Jr. |
| 2009/0307828 A1 | 12/2009 | Ludlow |
| 2010/0002186 A1 | 1/2010 | Zelman |
| 2010/0026970 A1 | 2/2010 | Tanaka |
| 2010/0053591 A1 | 3/2010 | Gibson et al. |
| 2010/0110368 A1 | 5/2010 | Chaum |
| 2010/0111472 A1 | 5/2010 | DeJong |
| 2010/0118402 A1 | 5/2010 | Washisu |
| 2010/0128135 A1 | 5/2010 | Filipovich et al. |
| 2010/0177168 A1 | 7/2010 | Hu |
| 2010/0177201 A1 | 7/2010 | Filipovich et al. |
| 2010/0188489 A1 | 7/2010 | Mashitani et al. |
| 2010/0208121 A1 | 8/2010 | Kato et al. |
| 2010/0220282 A1 | 9/2010 | Moritz et al. |
| 2010/0238396 A1 | 9/2010 | Jannard |
| 2010/0245755 A1 | 9/2010 | Sugihara et al. |
| 2010/0253904 A1 | 10/2010 | Jannard |
| 2010/0265455 A1 | 10/2010 | Jannard et al. |
| 2010/0277563 A1 | 11/2010 | Gupta et al. |
| 2010/0309426 A1 | 12/2010 | Howell et al. |
| 2010/0309427 A1 | 12/2010 | Warren |
| 2011/0013283 A1 | 1/2011 | Sato |
| 2011/0043644 A1 | 2/2011 | Munger et al. |
| 2011/0050546 A1 | 3/2011 | Swartz, Jr. et al. |
| 2011/0080555 A1 | 4/2011 | Chow |
| 2011/0085135 A1 | 4/2011 | Bertolli |
| 2011/0102733 A1 | 5/2011 | Moritz et al. |
| 2011/0170065 A1 | 7/2011 | Sugio et al. |
| 2011/0170066 A1 | 7/2011 | Sugio et al. |
| 2011/0170067 A1 | 7/2011 | Sato et al. |
| 2011/0178784 A1 | 7/2011 | Sato et al. |
| 2011/0187640 A1 | 8/2011 | Jacobsen et al. |
| 2011/0193963 A1 | 8/2011 | Hess et al. |
| 2011/0255050 A1 | 10/2011 | Jannard et al. |
| 2011/0261166 A1 | 10/2011 | Olazaran |
| 2011/0261176 A1 | 10/2011 | Monaghan, Sr. et al. |
| 2011/0273906 A1 | 11/2011 | Nichol et al. |
| 2011/0310345 A1 | 12/2011 | Warren |
| 2012/0013843 A1 | 1/2012 | Jannard |
| 2012/0069448 A1 | 3/2012 | Sugihara et al. |
| 2012/0081658 A1 | 4/2012 | Sugihara et al. |
| 2012/0105740 A1 | 5/2012 | Jannard et al. |
| 2012/0169854 A1 | 7/2012 | Seo et al. |
| 2012/0169990 A1 | 7/2012 | Burnstein |
| 2012/0210489 A1 | 8/2012 | Abreu |
| 2012/0212414 A1 | 8/2012 | Ousterhout et al. |
| 2012/0220234 A1 | 8/2012 | Abreu |
| 2012/0224135 A1 | 9/2012 | Moritz |
| 2013/0072828 A1 | 3/2013 | Sweis et al. |
| 2013/0091623 A1 | 4/2013 | McCulloch et al. |
| 2013/0100410 A1 | 4/2013 | Liang |
| 2013/0100534 A1 | 4/2013 | Jannard |
| 2013/0128216 A1 | 5/2013 | Filutowski et al. |
| 2013/0212765 A1 | 8/2013 | Cornelius |
| 2013/0214998 A1 | 8/2013 | Andes et al. |
| 2013/0235331 A1 | 9/2013 | Heinrich et al. |
| 2013/0250232 A1 | 9/2013 | Belbey et al. |
| 2013/0250233 A1 | 9/2013 | Blum et al. |
| 2013/0281166 A1 | 10/2013 | Warren |
| 2013/0293448 A1 | 11/2013 | Jannard |
| 2014/0002629 A1 | 1/2014 | Ratcliff et al. |
| 2014/0027436 A1 | 1/2014 | Cornelius |
| 2014/0033409 A1 | 2/2014 | O'Malley et al. |
| 2014/0098424 A1 | 4/2014 | Jannard |
| 2014/0104566 A1 | 4/2014 | Kokonaski et al. |
| 2014/0160424 A1 | 6/2014 | Benko et al. |
| 2014/0168784 A1 | 6/2014 | Hiarki |
| 2014/0237709 A1 | 8/2014 | McCulloch et al. |
| 2014/0253868 A1 | 9/2014 | Jannard |
| 2014/0267645 A1 | 9/2014 | Wexler et al. |
| 2014/0267648 A1 | 9/2014 | Wexler et al. |
| 2014/0268016 A1 | 9/2014 | Chow et al. |
| 2014/0268017 A1 | 9/2014 | Sweis |
| 2014/0270244 A1 | 9/2014 | Fan |
| 2014/0270316 A1 | 9/2014 | Fan |
| 2014/0290054 A1 | 10/2014 | Etzkorn |
| 2014/0293215 A1 | 10/2014 | Blum et al. |
| 2014/0303687 A1 | 10/2014 | Wall et al. |
| 2014/0317836 A1 | 10/2014 | McCulloch et al. |
| 2014/0329519 A1 | 11/2014 | Warren |
| 2014/0374402 A1 | 12/2014 | Cornelius et al. |
| 2015/0053067 A1 | 2/2015 | Goldstein |
| 2015/0061837 A1 | 3/2015 | Honoré et al. |
| 2015/0062469 A1 | 3/2015 | Fleury |
| 2015/0116655 A1 | 4/2015 | Jannard |
| 2015/0177521 A1 | 6/2015 | Abdollahi et al. |
| 2016/0004103 A1 | 1/2016 | Reyes |
| 2016/0085092 A1 | 3/2016 | Calilung et al. |
| 2017/0090199 A1 | 3/2017 | Jannard |

FOREIGN PATENT DOCUMENTS

| | | |
|---|---|---|
| CN | 2108942 | 7/1992 |
| CN | 1234895 A | 11/1999 |
| CN | 2583696 Y | 10/2003 |

(56) References Cited

FOREIGN PATENT DOCUMENTS

| | | |
|---|---|---|
| CN | 1687817 A | 10/2005 |
| CN | 2735373 Y | 10/2005 |
| CN | 2760600 Y | 2/2006 |
| CN | 201097024 Y | 8/2008 |
| CN | 201637963 U | 11/2010 |
| CN | 202583631 U | 12/2012 |
| CN | 103207463 A | 7/2013 |
| CN | 203084359 U | 7/2013 |
| CN | 103263109 A | 8/2013 |
| CN | 103293712 A | 9/2013 |
| CN | 203204263 U | 9/2013 |
| CN | 203217195 U | 9/2013 |
| CN | 203217199 U | 9/2013 |
| CN | 203275813 U | 11/2013 |
| CN | 103957346 A | 7/2014 |
| DE | 831 747 C | 2/1952 |
| DE | 197 04 063 A1 | 2/1999 |
| DE | 299 01 673 U1 | 2/1999 |
| DE | 20 2004 004 378 | 8/2004 |
| DE | 20 2006 004 294 | 7/2006 |
| DE | 10 2005 054 317 | 5/2007 |
| EP | 0 840 465 | 5/1998 |
| EP | 1 544 665 | 6/2005 |
| EP | 2 169 444 | 3/2010 |
| ES | 2 299 399 | 5/2008 |
| FR | 929 851 | 1/1948 |
| FR | 1 160 007 | 7/1958 |
| FR | 1 444 945 | 10/1966 |
| FR | 2 157 260 | 6/1973 |
| FR | 2 642 856 | 8/1990 |
| FR | 2 789 499 | 8/2000 |
| FR | 2 820 936 | 8/2002 |
| GB | 497 375 | 12/1938 |
| GB | 723 981 | 2/1955 |
| GB | 2 362 474 A | 11/2001 |
| GB | 2 401 772 A | 11/2004 |
| IT | 00235504 | 4/2000 |
| JP | 42-022998 | 11/1942 |
| JP | 58-26282 | 2/1983 |
| JP | 58-113912 A | 7/1983 |
| JP | 58-113914 A | 7/1983 |
| JP | 62-005024 | 1/1987 |
| JP | 02-121661 A | 5/1990 |
| JP | 03-027014 A | 2/1991 |
| JP | 04-023579 A | 1/1992 |
| JP | 04-086642 A | 3/1992 |
| JP | 08-009483 A | 1/1996 |
| JP | 08-036143 | 2/1996 |
| JP | 10-513021 | 12/1998 |
| JP | 11-353444 | 12/1999 |
| JP | 2001-1 701 03 | 6/2001 |
| JP | 2001-522063 | 11/2001 |
| JP | 2002-085444 | 3/2002 |
| JP | 2002 252075 A | 9/2002 |
| JP | 2003-189398 | 7/2003 |
| JP | 2005-086522 A | 3/2005 |
| JP | 2007-148131 | 6/2007 |
| JP | 2008-545287 A | 12/2008 |
| JP | 2011-180414 A | 9/2011 |
| JP | 3171527 | 10/2011 |
| WO | WO 1996/23373 | 8/1996 |
| WO | WO 1997/25790 | 7/1997 |
| WO | WO 1997/33270 | 9/1997 |
| WO | WO 1999/23524 | 5/1999 |
| WO | WO 1999/050706 | 10/1999 |
| WO | WO 2000/65803 | 11/2000 |
| WO | WO 2000/70390 | 11/2000 |
| WO | WO 2000/070779 | 11/2000 |
| WO | WO 2000/79329 | 12/2000 |
| WO | WO 2000/79333 | 12/2000 |
| WO | WO 2001/06298 | 1/2001 |
| WO | WO 2001/95018 | 12/2001 |
| WO | WO 2002/065198 | 8/2002 |
| WO | WO 2003/067585 | 8/2003 |
| WO | WO 2003/071830 | 8/2003 |
| WO | WO 2004/012477 | 2/2004 |
| WO | WO 2005/050288 | 6/2005 |
| WO | WO 2006/055884 | 5/2006 |
| WO | WO 2006/086699 | 8/2006 |
| WO | WO 2006/120416 | 11/2006 |
| WO | WO 2007/068808 | 6/2007 |
| WO | WO 2008/076774 | 6/2008 |
| WO | WO 2008/082718 | 7/2008 |
| WO | WO 2010/098902 | 9/2010 |
| WO | WO 2013/019893 | 2/2013 |
| WO | WO 2013/027752 | 2/2013 |
| WO | WO 2013/059257 | 4/2013 |
| WO | WO 2013/078442 | 5/2013 |
| WO | WO 2013/123262 | 8/2013 |
| WO | WO 2013/123264 | 8/2013 |
| WO | WO 2013/188343 | 12/2013 |
| WO | WO 2014/070770 | 5/2014 |
| WO | WO 2014/149631 | 9/2014 |
| WO | WO 2014/201213 | 12/2014 |
| WO | WO 2015/048564 | 4/2015 |

OTHER PUBLICATIONS

Bluetooth Specification Version 1.1, Feb. 22, 2001, pp. 1-452.
Borriello, Gaetano: "Survey on Information Appliances", Computer Society, 2002. http://www.computer.org/cga/articles/infoappli.htm, Oct. 8, 2003.
Chinese Office Action and translation dated Apr. 24, 2009 received in corresponding CN Application No. 200680011187.9.
Complaint for Patent and Tradedress Infringement; U.S. District Court—Central District of California; Case No. SA-CV-07-1184 AHS (Anx); *Oakley, Inc.* v. *Audio Visual Allstar dba AVAsunglasses. com*; Filed Oct. 4, 2007; this lawsuit is settled and dismissed.
Complaint for Patent Infringement U.S. District—Central District of California; Case No. SACV 06-899 JVS (MLGx); *Oakley, Inc.* v. *Xonix Electronics Co., Ltd.*, filed Sep. 26, 2006; this lawsuit has been dismissed.
Complaint for Patent Infringement; U.S. District—Central District of California; Case No. 03-6284 (GAF)(FMOx); *QR Spex, Inc. and Thomas G. Swab* v. *Motorola, Inc. and Frog Design, Inc.*; filed Sep. 3, 2003; this lawsuit was transferred to the Central District of California from the Eastern District of Texas and was dismissed.
Complaint for Patent Infringement; U.S. District Court—Central District of California, Southern Division; Case No. SACV 07-558 AG (RNBx); *Oakley, Inc.* v. *Practical Enterprises, Inc.*, filed May 16, 2007; this lawsuit was settled and dismissed.
Complaint for Patent Infringement; U.S. District Court—Central District of California, Southern Division; Case No. SACV 07-57 DOC (Anx); *Oakley, Inc.* v. *Blue Diamond International*, filed Jan. 16, 2007; this lawsuit resulted in a default judgment.
Complaint for Patent Infringement; U.S. District Court—Central District of California, Southern Division; Case No. SACV 07-671 AG (RNBx); *Oakley, Inc.* v. *XONIX (Zhuhai) Electronics Co., Ltd. et al.*, filed Jun. 7, 2007; this lawsuit was settled and dismissed.
Complaint for Patent Infringement; U.S. District Court—Central District of California, Southern Division; Case No. SACV 07-888 CJC (RCx); *Oakley, Inc.* v. *The Pep Boys Manny Moe & Jack of California, Inc.*, filed Aug. 1, 2007; this lawsuit is settled and dismissed.
Complaint for Patent Infringement; U.S. District Court—Central District of California; Case No. 07-CV-1153 AHS (PJWx); *Oakley, Inc.* v. *Zeal Optics, Inc.*; filed Sep. 28, 2007; this lawsuit was dismissed.
Complaint of Patent Infringement; U.S. District Court—Central District of California; Case No. SACV 09-00062 JVS (Anx); *Oakley, Inc.* v. *Spencer Gifts, LLC.*: filed Jan. 14, 2009; this lawsuit was settled and dismissed.
De Herrera, Chris: "The Future of the Pocket PC", Pocket PC Magazine, 2003. http://www.pocketpcmag.com/ Mar02/future.asp, Oct. 8, 2003.
Decision Dismissing Request to Strike Detailed Request for Reexamination, received Jun. 11, 2009 in U.S. Appl. No. 90/009,088, 5 pages.

(56) References Cited

OTHER PUBLICATIONS

Defendant Motorola, Inc.'s Responses to Plaintiffs' First Set of Interrogatories; U.S. District Court—Central District of California; Case No. CV 03-6284 JFW (FMOx); *QR Spex, Inc. and Thomas G. Swab v. Motorola, Inc. and Frog Design, Inc.*; dated Apr. 26, 2004; this lawsuit was transferred to the Central District of California from the Eastern District of Texas and was dismissed.
Defendant's Preliminary Invalidity Contentions re U.S. Pat. No. 7,331,666 and Addendum, U.S. District Court—Eastern District of Texas; Case No. 5:06CV124; U.S. District Court Central District of California; Case No. SACV 06-627 CJC (RNBx); *QR Spex, Inc. v. Oakley, Inc., Oakley Sales Corp., Oakley Direct, Inc., and Motorola, Inc.*; filed Nov. 3, 2008; this lawsuit was consolidated and dismissed.
Defendants' Preliminary Invalidity Contentions re U.S. Pat. No. 6,769,767, including Exhibit, U.S. District Court-Eastern District of Texas; Case No. 5 :06CV124; U.S. District Court Central District of California; Case No. SACV 06-627 CJC (RNBx); *QR Spex, Inc. v. Oakley, Inc., Oakley Sales Corp., Oakley Direct, Inc., and Motorola, Inc.*; filed Jun. 16, 2008; this lawsuit is consolidated and dismissed.
DeVaul et al.: "The Memory Glasses: Subliminal vs. Overt Memory Support with Imperfect Information", 2002.
DeVaul, Richard W.: "The Memory Glasses Project", MIThril Media Lab, Oct. 28, 2003. http://www.media.mit.edu/wearables/mithril/memory-glasses.html.
Dorfman, Marjorie: "Wearable Technology: La Computer Mobile", Byte Back Online, 2003. http://www.bytebackonline.com/Articles_p/wearcomp_p.html, ct. 8, 2003.
Dresang, Joel: "Finns Fluent in Language of Cell Phones", JSOnline—Milwaukee Journal Sentinel, Apr. 15, 2000. http://www.isonline.com/bym/news/apr00/phone16041500a.asp?format=print. Accessed on Aug. 23, 2004.
Dressing in Digital Attire, Consumer Electronics Association—Vision, Nov./Dec. 2001. http://www.ce.org/publications/vision/2001/novdec/p08.asp?bc=cat&category_id=39. Dec. 5, 2003.
European Examination Report, re EP Application No. 06 734 820.1, dated May 13, 2014.
European Extended Search Report re EP Application No. 06734820, dated Feb. 11, 2009.
European Extended Search Report re EP Application No. 11171544.7, dated Oct. 7, 2011.
European Extended Search Report, re EPO Application No. 08020604.8, dated Apr. 2, 2009.
European Office Action re EP Application No. 06734820, dated Jun. 15, 2009.
"Fashionable Eyewear Charms to add Color, Style & Fun to Eyeglass Frames", Ficklets—Eyewear Charm Huggers. http://www.ficklets.com. Jul. 22, 2009.
First Amended Complaint and Application for Permanent Injunction; U.S. District Court—Eastern District of Texas (Texarkana Division); Civil Action No. 506 CV 124; *QR Spex, Inc. v. Motorola, Inc.; Oakley, Inc.; Oakley Sales Corp.; Oakley Direct Inc.; Zeal Optics, Inc.; Xonix Electronic Co., Ltd; and Kyocera Wireless Corp.*, filed Jul. 27, 2006; this lawsuit was transferred to the Central District of California from Eastern District of Texas and was dismissed.
First Amended Complaint for Patent Infringement; U.S. District—Central District of California; Case No. SACV 06-244 AHS (MLGx); *Oakley, Inc. v. Overstock.com, Inc., Wootcom, Inc. dba Synapse Micro, Inc., Global American Technologies, LLC., Aigo, Corp.*, filed Mar. 27, 2006; this lawsuit has been settled in part and dismissed.
First Amended Complaint for Patent Infringement; U.S. District Court—Central District of California; Case No. SACV 05-1099 AHS (MLGx); *Oakley, Inc. v. BMW of North America, LLC.*, filed Nov. 28, 2005; this lawsuit has been settled and dismissed.
Franklin, Curt: How Bluetooth Works from www.howstuffworks.com, web site visited on Jun. 11, 2002.

Frog Design and Motorola Launch Prototypes of Next Generation of Wearable Wireless Solutions, Frog Design.com, 2003. http://www.frogdesign.com/company/news_press/press_releases/2003/pro046.html. Apr. 5, 2004.
Furan, Amy. "Computing on the Go", Techies.com, http://home.techies.com/Common/Career/2 .Nerge060_m.js. Oct. 8, 2003.
Hands-Free Profile (HFP), Oct. 22, 2001, 71 pages.
Hattori, James: "Bluetooth Developers Aim to Usher in a Wireless Era", CNN.com-Technology-Computing. Sep. 1, 2000. http://cnn.com.
Headset Profile from Bluetooth Specification Version 1.1, Feb. 22, 2001, pp. 198-224.
Hieb, Barry MD. "The Electronic Age: The Future of Wearables", Advance Newsmagazine-for Nurse Practitioners, Mar. 5, 2001. http://www.advancefornp.com/common/editorial/PrintFriendly.aspx?CC~2160. Mar. 17, 2004.
International Search Report and Written Opinion, re PCT Application No. PCT/US2010/021044, dated Apr. 13, 2010 in 9 pages.
International Preliminary Report on Patentability received in co-pending PCT Application No. PCT/US2007/087309, dated Jun. 25, 2009, 7 pages.
International Preliminary Report on Patentability, and Written Opinion, re PCT Application No. PCT/US2012/049212, dated Feb. 4, 2014.
International Search Report and Written Opinion re PCT Application No. PCT/US06/04860, dated Aug. 7, 2007, in 10 pages.
International Search Report and Written Opinion received in corresponding PCT Application No. PCT/US2007/87309, dated May 22, 2008, 9 pages.
International Search Report and Written Opinion, re PCT Application No. PCT/US2012/049212, dated Oct. 22, 2012.
International Search Report, re PCT Application No. PCT/US01/17540, dated Oct. 26, 2001.
Invisible Eyewear Micro Display, The MicroOptical Corporation, Pre-2007 publication.
Kleinman, Neil. "Wearable Wear-Wearable computing in jewelry?", Pen Computing-Covering Mobile Computing and Communications. Issue 39, May 2001. http://www.pencomputing.com/wearableware/column39.htrnl. Mar. 17, 2004.
Mann, Steve. "Wearable Computing: A First Step Toward Personal Imaging", Computer-Cybersquare, vol. 30, No. 2, Feb. 1997. http://wearcam.org/ieeecomputer/r2025.htm.
McKay, Niall. "You are What You Wear", The Feature.com, Aug. 7, 2000. http://www.thefeature.com/article?articleid=1223. Oct. 8, 2003.
Moran, John M. "Wrist Phones Step Out of the Comic p.", Chicago Tribune Online, Oct. 19, 2000. http://www.chica .. ./sns-ebiz-wireless101900wrist,0,3250718.stor. Oct. 8, 2003.
Motorola Bluetooth Wireless Headset User Guide, 2001, 27 pages.
Motorola Consumer Catalog for Phone Accessories from www.commerce.motorola.com,web site visited on Jun. 13, 2002.
OEM Developer Kits—DV-1 Wireless Digital Viewer, The MicroOptical Corporation—Making Portable Practical 2004. http://www.microopticalcorp.com/OEM/kitDV-1.html. Accessed on Apr. 20, 2004.
Office Action (Petition Decision Denying Request to Vacate as Non-Compliant) received in U.S. Appl. No. 90/009,088, dated Mar. 11, 2009, 16 pages.
Office Action (Petition Decision Denying Request to Vacate as Non-Compliant) received in U.S. Appl. No. 90/009,112, dated Mar. 11, 2009, 26 pages.
Pentland, Alex Sandy. "Wearable Information Devices", MIT Media Laboratory, pp. 12-67, 2001.
Piller, Charles. "Internet Guru's Theory of Evolution", LA Times.com, Apr. 3, 2000. http://latimes.com/print/business/20000403/t000031121.html, Oct. 8, 2003.
Piller, Charles: "Connecting the World through Internet Appliances", Patrickweb.com, Apr. 9, 2000, http://www.patrickweb.com/pages/int /appliances_iws2000.htm. Oct. 8, 2003.
Plaintiffs' Response to Defendant Motorola, Inc.'s First Set of Request for Admission; U.S. District Court—Central District of California; Case No. CV 03-6284 JFW (FMOx); *QR Spex, Inc. and Thomas G. Swab v. Motorola, Inc. and Frog Design, Inc.*; dated

(56) References Cited

OTHER PUBLICATIONS

Mar. 12, 2004; this lawsuit was transferred to the Central District of California from the Eastern District of Texas and was dismissed.
Plaintiffs' Response to Defendant Motorola, Inc.'s First Set of Special Interrogatories; U.S. District Court—Central District of California; Case No. CV 03-6284 JFW (FMOx); *QR Spex, Inc. and Thomas G. Swab v. Motorola, Inc. and Frog Design, Inc.*; dated Mar. 12, 2004; this lawsuit was transferred to the Central District of California from the Eastern District of Texas and was dismissed.
Plaintiffs' Supplemental Response to Defendant Motorola, Inc.'s First Set of Interrogatories; U.S. District Court—Central District of California; Case No. CV 03-6284 JFW (FMOx); *QR Spex, Inc. and Thomas G. Swab v. Motorola, Inc. and Frog Design, Inc.*; dated May 18, 2004; this lawsuit was transferred to the Central District of California from the Eastern District of Texas and was dismissed.
Reply Memorandum of Points and Authorities in Support of Defendant Motorola, Inc.'s Motion for Summary Judgment; U.S. District Court—Central District of California; Case No. CV 036284 JFW (FMOx); *QR Spex, Inc. and Thomas G. Swab v. Motorola, Inc. and Frog Design, Inc.*; filed Jun. 7, 2004; this lawsuit was transferred to the Central District of California from the Eastern District of Texas and was dismissed.
Robbins, Alexandra. "A Display in Your Glasses", PC Magazine—The Independent Guide to Technology. Nov. 12, 2002. http://www.pcmag.com/article2/0,4149,667638,00.asp. Accessed on Dec. 5, 2003.
See What You're Missing—Electronic Images/data are Superimposed Over Your View of the World, Advertisements. The MicroOptical Corporation, Pre-1999 Publication.
Shivers, Olin. "BodyTalk and the BodyNet: A Personal Information Infrastructure", Massachusetts Institute of Technology, Laboratory for Computer Science-Personal Information Architecture Note 1, Dec. 1, 1993.
Special Product Review "ID Magazine", Aug. 2002, p. 179.
Spitzer, Mark B. "The Wristwatch: the bellwether for personal technology", Technology Reports.net, Mar. 26, 2003, http://technologyreports.netlnextinnovatorl?articleID=1636. Accessed on Oct. 8, 2003.
Star Trek Deep Space Nine, "A Time to Stand," Sep. 29, 1997 [retrieved on Jul. 23, 2014]. Retrieved from the internet: <URL:http:www.cbs.com/shows/star_trek_deep_space_nine/video/O6sNiuXkHru5xXgETAISgA3YAguijlVLu/a-time-to-stand/>; minute marks 27:54, 33:17.
Stevens, Cindy Loftier. "A Glimpse into the Digital Future", Consumer Electronics, Mar./Apr. 2000, http://www.ce.org/publications/vision.. .Ipg21.asp?category id=3. Accessed on Oct. 8, 2003.
Stipulation and Amend Pleadings in Consolidated Cases Transferred from Eastern District of Texas; U.S. District Court—Central District of California, Southern Division; Case No. 07-CV-00987 CJC (RNBx); *QR Spex, Inc. v. Motorola, Inc. et al.*; filed Sep. 5, 2007; this lawsuit was transferred to the Central District of California from the Eastern District of Texas and was dismissed.
Substance and Style, by Motorola and Frog Design, Motorola. Time Nov. 17, 2003.
Summons for Complaint for Patent Infringement; U.S. District Court—Central District of California; Case No. CV 09-624 CAS (JWJx); *Oakley, Inc. v. Digitalrise, LLC.*; filed Jan. 27, 2009; a default judgment was ordered.
The Ultimate Device, Accenture, Nov. 7, 2000. http://www.accenture.com/xd.asp?it=enWeb&xd=Services%5CTechnology%Ctech_ultimate.html. Accessed on Oct. 8, 2003.
Theil, Stefan. "Love Those Wearables!", Newsweek, Apr. 9, 2001. http://nl.newsbank.com/nl-search/we/Archives?p_action-doc&p_docid=0EC05F8D8A26. Apr. 15, 2004.
Turoff. "Wearable Computers", Fall 1999 Semester, Course CIS732, Dec. 16, 1999. http://eies.njit.edu/-turoff/coursenotes/CIS732/sa../brian_732.html. Oct. 8, 2003.
UDRI Researchers Develop Glasses-mounted Display, Next Generation of Wearable Computers, University of Dayton. Feb. 29, 2000. http://www.udayton.edu/news/nr/022900a.html. Accessed on Dec. 5, 2003.
Video glasses come close to melding fantasy, reality, USA Today—Marketplace. http://www.usatoday.com/tech/news/techinnovations/2002-09-23-glasses_x.htm. Accessed on Dec. 5, 2003.
Wave Report, The Wave Report on Digital Media, Nov. 20, 2000. http://www.wave-report.com/2000%20Wave%20Issues/wave2055.htm, Accessed on Mar. 17, 2004.
Wearable Computing, Georgia Institute of Technology, 2003. http://www.gatech.edu/innovations/wearablecomputing. Oct. 8, 2003.
Weiss, Peter. "Minding Your Business", Science News Online, Week of May 3, 2003, vol. 16. http://www.sciencenews.org/20030503/bob8.asp. Accessed on Oct. 8, 2003.
Willett, Edward. "Best of Popular Science's What's New: 1999", Edward Willett's Science Columns, 1999. http://www.edwardwillett.com/Columns/popscienceawards99.htm. Accessed on Oct. 8, 2003.
Alderton, Megan: "The Bluetooth Question", RF Design. Jan. 1, 2001.

\* cited by examiner

EYEWEAR WITH DETACHABLE ADJUSTABLE ELECTRONICS MODULE

CROSS-REFERENCE TO RELATED APPLICATIONS

Related Applications

This application is a continuation of U.S. application Ser. No. 14/281,696, filed May 19, 2014, which is a continuation of U.S. application Ser. No. 13/196,835, filed Aug. 2, 2011, which is a continuation-in-part of U.S. application Ser. No. 12/730,106, filed Mar. 23, 2010, now U.S. Pat. No. 7,988,283, which is a continuation of U.S. application Ser. No. 12/331,327, filed Dec. 9, 2008, now U.S. Pat. No. 7,682,018, which is a continuation of U.S. application Ser. No. 11/352,938, filed Feb. 13, 2006, now U.S. Pat. No. 7,461,936, which claims priority from U.S. Provisional No. 60/652,272, filed Feb. 11, 2005, U.S. Provisional No. 60/652,937, filed Feb. 14, 2005, and U.S. Provisional No. 60/729,645, filed Oct. 24, 2005. This application is related to U.S. application Ser. No. 10/993,217, filed Nov. 19, 2004, now U.S. Pat. No. 7,278,734, which is a continuation-in-part of U.S. application Ser. No. 10/628,831, filed Jul. 28, 2003, now U.S. Pat. No. 7,150,526, which claims priority from U.S. Provisional No. 60/399,317, filed Jul. 26, 2002 and U.S. Provisional No. 60/460,154, filed Apr. 3, 2003, and which is a continuation-in-part of U.S. application Ser. No. 10/004,543, filed Dec. 4, 2001, now U.S. Pat. No. 6,966,647, which is a continuation of U.S. application Ser. No. 09/585,593, filed Jun. 2, 2000, now U.S. Pat. No. 6,325,507. This application is also related to U.S. application Ser. No. 11/022,367, filed Dec. 22, 2004, now U.S. Pat. No. 8,482,488. All of the foregoing are expressly incorporated by reference herein.

BACKGROUND

Field of the Inventions

The present inventions are directed to wearable audio devices, and in particular, devices that humans can wear on their heads and which include electronics such as, for example, speakers, microphones, processors, transmitters, receivers, video display technology, and/or interface electronics for interacting with a wireless network and/or providing content to a user.

Description of the Related Art

There are numerous situations in which it is convenient and preferable to mount audio input and output devices so that they can be worn on the head of a user. Such devices can be used for portable entertainment, personal communications, and the like. For example, these devices could be used in conjunction with cellular telephones, cordless telephones, radios, tape players, MP3 players, portable video systems, hand-held computers and laptop computers.

The audio output for many of these systems is typically directed to the wearer through the use of transducers physically positioned in or covering the ear, such as earphones and headphones. Earphones and headphones, however, are often uncomfortable to use for long periods of time.

In the portable audio playback and cell phone industries, certain devices for remote audio listening and/or use of a cell phone have become more popular. Certain companies have begun to widely distribute portable audio playback devices, such as MP3 players, and headsets for cell phones that allow a user to listen to audio with the use of headphones or ear plugs. For example, a user can wear a headset having speakers connected by a flexible cable to an MP3 player, which can be worn on the belt. Additionally, certain companies have begun to distribute wireless speaker and microphone modules, such as Bluetooth headsets, that are worn over the user's ear and allow wireless communication between the user and his cell phone.

However, with such headsets, whenever a user wants to wear glasses or sunglasses, they must adjust or remove the headset from their ears. Further, it is often quite uncomfortable to wear both a headset and a pair of sunglasses at the same time. Such discomfort, when applied for a long period of time, can cause muscular pain and/or headaches. In addition, the flexible cable extending from the MP3 player to the headphones and the instability of simultaneously wearing eyewear and a headset can limit mobility of the wearer; particularly those participating in sporting activities.

Despite the variety of devices available in the prior art, there remains a need for improved interface electronics and electronics modules, for providing content to a wearer.

SUMMARY

There is provided in accordance with some embodiments, a dual speaker eyewear system. The system comprises an eyeglass, having a right earstem and a left earstem. A first speaker is supported by the right earstem, and a second speaker is supported by the left earstem. An electronics module is supported by the eyeglass and in electrical communication with each of the first and second speakers.

The electronics module may be releasably connected to one of the right and left earstems. The electronic module may include an MP3 format memory, a radio frequency receiver, a radio frequency transmitter, a cellular telephone, video display technology, or other electronic devices.

In embodiments having a speaker, the speaker may be adjustable relative to the respective earstem, to align the speaker with the wearer's ear. Further, embodiments having video or heads-up display technology, the components of the display can be adjusted to align the display in a proper viewing location relative to the wearer's eye.

In accordance with some embodiments, the electronics module can be removably mounted to eyewear. The module comprises a housing and a clamp moveably mounted to the housing. A speaker is moveably mounted to the housing, and electronics are contained within the housing. The clamp and the speaker are moveable in a manner that permits conversion of the module between a first configuration and a second configuration, wherein the second configuration is a mirror image of the first configuration.

The heads-up display technology can be carried by the electronics module for mounting on a support. The electronics module can be adjusted relative to the support to enable the heads-up display technology to be adjusted to user specifications. Thus, components of the heads-up display technology, such as inputs, outputs, circuitry, electronics, display panel, projector, etc. and other components can be adjusted, for example, in three dimensions to provide optimal user accommodation.

Further features and advantages of embodiments will become apparent to those of skill in the art in view of the detailed description of preferred embodiments which follows, when considered together with the attached drawings and claims.

In some embodiments, a support assembly is provided that can comprise a wearable support configured to support first and second speakers near a wearer's right and left ears, a first speaker supported by the wearable support and configured to be positioned near the wearer's ear when worn, an electronics module supported by the wearable support and in electrical communication with each of the first and second speakers, and a display device supported by the support assembly. The first speaker, electronics module, and display device can be configured to be removably attached to the wearable support.

Further, the eyewear system can comprises an eyeglass, having a first earstem and a second earstem, a first speaker supported by the first earstem, a display device supported by the first ear stem, and an electronics module supported by the first earstem and in electrical communication with the first speaker, wherein the electronics module is configured to be rotated with respect to the first earstem while attached to the first earstem. Further, in some embodiments, the eyewear system can comprise a second speaker supported by the second earstem and in communication with the electronics module.

In some embodiments, a dual speaker eyewear system can be provided which comprises an eyeglass, having a first ear stem and a second earstem; a first speaker supported by the first earstem; a display device supported by the first ear stem; and an electronics module supported by the first earstem and in electrical communication with each of the first and second speakers, wherein the electronics module comprises a connector that allows the electronics module to be rotated with respect to the first ear stem and to be releasably connected to the first ear stem. Further, the system can comprise a second speaker supported by the second earstem.

In some embodiments, an electronics module can be provided for mounting to eyewear which comprises a housing; a clamp movably mounted to the housing; a speaker movably mounted to the housing; a display device supported by the housing; and electronics contained in the housing; wherein the clamp and speaker are movable in a manner that permits conversion of the module between a first configuration and a second configuration which is a mirror image of the first configuration.

Some embodiments can also be configured such that the eyewear system comprises an eyeglass, having a right ear stem and a left earstem; a first speaker supported by the right earstem; a display device supported by the ride ear stem; and an electronics module supported by the eyeglass and in electrical communication with each of the first speaker and the display device, wherein the electronics module is releasably connected to one of the right and left earstems, and wherein the electronics module includes an MP3 format memory. Further, the system can comprise a second speaker supported by the left earstem.

The electronics module can comprise an MP3 format memory, a radio frequency receiver, a radio frequency transmitter, and/or a cellular telephone. The first speaker can be adjustable relative to the right earstem. The system can further comprise an articulating arm that couples the first speaker to the right earstem.

In some embodiments, the support assembly can further comprise a second speaker supported by the wearable support and configured to be positioned near the wearer's other ear when worn. Further, the first speaker can be adjustable relative to the wearable support. The assembly can further comprise an articulating arm that couples the first speaker to the electronics module.

In accordance with other embodiments, a kit can be provided for electronically enabling a wearable support. The kit can comprise a first speaker assembly comprising a first speaker and a first coupling, the first coupling configured to removably attach to the wearable support, source electronics supported by the first speaker assembly, a display device supported by the first speaker assembly, and a communications link in communication with the first speaker, the display device, and the source electronics.

Further, the kit can comprise a first speaker, adjustably connected to a first clamp, source electronics adjustably connected to the first clamp, a display device supported by the first clamp, and a communications link coupling the first speaker to the source electronics and the display device.

Further, some embodiments of the kit can also comprise a second speaker adjustably connected to a second clamp and in communication with the communications link. The kit can also be configured to comprise a second speaker assembly comprising a second speaker and a second coupling, wherein the second coupling is configured to removably attach to the wearable support. Further, the source electronics can comprise a digital music player, a radio frequency transmitter, a radio frequency receiver, and/or a cellular telephone.

In some embodiments, the kit can comprise a first speaker, adjustably connected to a first clamp; source electronics; a display device; and wiring connecting the first speaker and the display device to the source electronics, wherein the first speaker, the display device, source electronics, and wiring are configured to be removably attached to an eyewear. Further, the kit can also comprise a second speaker adjustably connected to a second clamp.

The wearable support can comprise an article of clothing. Further, the kit can comprise an article of clothing. Further, the electronics module can be configured to be rotated with respect to the wearable support while attached to the wearable support. In addition, the electronics module can also comprise a clamp.

The kit can also be configured such that the source electronics are configured to be rotated with respect to the wearable support while attached to the wearable support. In some embodiments of the kit, the communications link can comprise wiring. Further, the first coupling can comprise a clamp. Finally, the first speaker assembly can further comprise a housing and an articulating arm, and the articulating arm can couple the first speaker to the housing.

BRIEF DESCRIPTION OF THE DRAWINGS

FIG. 2A is a partial side view of the support assembly of FIG. 2 showing lenses moved out of a wearer's field of view;

DETAILED DESCRIPTION

Figure 1:
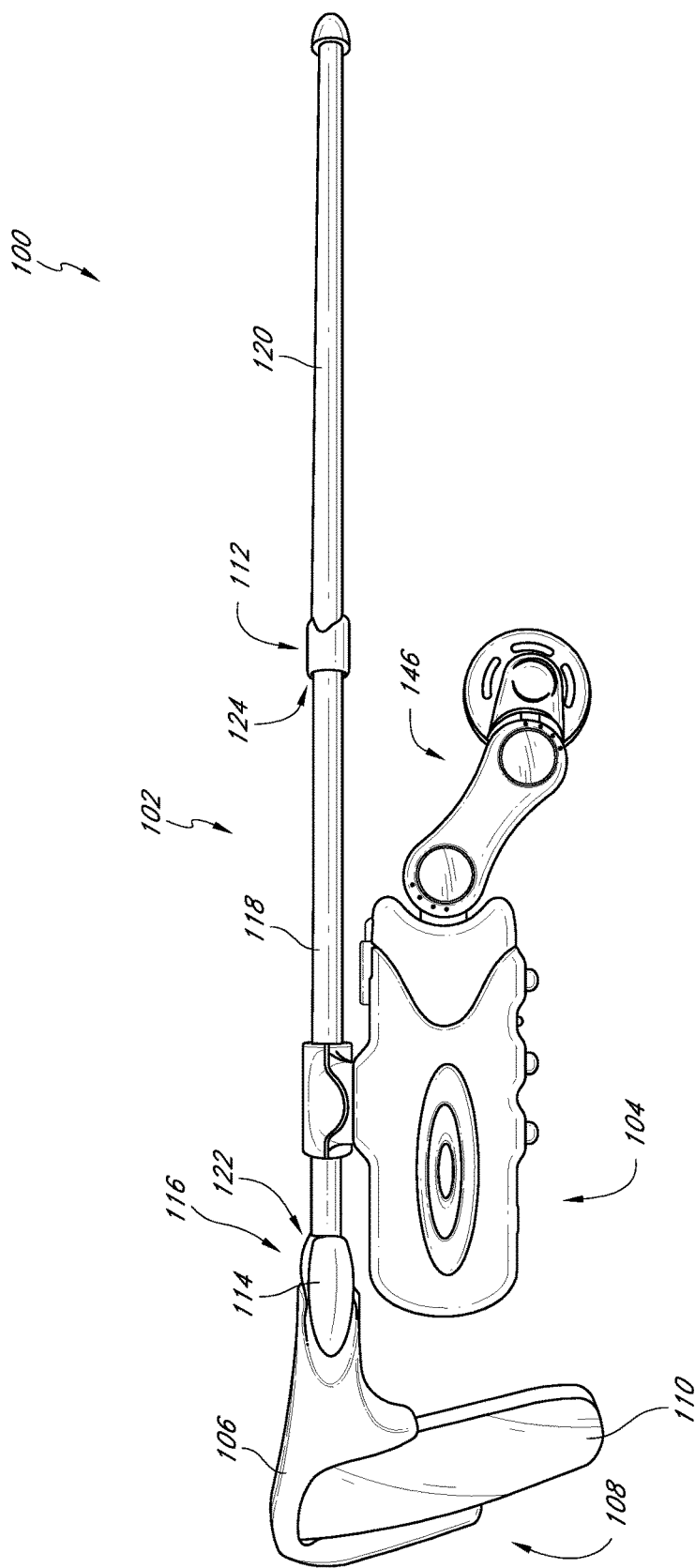
FIG. 1 is a side view of a support assembly in accordance with one embodiment of the present invention.

A support assembly 100 in accordance with one embodiment of the present inventions are illustrated in FIG. 1. The support assembly 100 generally includes a support 102 and a detachable module 104, and can be any structure worn by a wearer that is adapted to carry, hold, or contain another device, such as an electronic device. For example, the support assembly 100 can be or include an audio device. In addition, the support assembly 100 can include an eyeglass frame, sports or other protective goggle, or other eyewear assembly. Although generally described herein as a detachable module, the module 104 can also be permanently mounted (by rigid fixation, or adjustably as disclosed in greater detail below) to the earstem, slide rail or other component of the eyeglass or other headwear.

The support 102 is generally any structure capable of being worn that is also able to carry a device such as an electronic device. The support 102 can include any of a variety of wearable structures such as, for example, a hat, a belt, a vest, an article of clothing, and/or eyewear, including eyeglasses. As discussed further herein, embodiments can be provided which allow a user to mount a visual display apparatus on the one of a variety of user wearable supports. However, it is also contemplated that the support can be any of a variety of other structures that are not physically worn by the user, but which can be maintained in a generally stable or stationary spatial relationship relative to the user. In some embodiments, an adjustable module can be provided which allows the user to access a visual display system in any variety of locations and conditions. As used herein, the terms "visual" and "video" can both be used to refer hardware or software used to provide viewable data, video, or other information to a wearer. Thus, reference to a "video display device" does not require or convey that the device only displays videotaped or televised materials, but can also encompass digital displays, alphanumeric displays, and other non-video displays.

The detachable module 104 is any structure capable of being carried by the support 102. In one embodiment, the detachable module 104 includes a housing, containing an electronic assembly, as is described in greater detail below.

In the illustrated embodiment, the support 102 includes eyeglasses, which have a frame 106 that can include at least one orbital or lens support 108. The orbital 108 is adapted to hold at least one lens 110 in the field of vision of the wearer of the support assembly 100.

The support 102 also includes at least one earstem 112. The earstem 112 is coupled to the frame 106 with a coupling 114 located at the anterior portion 116 of the earstem 112. In one embodiment, the coupling 114 is a hinge, although the coupling 114 can be any structure known to those of skill in the art for coupling an earstem 112 to a frame 106. In other embodiments, the support 102 does not include a coupling 114. In such embodiments, the earstems 112 are integrally formed with the frame 106.

The earstem 112 includes a support section or rail 118 and a head contacting portion 120. The rail 118 is designed to engage a corresponding clamp on the detachable module 104. The detachable module 104 is detachably coupled to the rail 118 by any of a variety of mechanisms, such as those described in greater detail below. The detachable module 104 is adapted to move with respect to the rail 118. In one embodiment, the detachable module 104 moves along the rail's longitudinal axis in an anterior-posterior (or posterior-anterior) direction. Axial movement of the detachable module 104 with respect to the rail 118 may be limited in the anterior direction by an anterior stop 122, and in the posterior direction by a posterior stop 124.

The head contacting portion 120 of the earstem 112 can be provided with an elastomeric traction device, such as that disclosed in U.S. Pat. No. 5,249,001, filed Aug. 27, 1991, which is incorporated by reference herein. A padded portion on the head contacting portion 120 is generally made from a soft material, such as a foam, a plastic, cloth, or any of a variety of soft polymers, and provides a comfortable interface between the wearer's head and the support assembly 100 when worn by a user.

In one embodiment, the detachable module 104 includes one or more of a communication module, a music module, an audio-video module, and/or another electronics module. Such a module 104 can be used to drive a heads-up display such as those discussed further herein. In one embodiment, the detachable module 104 is a communications module that allows the wearer of the support assembly 100 to wirelessly communicate with an electronic device. For example, the detachable module 104 can include one or more of a speaker, a microphone, a power supply and a Bluetooth or other radio frequency transceiver for wirelessly communicating with a remote device such as a cellular telephone.

Figure 2:
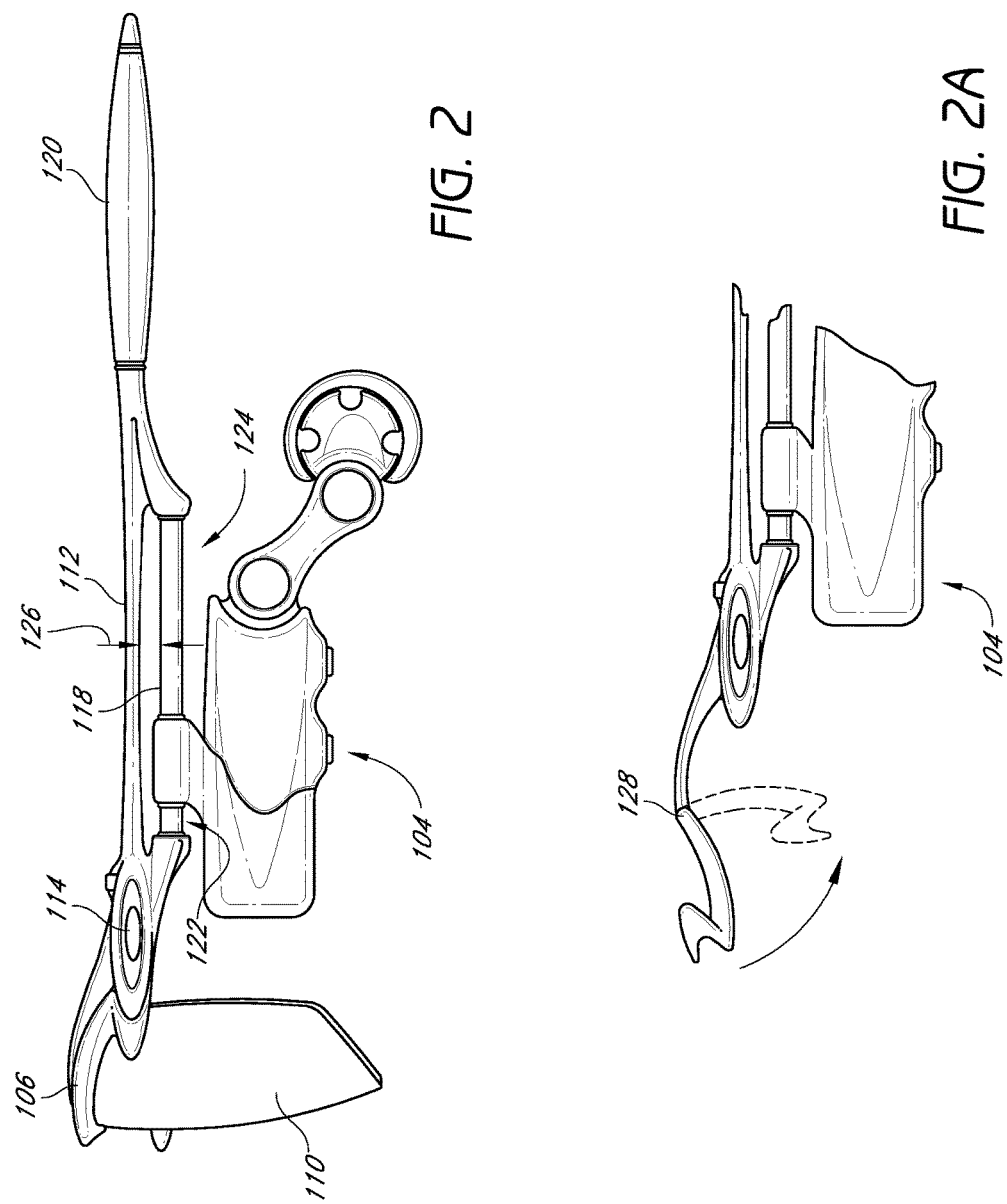
FIG. 2 is a side view of another support assembly in accordance with another embodiment of the present invention.

In the embodiment illustrated in FIG. 1, the rail 118 is a longitudinal segment of the earstem 112. In the illustrated embodiment, the rail 118 is concentric with the longitudinal axis of the earstem 112. However, in other embodiments, such as illustrated in FIG. 2, the rail 118 is spaced an offset distance 126 from the longitudinal axis of the earstem 112.

The orbitals 108 of the support 102 can be integrally formed with the frame 106, such as illustrated in FIG. 1. However, in other embodiments, the orbitals 108 are hingably connected to the frame 106 such as illustrated in FIG. 2A. In the embodiment of FIG. 2A, an orbital hinge 128 couples the orbital 108 with the frame 106. By hingably coupling the orbital 108 to the frame 106, the lenses 110 may be rotated about a hinge axis and moved out of the wearer's line of sight when desired. For example, if lenses 110 include sunglass lenses then orbital hinge 128 allows the wearer of the support assembly 100 to lift the lenses 110 out of the field of view when the wearer moves indoors without removing the support assembly 100 from his head. In any of the embodiments herein, the lenses may be supported in a "rimless" design as is understood in the art, in which the lens is attached to the frame or other adjacent components without the use of an orbital.

Figure 3:
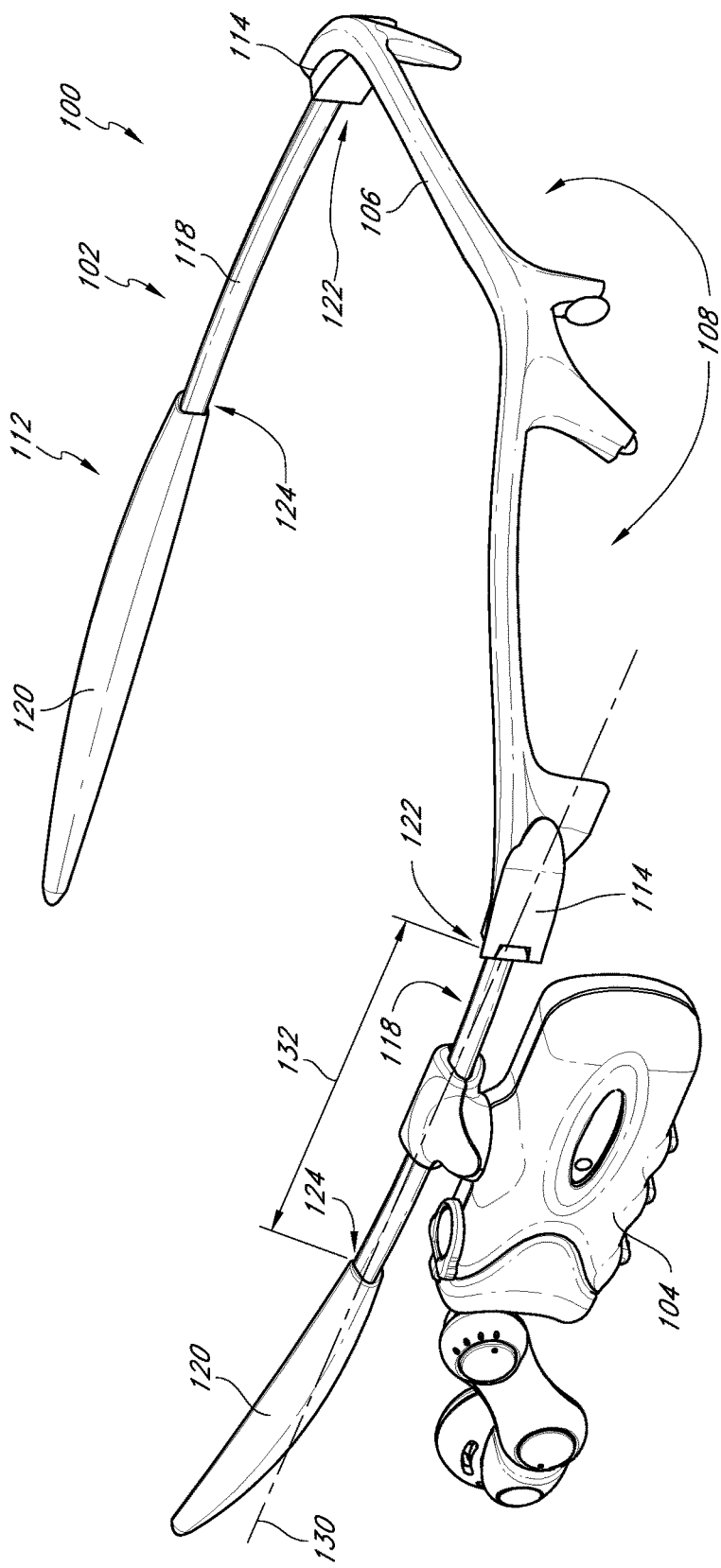
FIG. 3 is a perspective view of another support assembly in accordance with another embodiment of the present invention.

Another embodiment of a support assembly 100 is illustrated in FIG. 3. In the illustrated embodiment, at least a portion of the rail 118 has a non-round cross-sectional shape to prevent undesired rotation of the detachable module 104 about the rail 118 longitudinal axis 130. The rail 118 cross-sectional shape may be any of a variety of shapes, including noncircular shapes to prevent undesired rotation. For example, in one embodiment, the rail 118 cross-sectional shape is oval, elliptical, square, triangular, or any other noncircular shape. In one embodiment, the rail 118 includes an edge extending along a portion of its longitudinal axis 130, which prevents rotation of the detachable module 104 about the rail 118. The module clamp may be provided with complementary clamping surfaces, for conforming to the cross sectional configuration of the rail to permit axial (anterior-posterior) adjustability while resisting or preventing rotation about the axis of the rail.

In addition, any of a variety of anti-rotational structures may be provided with, or coupled to the rail 118 and the detachable module 104. For example, the anti-rotational structure can include a high friction surface to provide a friction fit, a locking arrangement, a pin, or any other structure known to those of skill in the art. In other embodiments, the rail 118 has a substantially circular cross-sectional shape and the detachable module 104 includes a suitable structure for preventing rotation of the detachable module 104 about the rail 118 longitudinal axis 130. For example, the detachable module 104 can include a friction mount, a rubber or elastomeric polymer pad, or other locking mechanism to prevent rotation about the rail 118.

The anterior stop 122 and posterior stop 124 define an adjustment length 132 over which the detachable module 104 may be repositioned with respect to the frame 106. In one embodiment, the adjustment length 132 is at least about one half inch, often at least about an inch, sometimes at least about two inches, and other times at least three inches or more. The adjustment length 132 defines a range of travel 134 of the detachable module 104 and other components coupled thereto (such as a speaker), as described in greater detail below.

The rail 118 can be located at any of a variety of locations with respect to the frame 106. In general, the rail 118 is located in the anterior two-thirds of the earstem 112. Alternatively, the rail 118 is in the anterior half of the earstem 112.

One embodiment of a detachable module 104 is illustrated in FIGS. 5-11. The detachable module 104 includes a housing 140 and a coupling 142. The coupling 142 allows the detachable module 104 to be removably connected to the earstem 112 of support 102 of the support assembly 100. Coupling 142 also provides adjustability of the position and angular orientation of the detachable module 104 with respect to the support 102.

The detachable module 104 also includes at least one speaker 144. The illustrated speaker 144 is adjustably carried by the detachable module 104 may with an arm 146.

The detachable module 104 may also include a port cover 148 to cover a data port as will be described in greater detail below.

When the support assembly 100 is worn on the wearer's head, the position of the detachable module 104 with respect to the support 102 may be adjusted so that the speaker 144 comfortably resides at least partially over the wearer's ear. Additional details regarding the adjustability of the speaker 144 with respect to the detachable module 104 and the support 102 will be described in greater detail below with respect to FIG. 18 and FIGS. 19-22. In addition, further multiaxial adjustability structures are disclosed in U.S. patent application Ser. No. 11/022,367, filed Dec. 22, 2004, and U.S. patent application Ser. No. 10/993,217, filed Nov. 19, 2004, the disclosure of which are incorporated in their entireties herein by reference.

Figure 5:
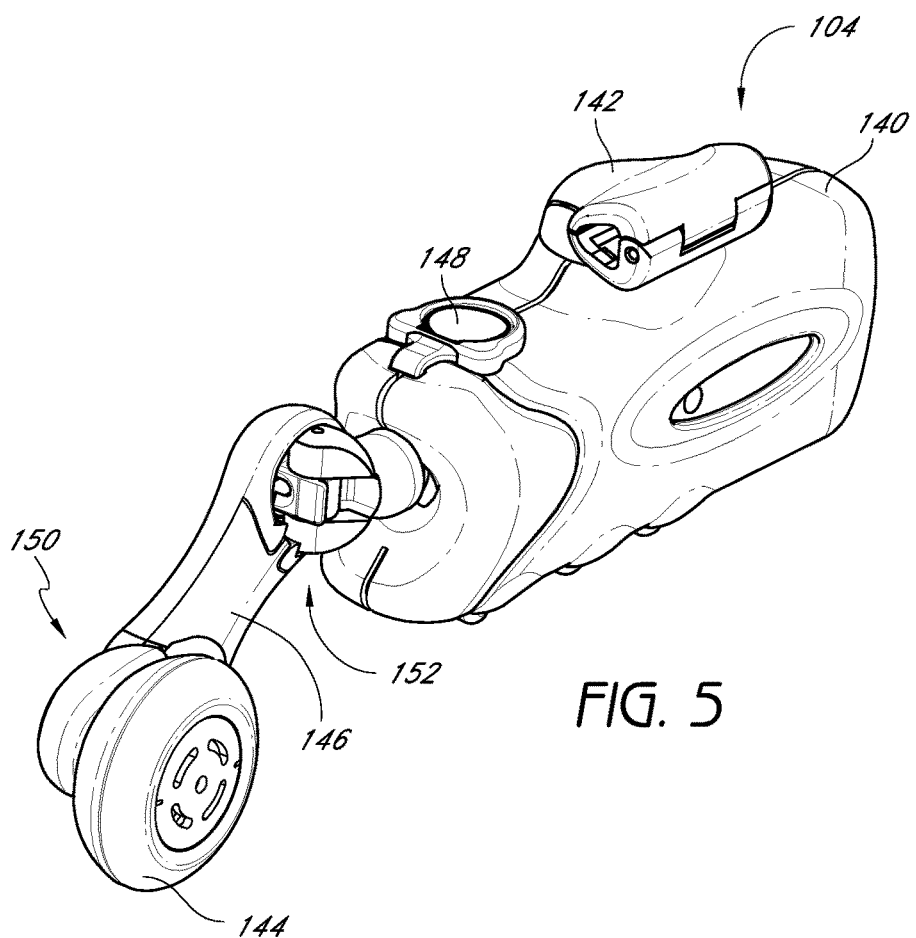
FIG. 5 is a perspective view of a detachable module in accordance with one embodiment of the present invention.
Figure 6:
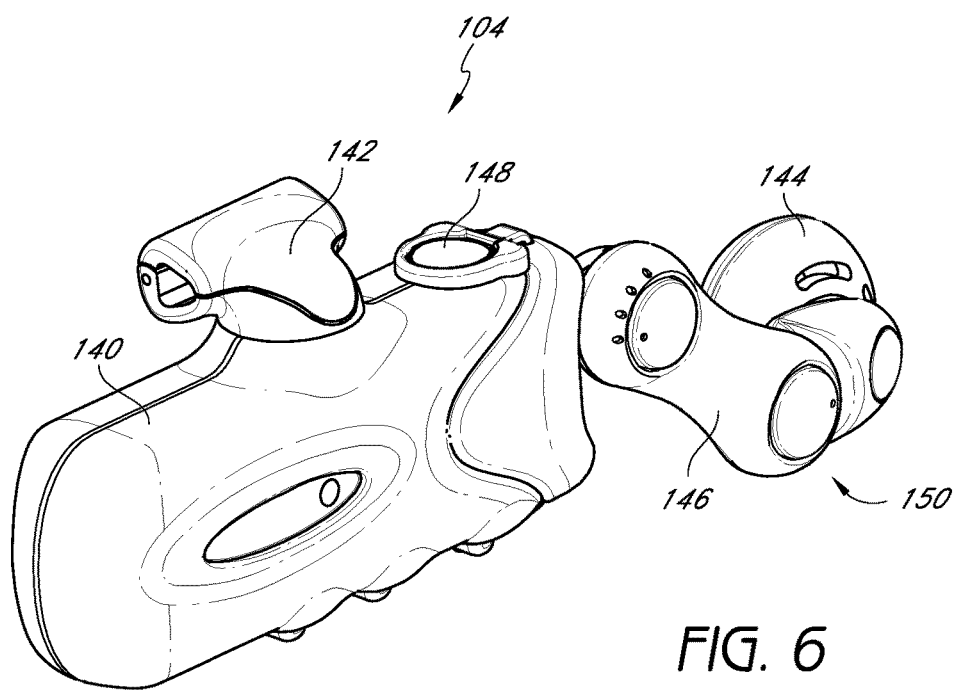
FIG. 6 is another perspective view of the detachable module of FIG. 6.
Figure 7:
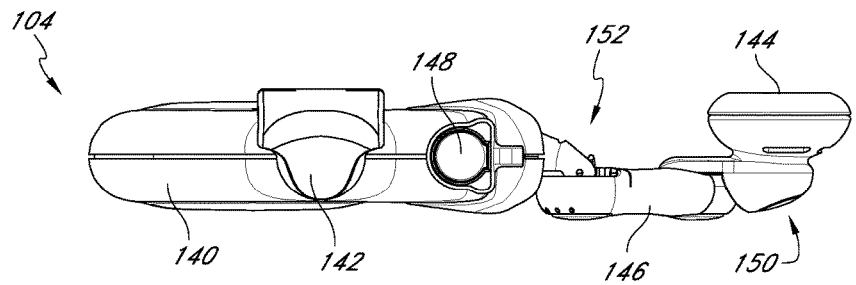
FIG. 7 is a top view of the detachable module of FIG. 5.

In one embodiment, such as that illustrated in FIG. 5, a speaker 144 is coupled to an arm 146 at a speaker pivot 150. The speaker pivot allows adjustment of the position of the speaker 150 with respect to the arm 146. The arm 146 is coupled to the housing 140 of the detachable module 104 at an arm pivot 152.

Figures 8, 9:
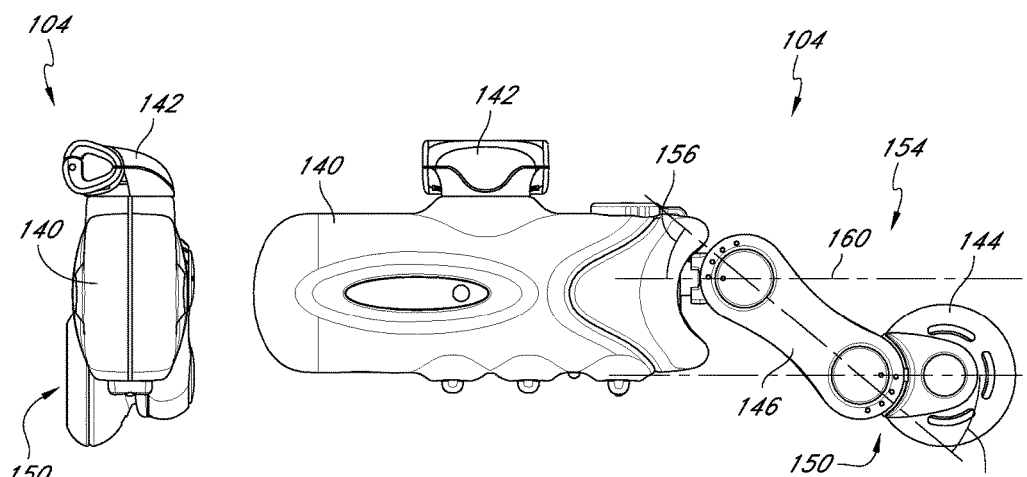
FIG. 8 is a side view of the detachable module of FIG. 5.
FIG. 9 is an end view of the detachable module of FIG. 5.
Figure 10:
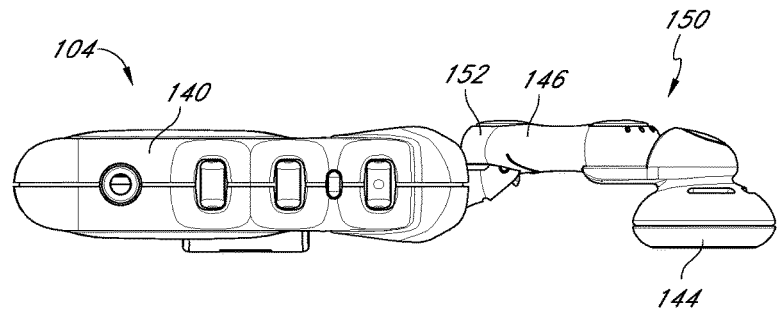
FIG. 10 is a bottom view of the detachable module of FIG. 5.
Figure 11:
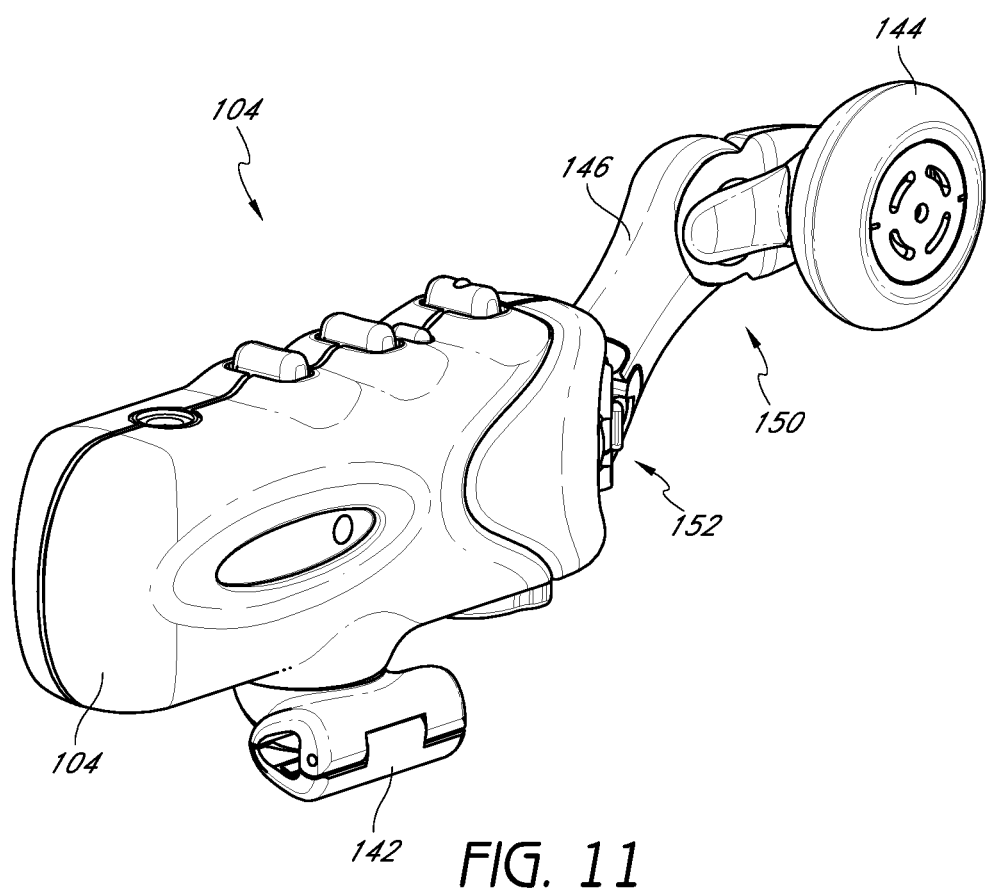
FIG. 11 is another perspective view of the detachable module of FIG. 5.

Arm pivot 152 is any of a variety of mechanical structures able to allow one member to adjust in at least its angular orientation in at least one dimension with respect to another. For example, as illustrated in FIG. 8, the arm pivot 152 allows inferior and superior movement of the distal end 154 of the arm 144, thereby adjusting a first arm angle 156. The first arm angle 156 is generally in the range of from about 3° to 45°, often from about 5° to 25°, sometimes about 10° to 25°, and in some embodiments, greater than at least 10°.

Figure 4:
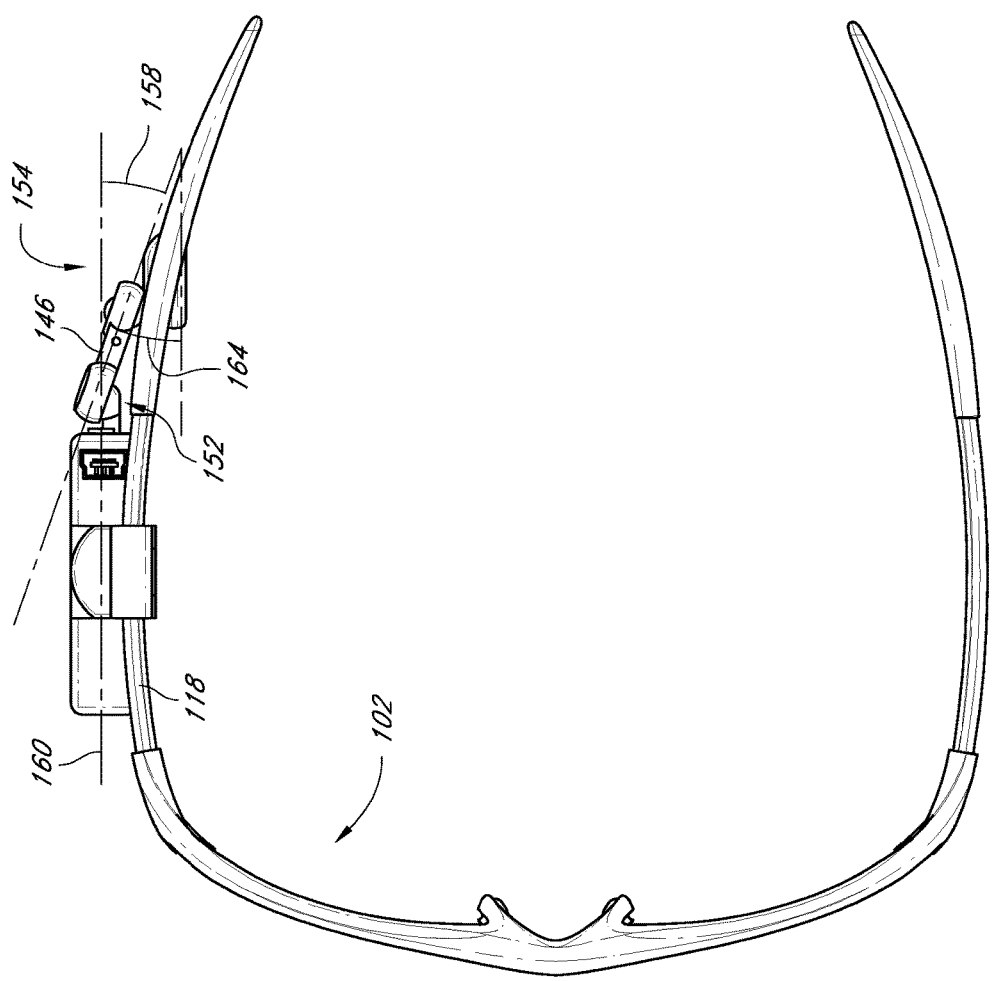
FIG. 4 is a top view of the support assembly of FIG. 5.

In addition, the distal end 154 of the arm 146 can be moved in a lateral direction, thereby adjusting second arm angle 158, as best seen in the view of FIG. 4. The second arm angle 158 is generally in the range of about 2° to 25°, often about 5° to 15°, and in some embodiments, about 10°.

In addition, the arm pivot 152 provides rotational movement of arm 146 with respect to the housing 140 of the distal module 104. For example, in one embodiment, arm pivot 152 allows arm 146 to be rotated at least 180° about the housing axis 160, as will be described in greater detail below.

The speaker pivot 150 provides similar adjustability of the speaker 144 with respect to the arm 146. For example, as illustrated in FIG. 8, the speaker pivot 150 allows movement of the speaker 144 to a desired first speaker angle 162. In addition, as illustrated in FIG. 4, a second speaker angle 164 may also be selected by rotating the speaker 144 about the speaker pivot 150.

Adjustability of the detachable module 104 with respect to the support 102, adjustability of the arm 146 with respect to the housing 140, and adjustability of the speaker 144 with respect to the arm 146 allow full adjustability and positioning of the position of the speaker 144 with respect to a user's ear when the support assembly 100 is worn by a user. In addition, the adjustability provides improved comfort for the wearer.

Figure 12:
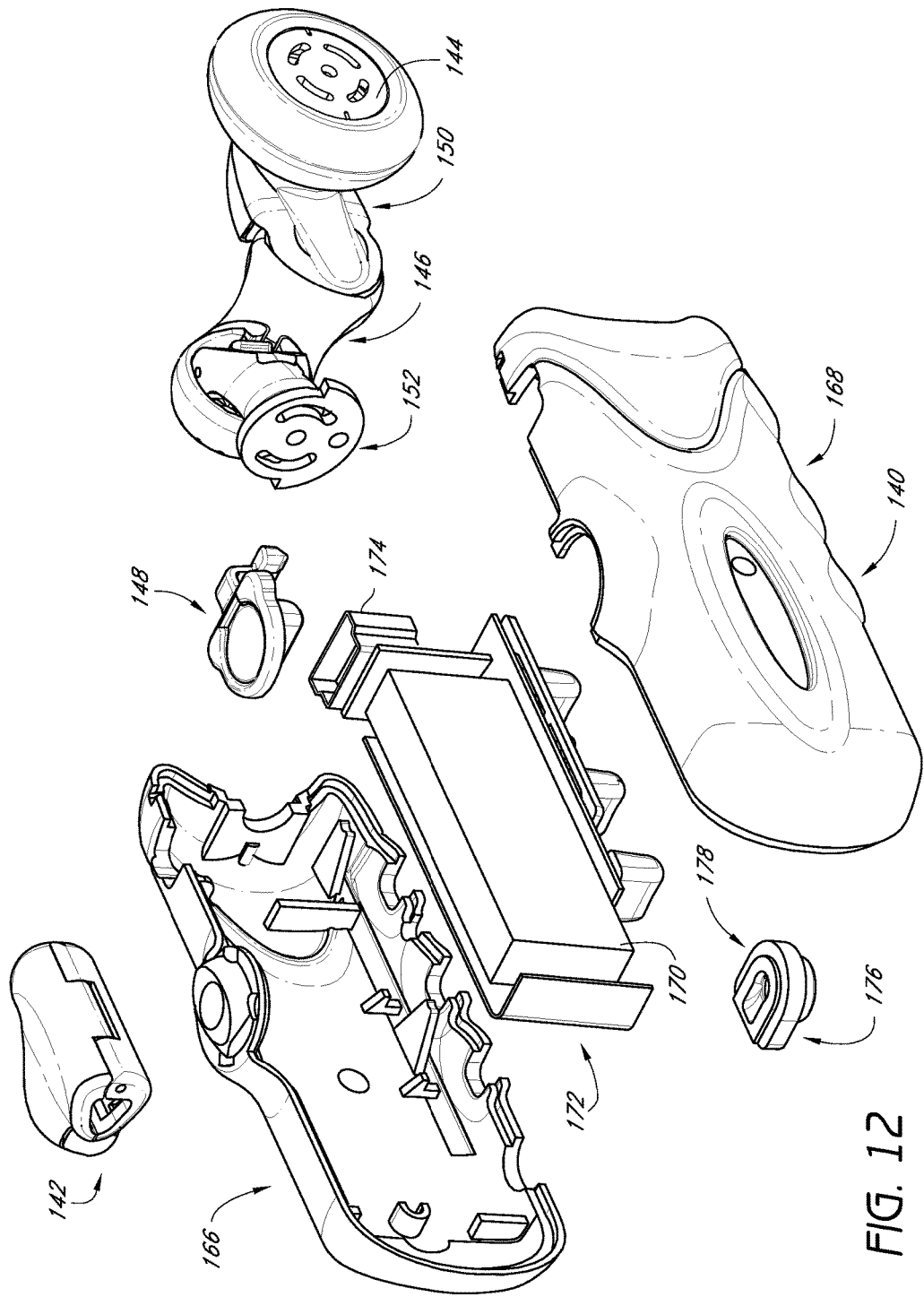
FIG. 12 is an exploded view of the detachable module of FIG. 5.

An exploded view of one implementation of detachable module 104 is illustrated in FIG. 12. The detachable module 104 includes a housing 140, which includes a first body portion 166 and a second body portion 168. The housing 140 is formed by attaching the first body portion 166 to the second body portion 168 along a part line, to provide a protective outer wall which defines at least one interior cavity for housing electronics. At least partially inside of the housing 140 are a power module 170, an electronics module 172, a data port 174 and a holder 176 that supports a microphone 178. The body portions 166, 168 may be made from any of a variety of materials, including plastic or metal. Alternatively, the module 104 can be formed entirely or partially by insert molding or co-molding processes to produce embedded electronics in a unitary or monolithic module.

The power supply 170 is any of a variety of power structures able to power a detachable module 104. For example, power module 170 may include a battery, a capacitor, or other power supply.

The electronics module 172 includes electronics for receiving signals from an external source and providing audio signals to the wearer through the speaker 144, such as for receiving audio, audio-video or video only signals. As discussed further below, the audio-video or video only signals can be used to drive a video display and optical components, which can include a display such as one of the variety of devices discussed below. In addition, the electronics module 172 may also allow signals received by the electronics module 172 through the microphone 178 to be transmitted to an external receiver. For example, in one embodiment, electronics module 172 includes a Bluetooth transceiver.

Data port 174 is any port for coupling the detachable module 104 to an external source through a wired or wireless connection. For example, in one embodiment, data port 174 is a mini-USB port, a USB port, a fire wire port, an IEEE 1394 connection port, or any other data port. A holder 176 can be provided to secure the microphone 178 in place. In one embodiment, the holder 176 includes a grommet, such as any of those known to those of skill in the art. In addition, the holder 176 can also include a windscreen to filter wind noise from being received by the microphone 178.

Any of a variety of couplings can be utilized with the module 104 of the present invention, for releasably or permanently attaching the module 104 to an eyeglass frame or other support. In many application, releasable connection is preferred. The coupling may be an integral component of the module 104, or may be attached to the module 104. In general, the coupling will include at least a first coupling surface for contacting a first surface on the rail or other support from which the coupling will depend, and a second coupling surface for contacting a second surface on the support. The first and second coupling surfaces are generally moveable with respect to each other, such as to permit positioning the coupling over or around the structure to which it is to be attached, and then tightened to the structure by bringing the first and second coupling surfaces towards each other.

The configuration of the first and second coupling surfaces, or third or fourth or more, depending upon the design, can be provided with any of a variety of configurations. Normally, the coupling surfaces will be configured in a manner that cooperates with the complementary shape of the rail, earstem, or other component to which they are to be attached.

In an embodiment of the present inventions in which the module 104 may preferably be attached at the user's choice to either a left earstem or a right earstem of an eyeglass, the coupling is preferably pivotably or otherwise moveably connected to the module 104, to permit shifting between a "right hand" and "left hand" coupling configuration. Certain specific examples will be given below. Alternatively, in certain embodiments of the invention, a left hand module and a right hand module will be sold as a system, such as for receipt of stereo signals for music, audio/visual sound tracking, or for use in a dual mono system such as cell phone. In this application, the coupling may be permanently mounted to the housing 104, in an immovable fashion, with a first module 104 adapted for coupling to left earstem and a second module 104 adapted for coupling to a right earstem. Certain specific embodiments of the coupling systems will be described below.

Figure 13:
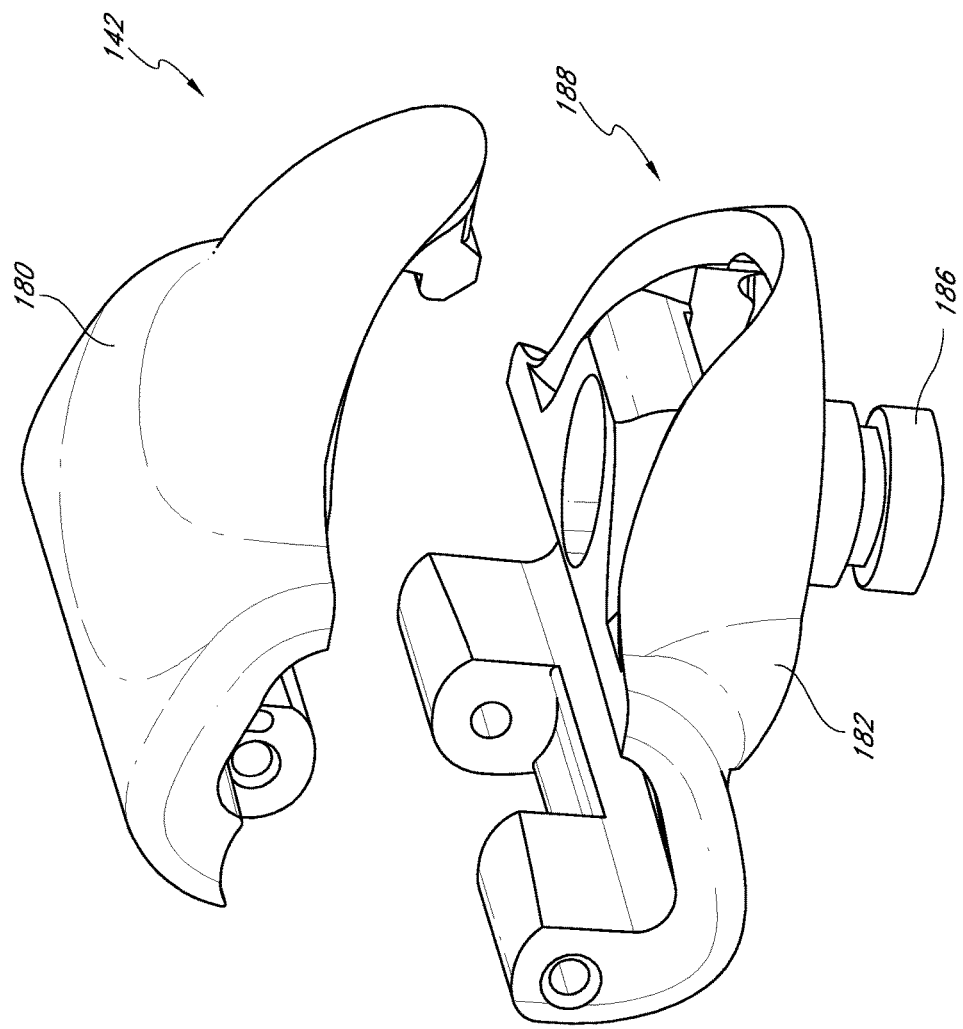
FIG. 13 is an exploded view of the coupler of the detachable module of FIG. 5.

A coupling 142 in accordance with the present inventions is illustrated in FIG. 13. In the illustrated embodiment, the coupling 142 includes an upper portion 180, a lower portion 182, and a pin 184. The pin 184 hingably connects the upper portion 180 with the lower portion 182. A mount 186 attached to or integrally formed with the lower portion 182 provides an attachment mechanism between the coupling 142 and the housing 140 of the distal module 104. The mount 186 also provides angular adjustability of the housing 140 with respect to the coupling 142. Additional details regarding angular adjustability in this regard will be discussed in greater detail below.

The coupling 142 can include any of a variety of locking mechanisms 188 to allow opening and closing of the coupling 142. The upper portion 180 is movable with respect to the lower portion 182 when the locking mechanism 188 is released. Such movability of the upper and lower portions 180, 182 allow the coupling 142 to at least partially surround and enclose a portion of a rail (not shown), such as rail 118 described above.

In addition, the locking mechanism 188 can be released to remove the coupling 142 from the rail. In other embodiments, locking mechanism 188 loosens the grip of the coupling 142 on the rail so that the detachable module 104 can be slid along the rail, as described in greater detail above.

In one embodiment, the locking mechanism 188 has two states: a lock state and an open state. In the lock state, the coupling 142 may not be inadvertently moved along the rail under normal use conditions. In the open state, the coupling 142 may be moved along or removed from the rail.

Figure 14:
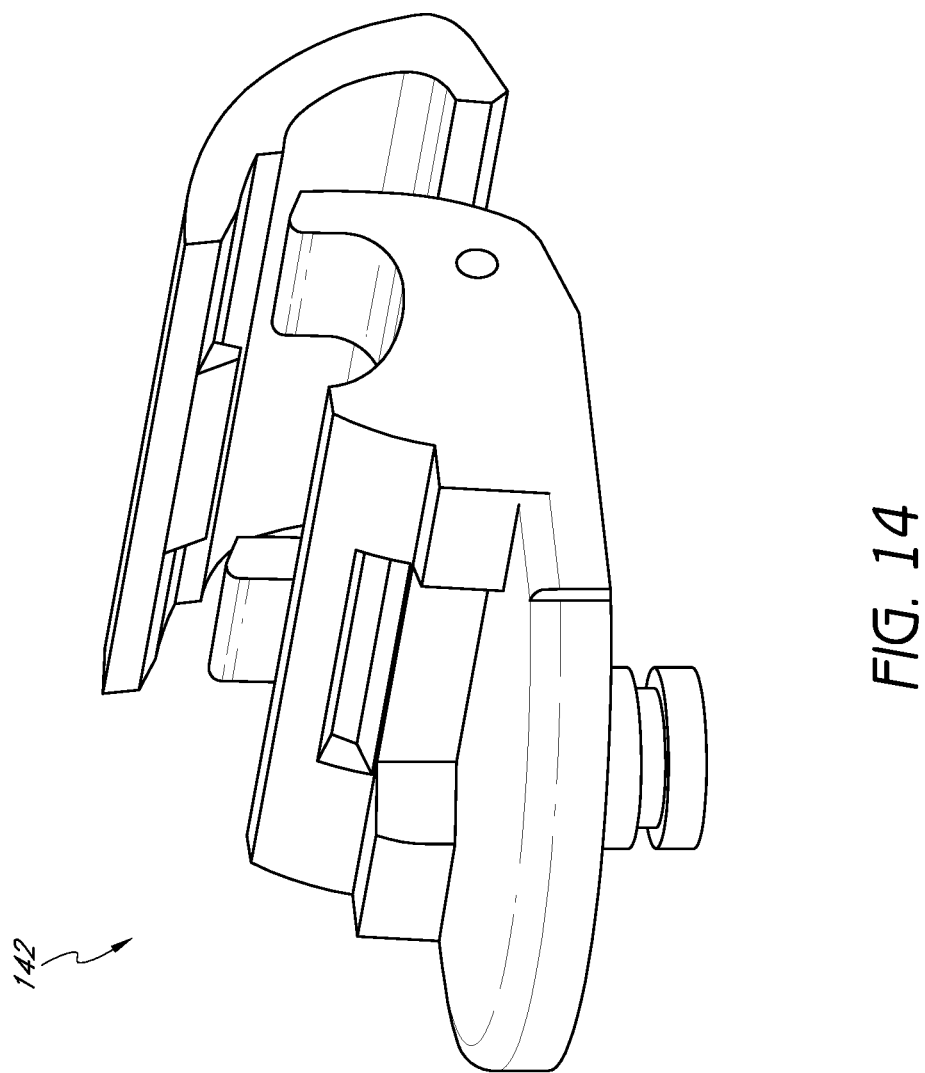
FIG. 14 is a perspective view of another coupler in accordance with another embodiment of the present invention.

In another embodiment, the locking mechanism 188 has three states: a lock state, an open state, and an adjust state. The lock and open states are the same as described above. The adjust state allows the coupling 142 to be moved or slid along the rail but does not allow the coupling 142 to be removed from the rail. Another embodiment of a coupling 142 shown in an open state is illustrated in FIG. 14.

Figure 15:
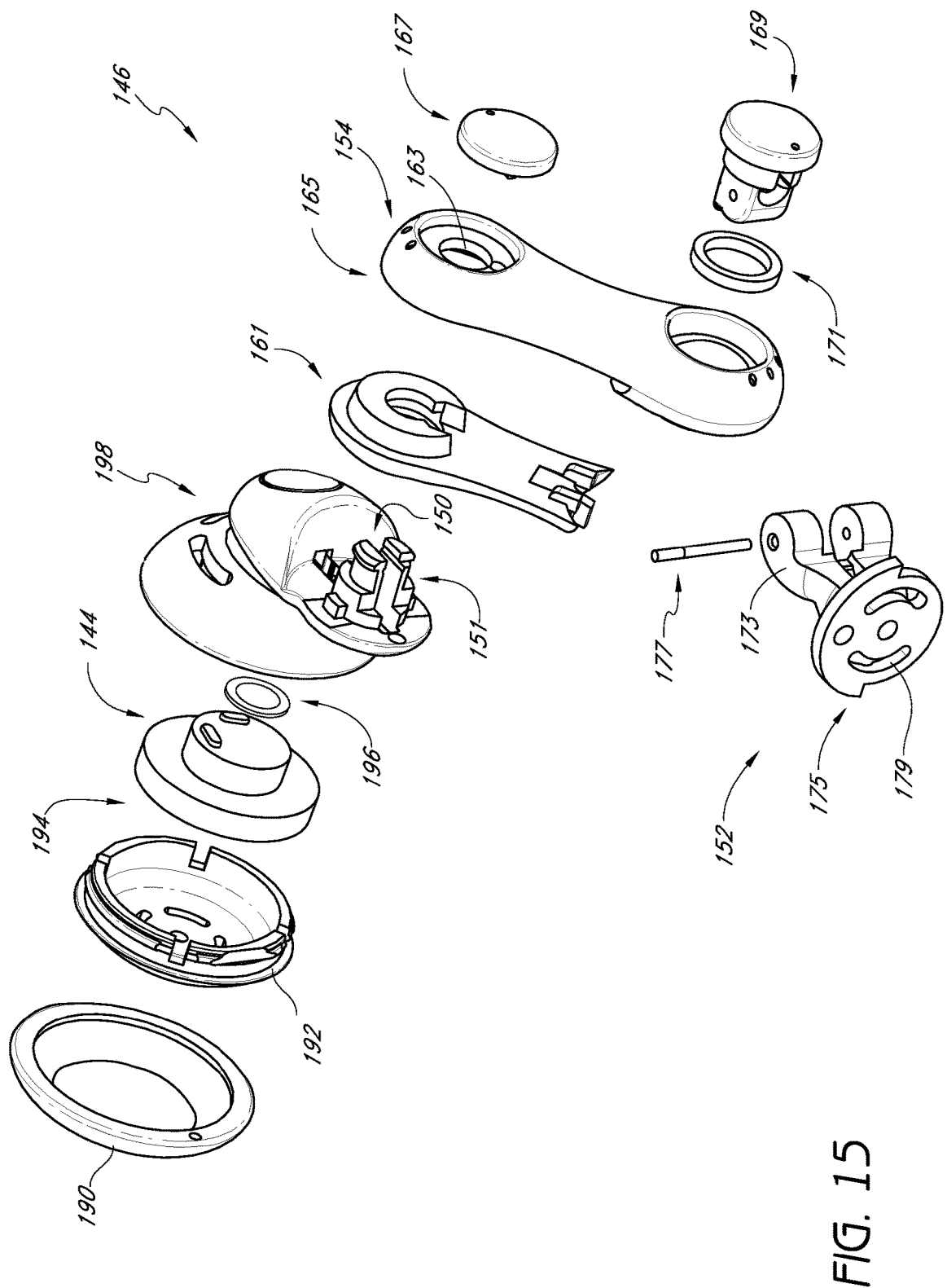
FIG. 15 is an exploded view of the speaker and arm of the detachable module of FIG. 5.

An exploded view of a speaker support arm 146 is illustrated in FIG. 15. A bellow 190 is provided over a grill 192, which at least partially covers speaker 144 over its sound output surface 194. A vent screen 196 resides between the speaker 144 and a bud 198. The speaker pivot 150 is formed by two laterally flexible tangs 151 that extend into and provide a rotatable snap fit within the orifice 163 of a boom 165. A cap 167 covers the tangs 151 of the speaker pivot 150. A cover 161 is placed between the bud 198 and the boom 165 to cover at least one surface of the boom 165, and enclose wires leading to the speaker 144.

A hub 169 extends through a ring 171 and through the boom 165 where it is pivotably coupled to the mating portion 173 of a base 175. A pin 177 removably and hingably couples the mating portion 173 to the hub 169 and therefore the boom 165. The arm pivot 152 is provided by the coupling of the base 175 and hub 169.

As discussed previously in connection with FIG. 4, the speaker and boom assembly may also be rotatably connected to the housing 104 about an axis 160, which extends in the illustrated embodiment in the anterior/posterior direction. This rotation may be accomplished by the provision of one or more arcuate slots 179, illustrated in FIG. 15, for receiving a pin or other complementary structure on the module 104, to permit rotation through a controlled range of motion as will be apparent to those of skill in the art in view of the disclosure herein.

In one embodiment, the speaker 144 is a rip curl speaker. In another embodiment, the speaker 144 has an outside diameter of no more than 9 mm, no more than about 11 mm, or about 13 mm or more.

Figure 16:
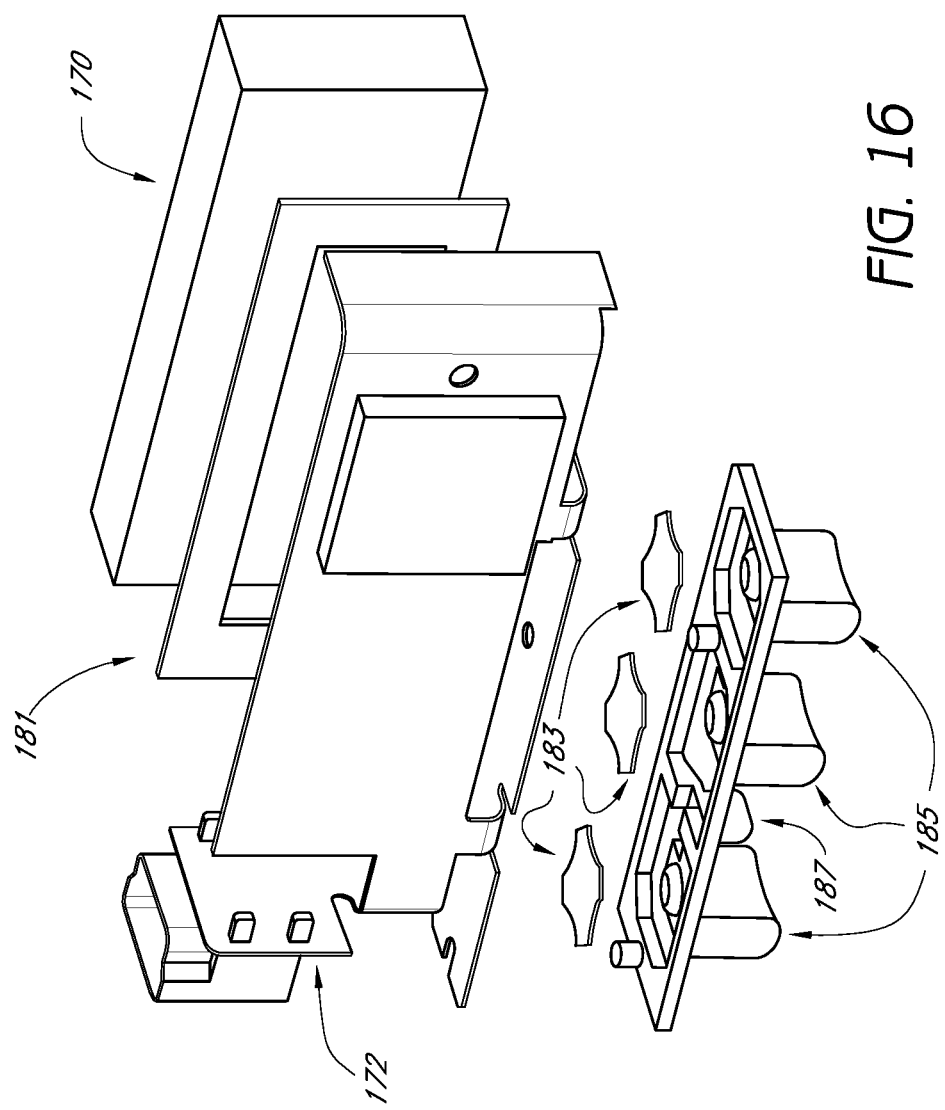
FIG. 16 is an exploded view of an internal assembly of the detachable module of FIG. 5.

Referring now to FIG. 16, the power module 170 can include a battery, such as an ATL501230 battery, as is well known to those of skill in the art. The power module 170 can be coupled to the electronics module 172 with an adhesive 181. The electronics module 172 can be coupled to micro switches 183 which are accessed by the user by pressing buttons 185. In one embodiment, the detachable module 104 includes three switches.

The switches can include any of a variety of switches known to those of skill in the art, including micro switches, snap switches, and dome switches. In one embodiment, the switches 183 are snap dome F06180 switches. The detachable module 104 can have three switches 183, although any number of switches 183 can be used. An LED 187 provides status indication to the wearer.

Figure 17:
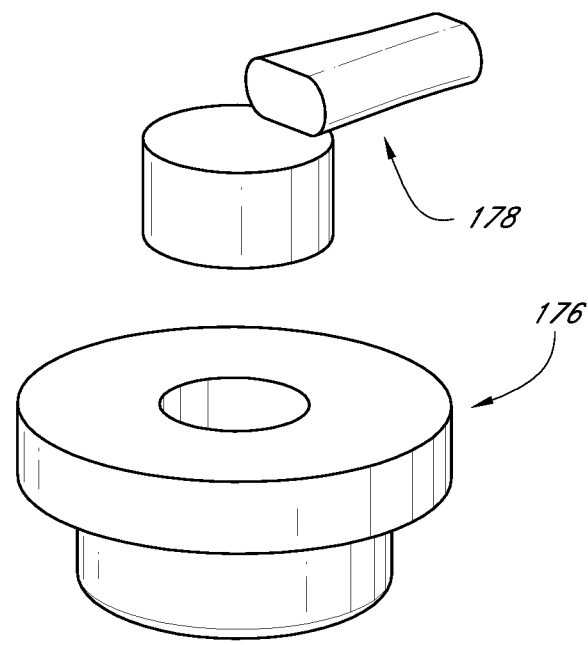
FIGS. 17 and 18 are perspective views of the grommet of the detachable module of FIG. 5.
Figure 18:
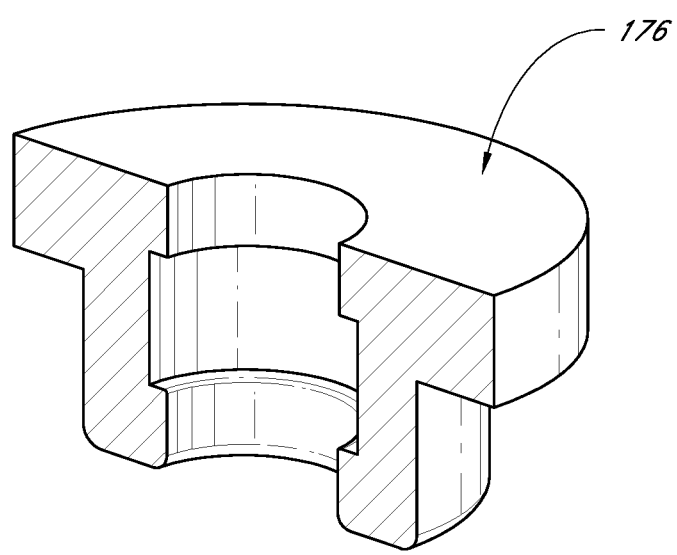

Referring now to FIGS. 17 and 18, the microphone grommet 176 of the detachable module 104 can be made from any of a variety of materials well known to those of skill in the art, including: PTFE, polyethylene, polyurethane, or TPE. In addition, the grommet 176 can have a hardness or stiffness of about 20 to 30 durometers, about 40 to 50 durometers, about 60 durometers, or about 70 durometers.

A windscreen can be provided with the grommet 176 to reduce noise. For example, in one embodiment, the windscreen is a Saatifil screen. The microphone 178 can be any of a variety of microphones known to those of skill in the art, including a star microphone, such as microphone Part No. MAA-03A-L60.

Figure 19:
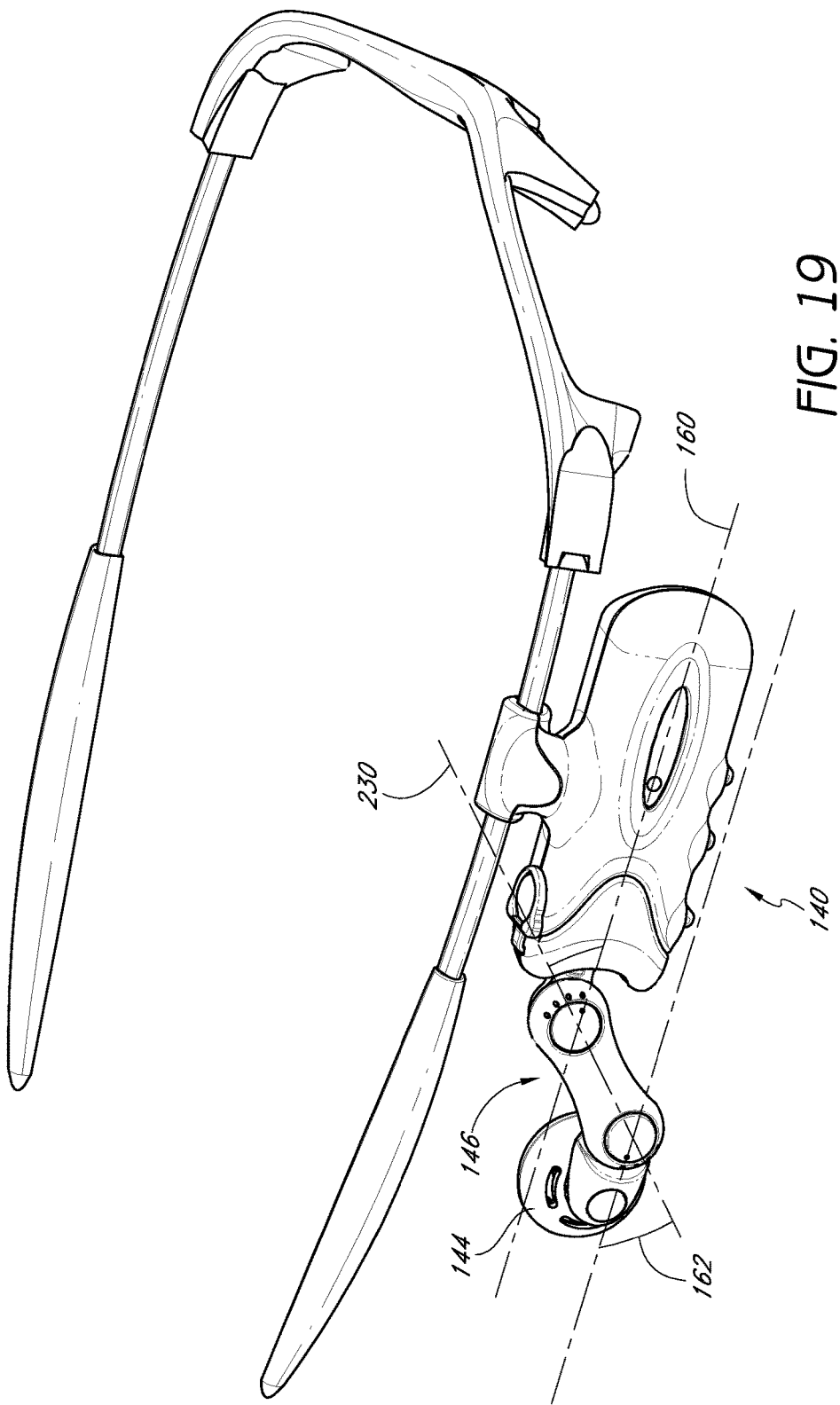
FIGS. 19 and 20 show one aspect of the angular adjustability of the speaker and arm of the detachable module of FIG. 5.
Figure 20:
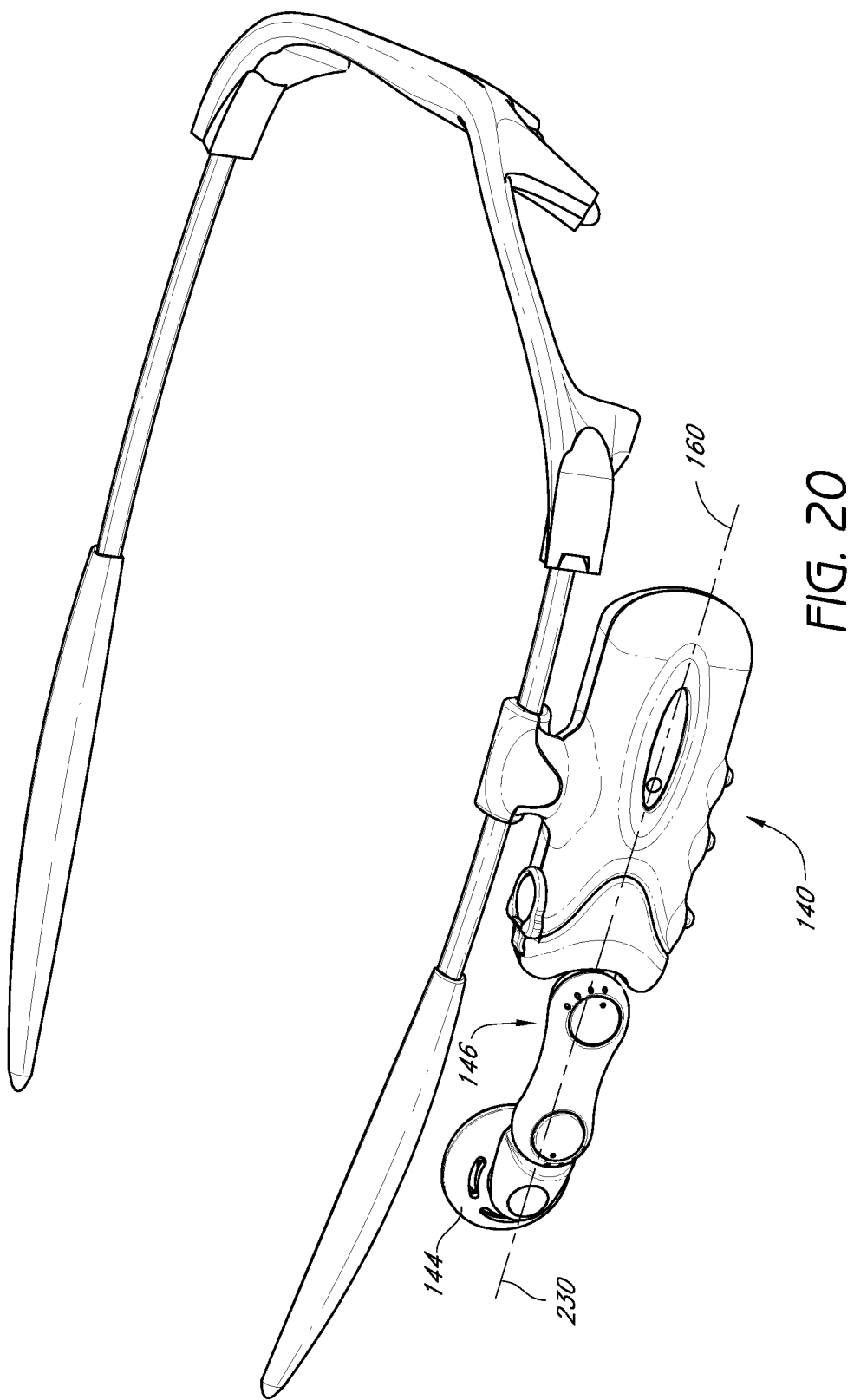

Referring now to FIGS. 19 and 20, and as discussed above, speaker and arm pivots 150, 152 allow movement of the speaker 144 and arm 146 with respect to the detachable module 104 housing 140. In one embodiment, the first speaker angle 162 over which the speaker 144 may be moved, is up to about 100 degrees. In another embodiment, the first speaker angle 162 is about ±45 degrees with respect to the arm axis 230. In another embodiment, the first speaker angle 162 is at least about ±5 degrees, sometimes at least about ±20 degrees, and sometimes at least about ±45 degrees.

In one embodiment, the detachable module 104 can be adjusted so that the speaker, arm, and housing 140 are aligned along the housing axis 160 as illustrated in FIG. 20.

Figure 21:
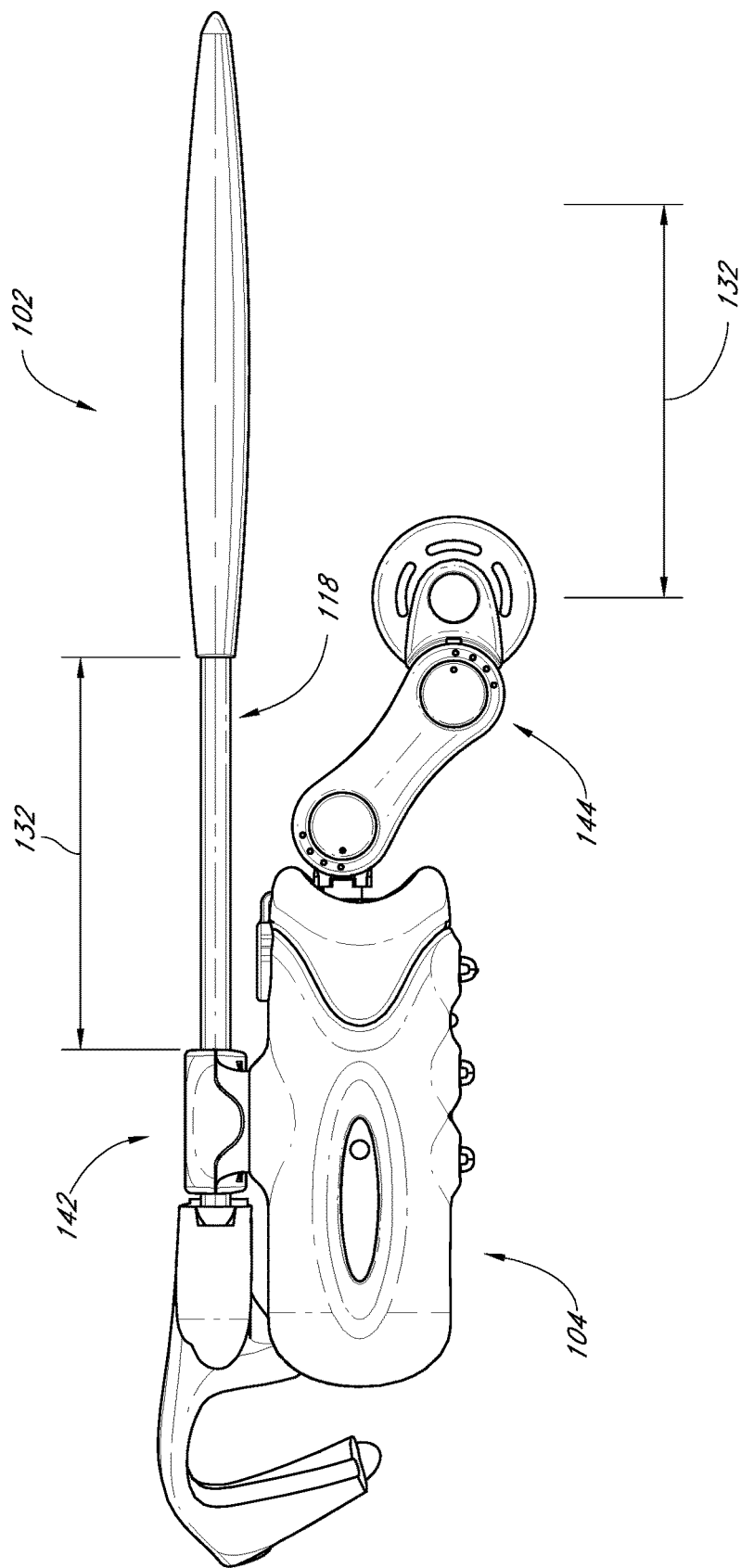
FIGS. 21 and 22 show one aspect of the linear translation and position adjustability of the detachable module of FIG. 5.
Figure 22:
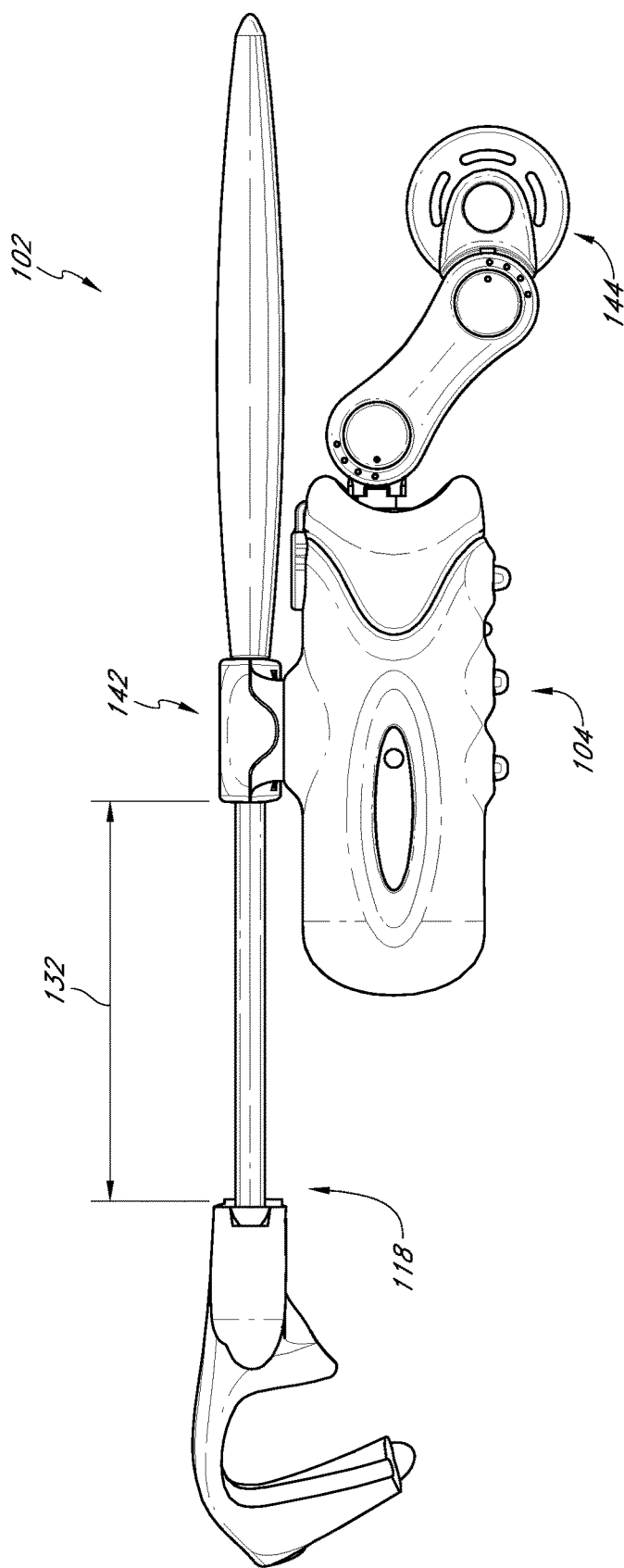

Referring now to FIG. 21, movement of the coupling 142 with respect to the rail 118 over an adjustment length 132 results in a corresponding translation of the detachable module 104 with respect to the support 102. In addition, movement of the coupling 142 over the rail 118 over the adjustment length 132 or a portion thereof will result in a related movement of speaker 144 with respect to the support 102 and with respect to the wearer's ears. Although FIGS. 21 and 22 show movement of the detachable module 104 over the entire adjustment length 132, in other embodiments, coupling 142 is used to move detachable module 104 only a portion of the full adjustment length 132.

Figure 23:
FIG. 23 shows the rotation of the coupling with respect to the housing of the detachable module of FIG. 5.

In one embodiment, the coupling 142 is released from the rail or other support by rotating the coupling 142 with respect to the housing 140. In one embodiment, the housing 140 is rotated at least about 45 degrees and preferably about 90 degrees to release the coupling 142. By releasing the coupling 142 as illustrated in FIG. 23, the detachable module 104 may be removed from the support 102. It may be desirable to remove the detachable module 104 from the support 102 to either change the detachable module 104 with another component, such as another detachable module that provides different functionality, or to mount the detachable module 104 on the opposite earstem 112 of the support 102.

Figure 24:
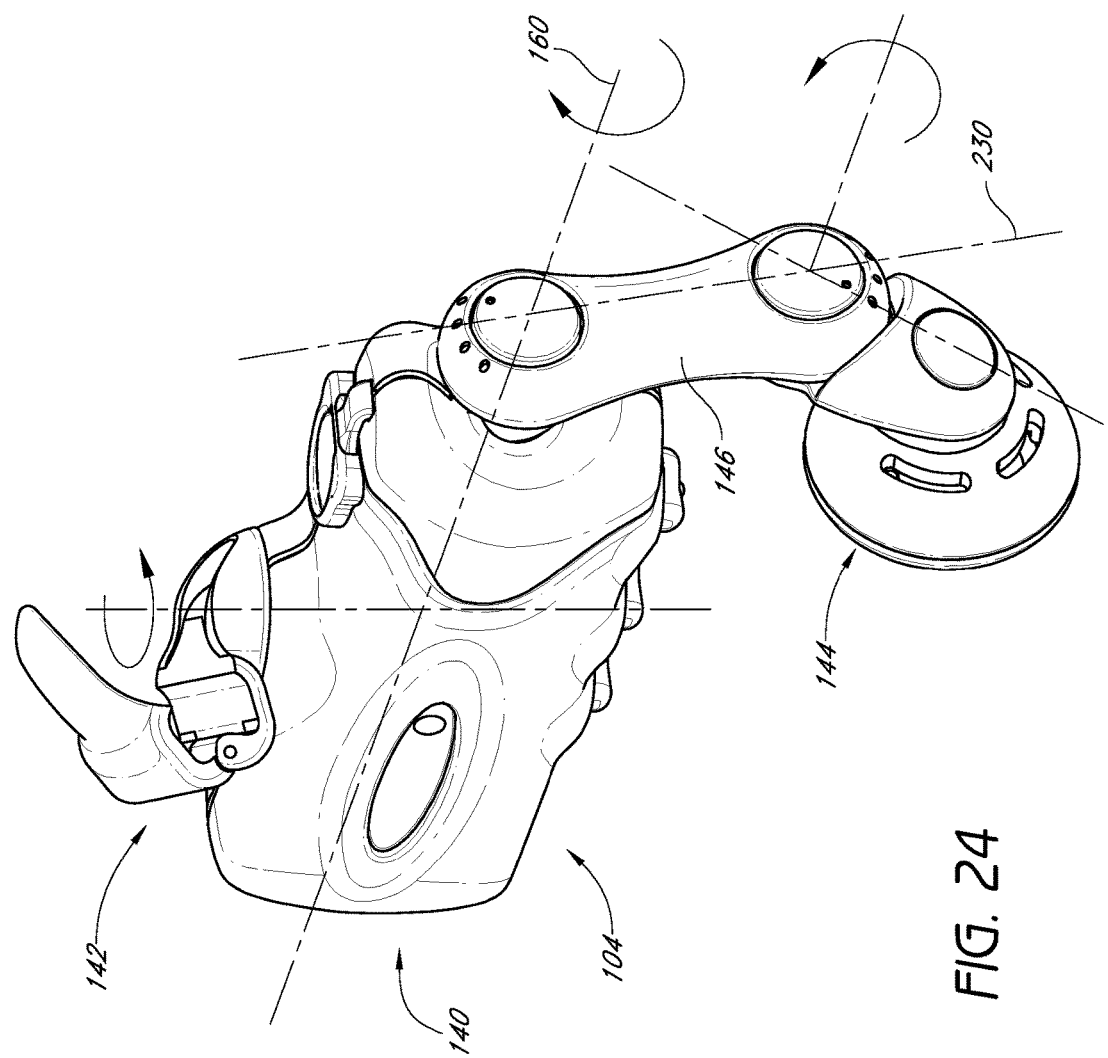
FIG. 24 shows the reversibility of the detachable module of FIG. 5 such that it may be moved from one earstem of a support to the other earstem.

To move the detachable module 104 from one earstem 112 of the support 102 to the opposite earstem 112, the coupling 142 is released, as illustrated in FIG. 24. The arm 146 is then rotated about the housing axis 160. In addition, the speaker 144 is rotated about the arm axis 230 as well. In addition, the coupling 142 can be rotated about a coupling axis 232 as well. Additional details regarding the lead positioning of the detachable module 104 from a right earstem 112 to a left earstem 112 are illustrated in FIGS. 25-28.

Figure 25:
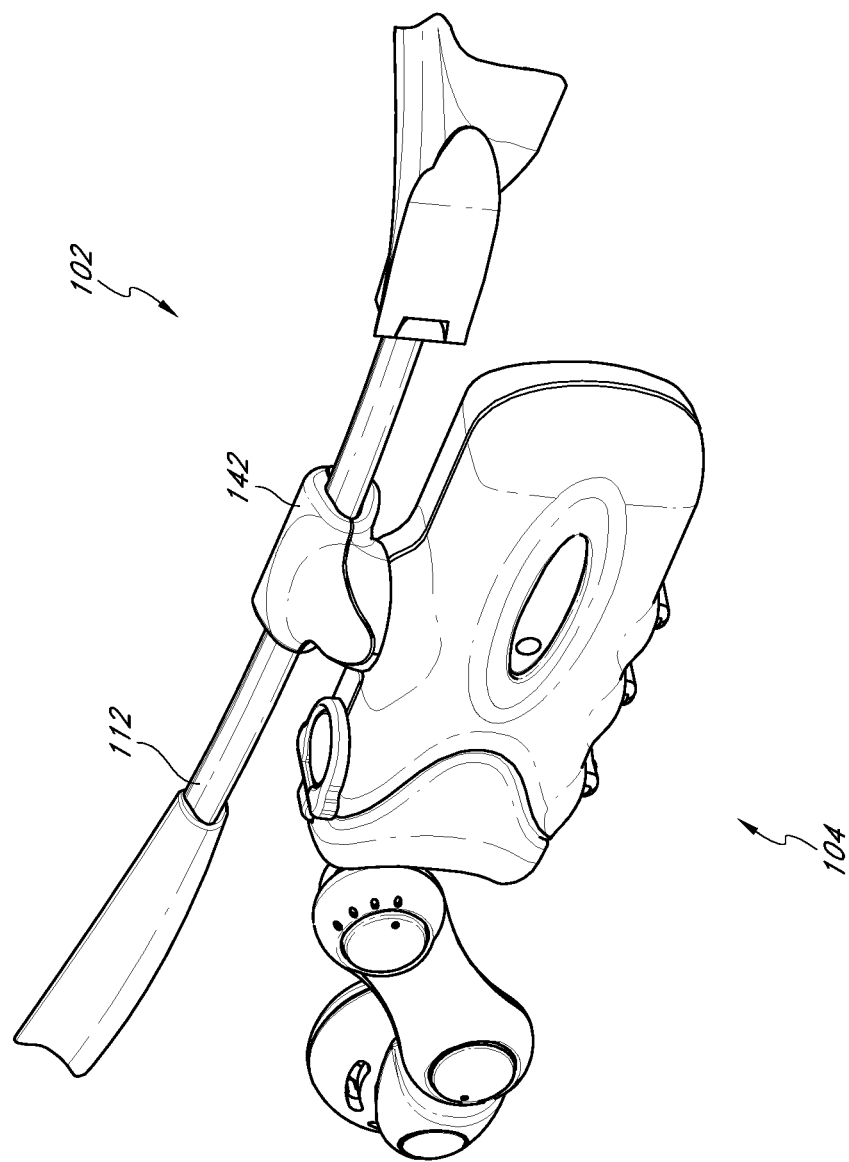
FIG. 25 through 28 show the reversibility of the detachable module of FIG. 5.
Figure 26:
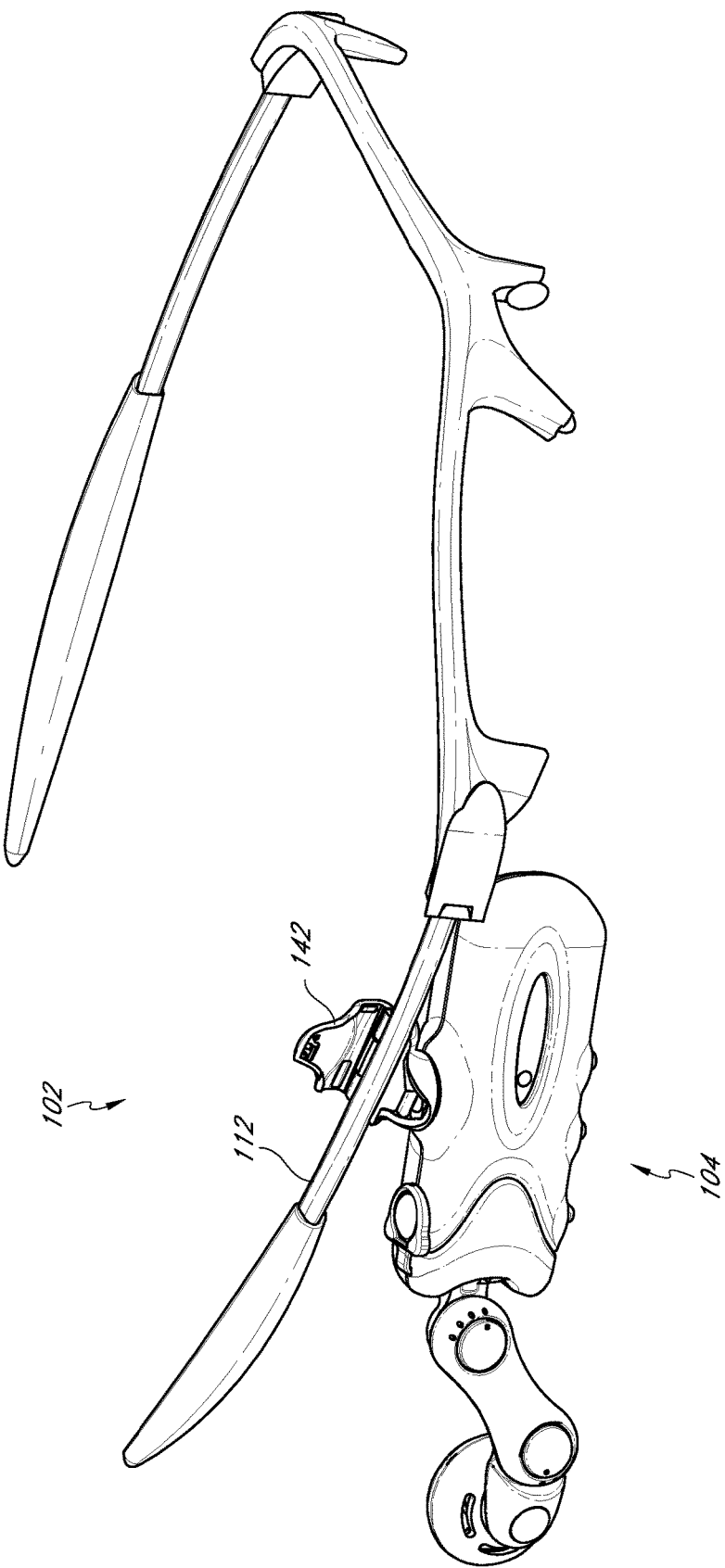
Figure 27:
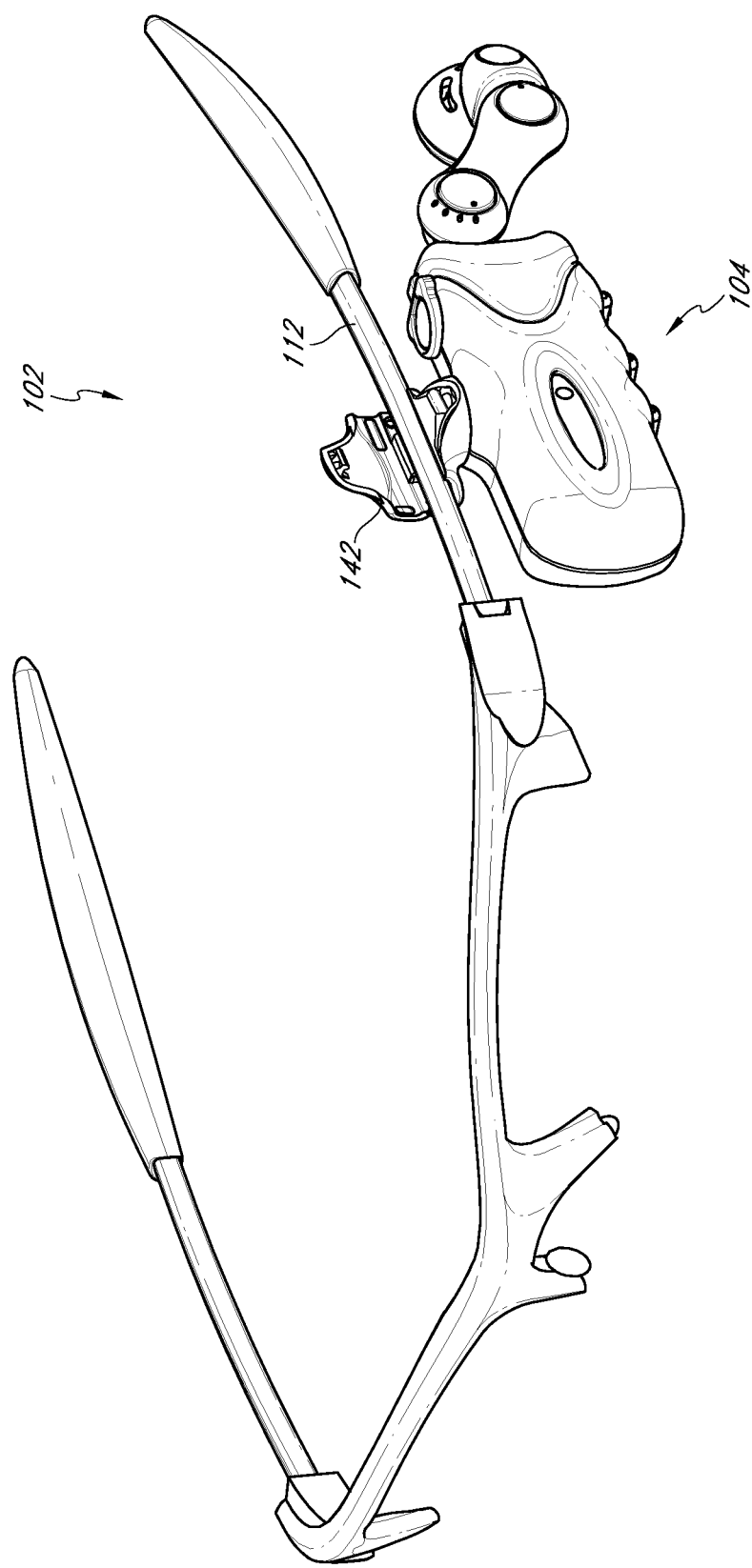
Figure 28:
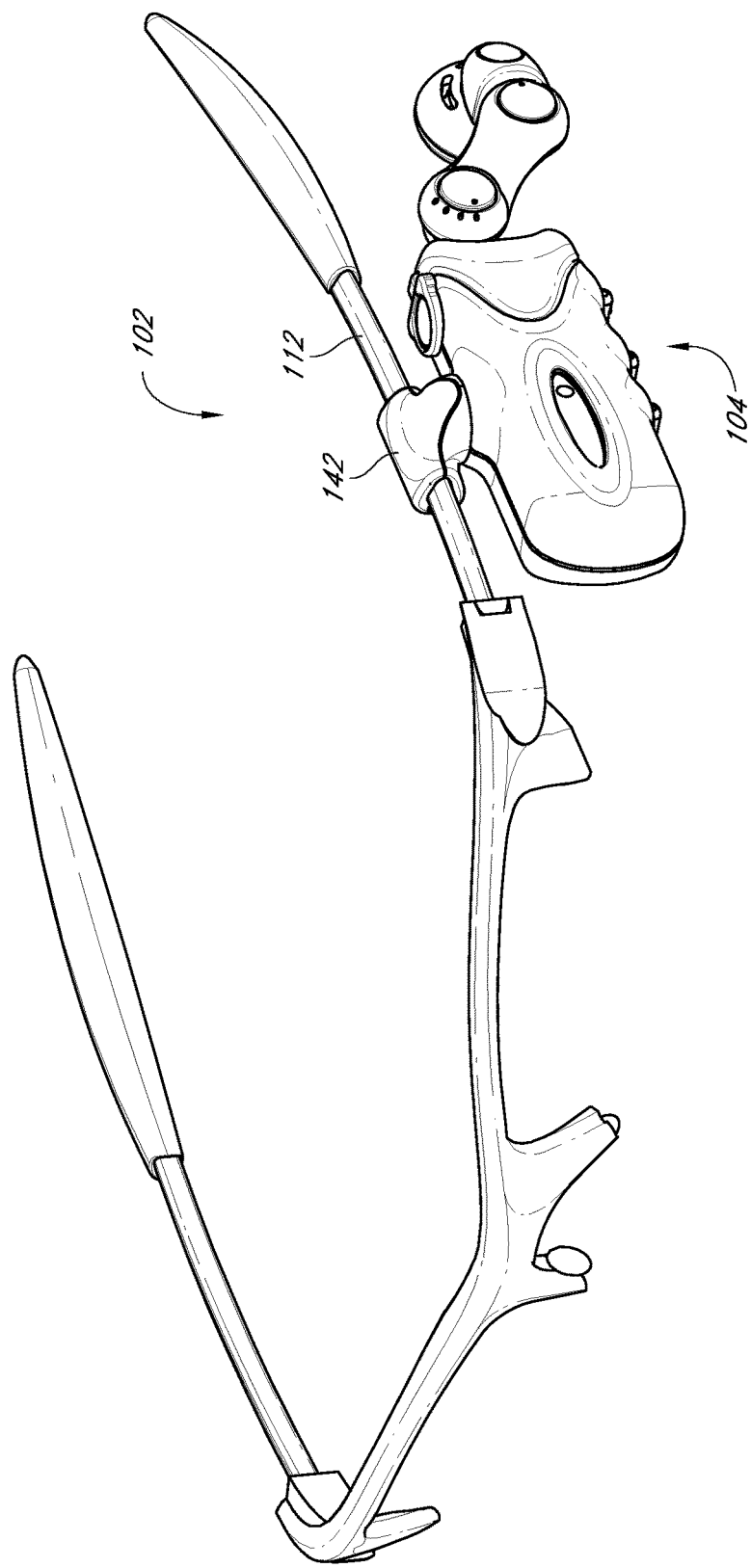

In FIG. 25 a detachable module 104 is shown coupled to the right earstem 112 of a support 102. The coupling 142 is in its closed position to secure the detachable module 104 to the earstem 112. In FIG. 26 the detachable module 104 has been rotated with respect to the earstem 112 to release the coupling 142. The coupling 142 is shown in its open position such that the detachable module 104 can be removed from the earstem 112. The detachable module 104 is then positioned with respect to the left earstem 112, as illustrated in FIG. 27. The speaker 144 has been rotated about the arm axis 230 so that its acoustical output will be directed towards the wearer's ear. Finally, as shown in FIG. 28, the coupling 142 is pinched closed to lock the detachable module 104 to the left earstem 112 of the support 102.

Figure 29:
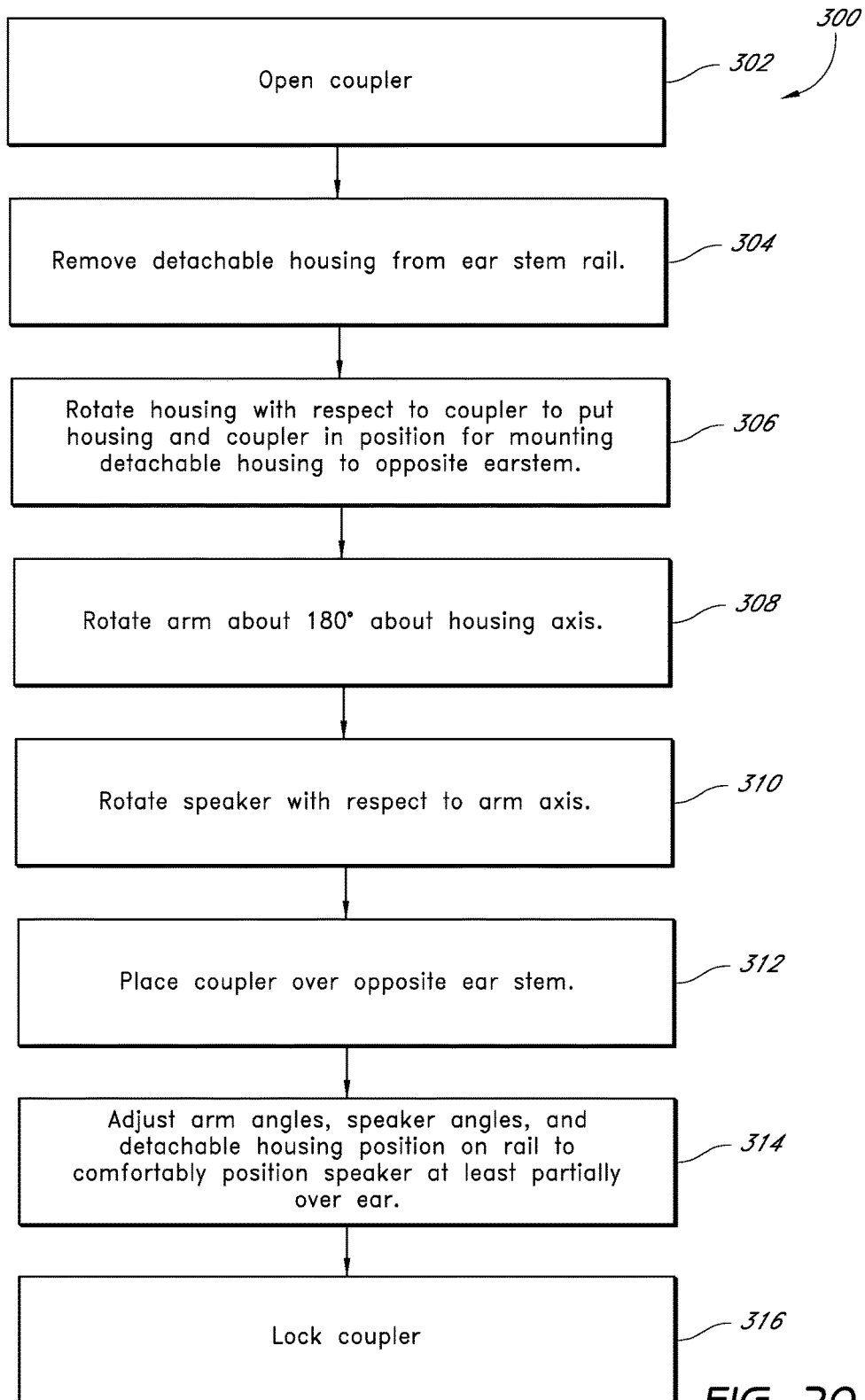
FIG. 29 is one embodiment of a method of moving a detachable module from one earstem of eyewear to the other.

One method 300 of moving a detachable module from one earstem to the other is shown in the flowchart of FIG. 29.

At block 302, the coupler of the detachable module is opened. At block 304, the detachable housing removed from the rail of the earstem. At block 306, the housing is rotated with respect to the coupler to put the housing and coupler in position for mounting the detachable housing to the opposite earstem. At block 308, the arm is rotated about 180 degrees about the housing axis. At block 310, the speaker is rotated with respect to the arm axis. At block 312, the coupler is placed over the opposite earstem. At block 314, the arm angles, speaker angles, and detachable housing position on the rail are adjusted to comfortably position the speaker at least partially over the ear. At block 316, the coupler is locked onto the opposite earstem rail.

Figure 30:
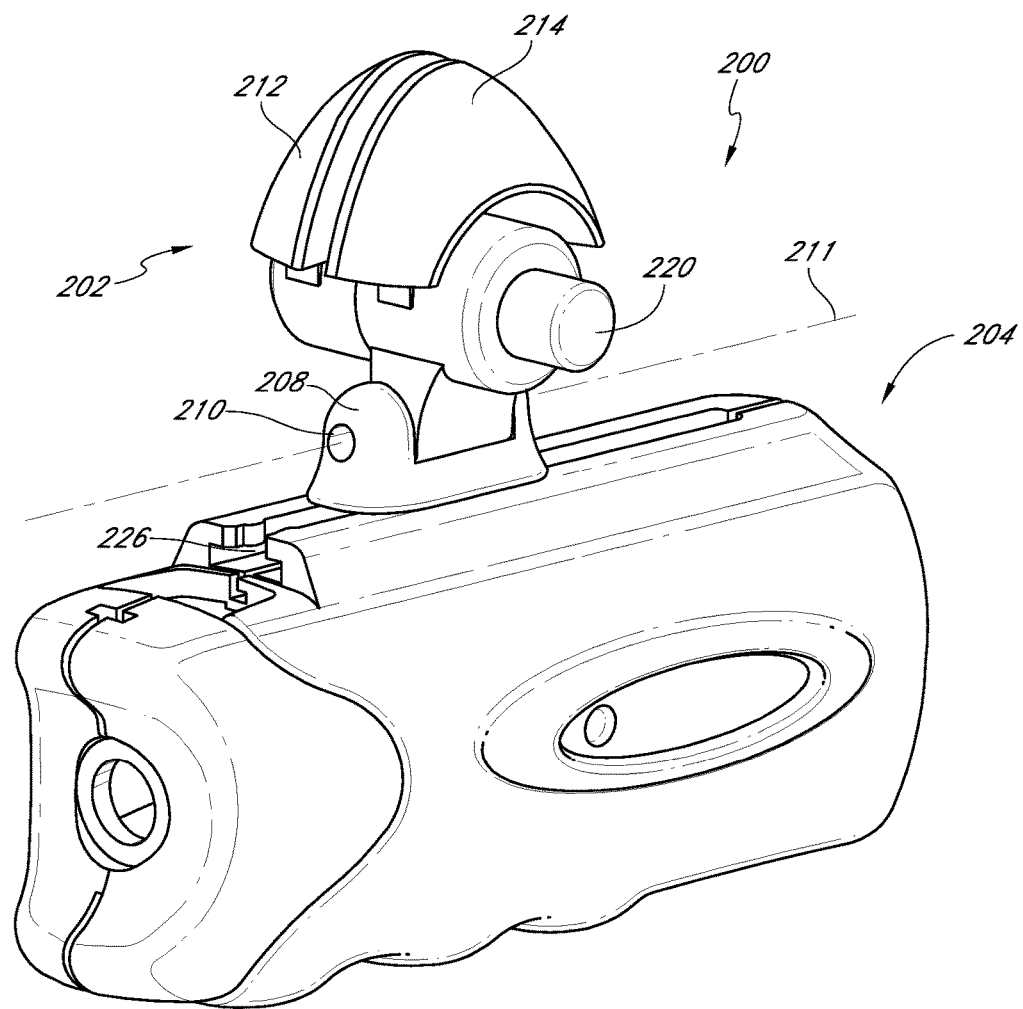
FIG. 30 shows a detachable module in accordance with another embodiment of the present invention.

Another embodiment of a detachable module 200 is illustrated in FIG. 30. The detachable module 200 includes a coupling 202 and a housing 204. The coupling 202 includes a clamp assembly 206 that is coupled to a slide 208 with a pin 210. The pin 210 has a longitudinal axis 211 about which the slide 208 may be rotated with respect to the clamp assembly 206. The detachable module 200 often also includes an articulating arm or a boom to which an audio input or output device is attached. For example, in some embodiments, the detachable module includes an articulating arm and a speaker, such as the articulating arm described below with respect to FIGS. 39A-41C.

Figure 31:
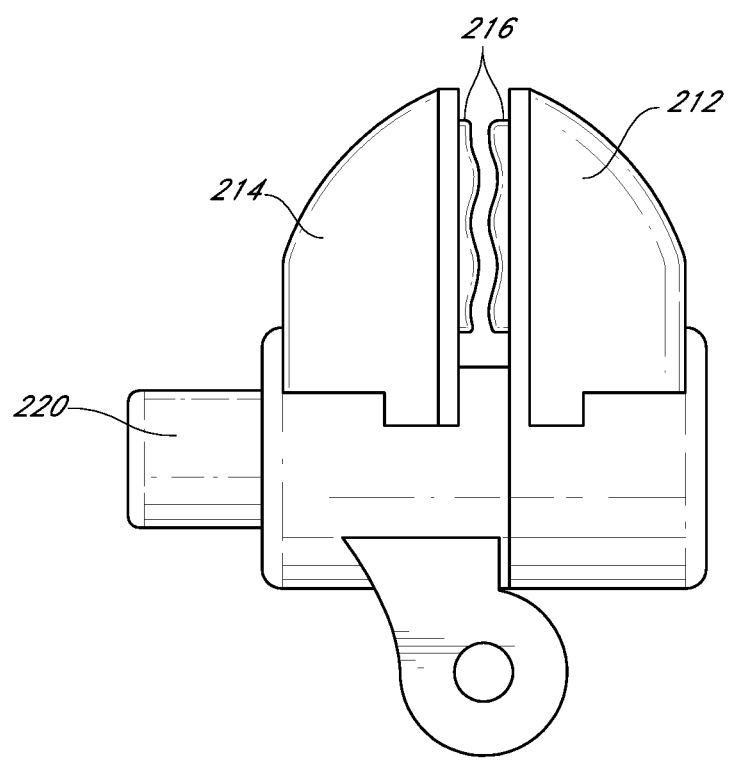
FIG. 31 is a side view of the clamp assembly of the detachable module of FIG. 30.

The clamp assembly 206 includes an inside grip 212, an outside grip 214, a resilient, conformable gripping pad 216 (such as best seen in FIG. 31), a spring 218, and a release 220. The release 220 can be any of a variety of structures to open the clamp assembly 206, including a button, lever, switch, tab, or knob. The clamp assembly 206 allows the detachable module 200 to be removably connected to any of a variety of structures, including the frame of a pair of eyeglasses. Many eyeglass frames have irregular, uneven, or non-uniform earstems, which makes it difficult to attach components to the eyeglasses. However, a universal clamp, such as the clamp assembly 206, allows the detachable module 200 to be removably connected to any of a variety of eyeglass frame structures, including those having irregular, uneven, and/or non-uniform earstems. Additional details regarding the coupling between the clamp assembly 206 of the detachable module 200 and an eyeglass frame are provided herein.

Figure 32:
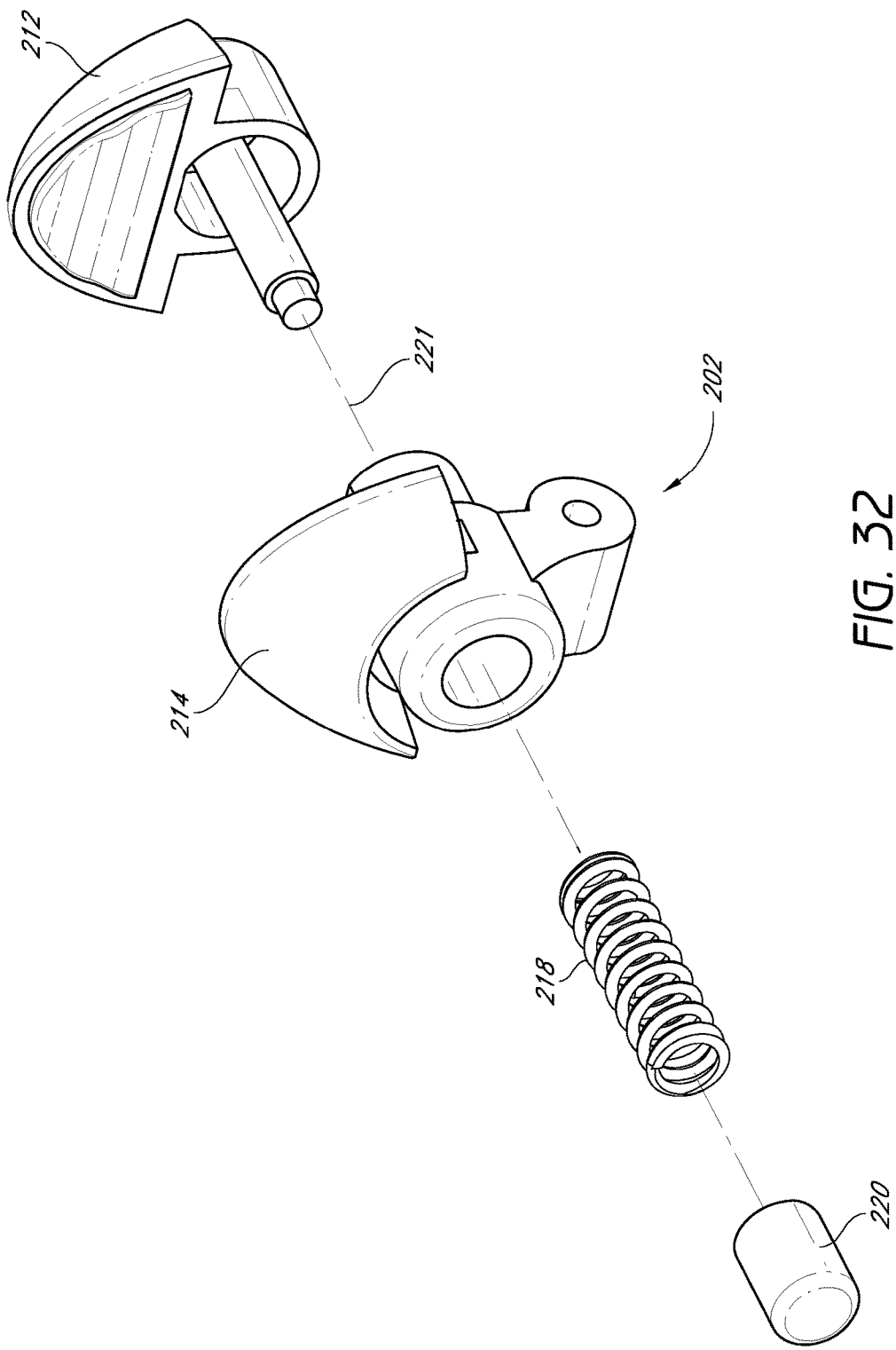
FIG. 32 is an exploded view of the clamp assembly of FIG. 31.

An exploded view of one embodiment of a clamp assembly 206 is illustrated in FIG. 32. The inside and outside grips 212, 214 of the clamp assembly 206 matingly engage each other over a clamp post 221. The clamp post 221 can include any of a variety of structures well known to those of skill in the art, including a Mattel pin. A spring 218 surrounds the clamp post 221. A release 220 is attached to the end of the clamp post 221 using any of a variety of methods, including pressing, gluing, welding, pinning, or screwing the release 220 to the clamp post 221. The release 220 prevents removal from the spring 218 from the clamp post 221 and allows the inside and outside grips 212, 214 to be separated apart from one another in order to release the detachable module 200 from the device to which it is attached, such as an eyeglass frame.

Figure 33A:
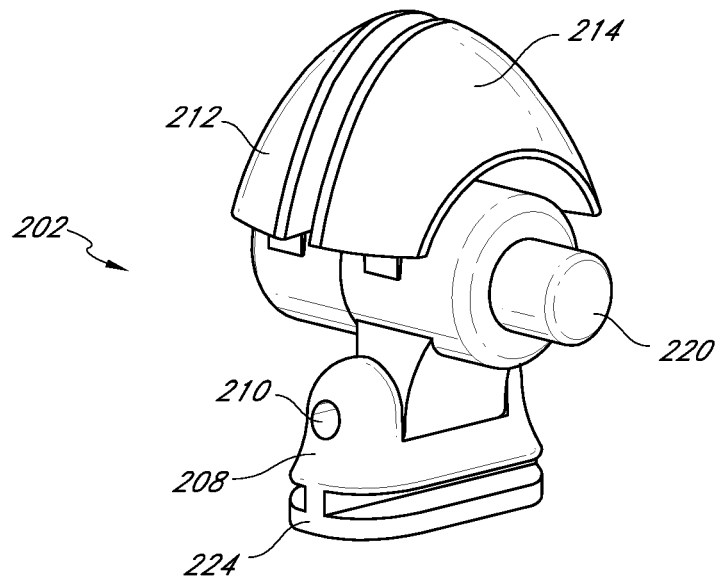
FIGS. 33A and 33B are perspective views of coupling assemblies including the clamp assembly of FIG. 31.
Figure 33B:
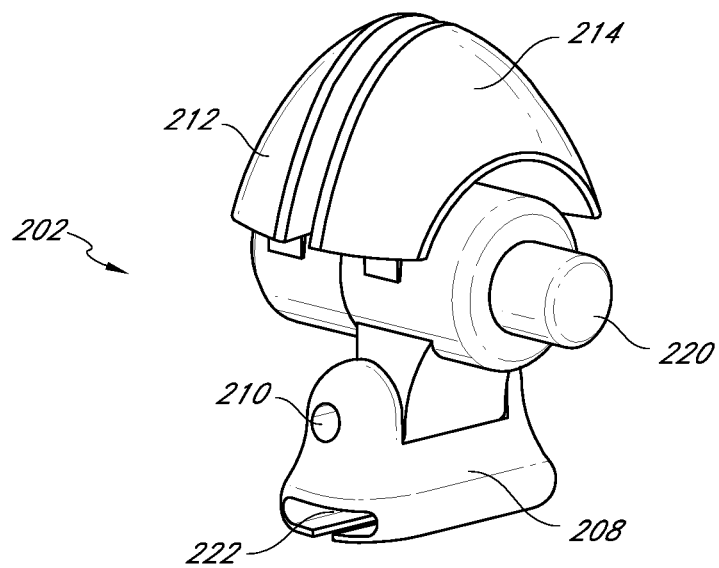
Figure 34A:
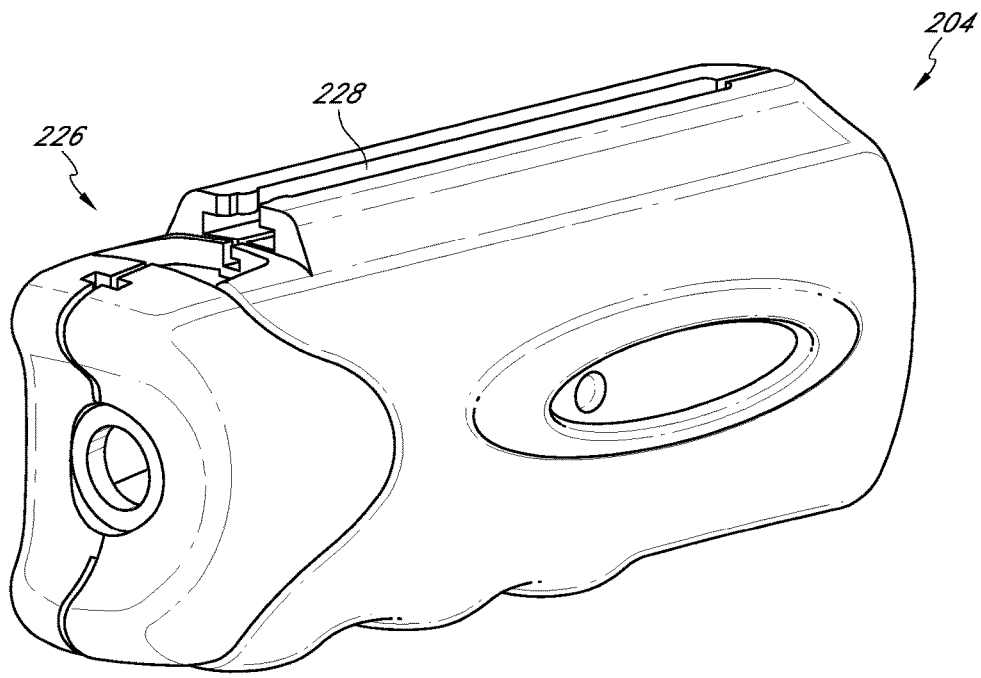
FIGS. 34A and 34B are perspective views of the housing of detachable modules suitable to be coupled with the coupling assemblies of FIGS. 33A and 33B, respectively.
Figure 34B:
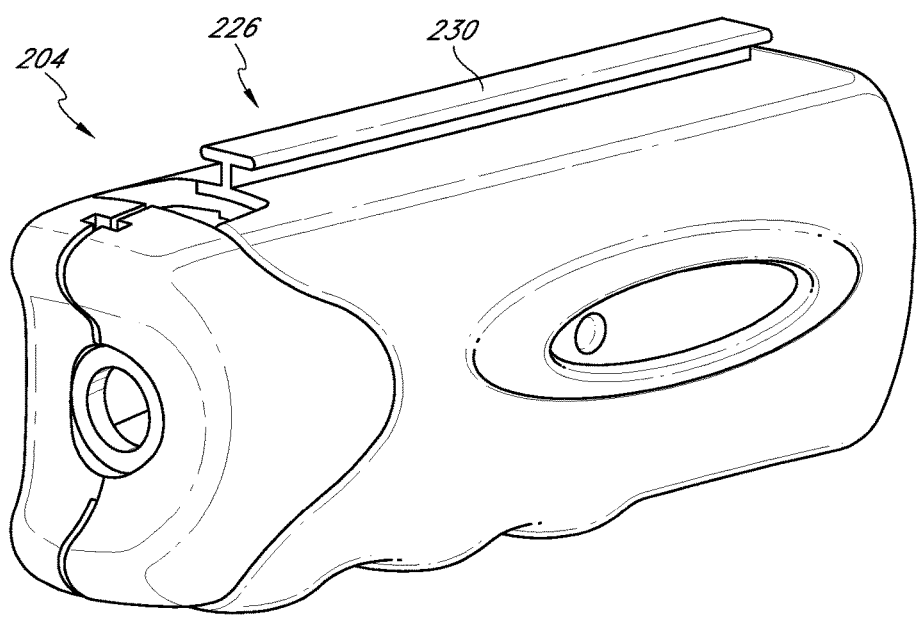

A coupling assembly 202 is formed by attaching the clamp assembly 206 to a slide 208, as illustrated in FIGS. 33A and 33B. The slide 208 can include a male member, such as a rail 222, or a female member, such as a track 224, as seen in FIGS. 33A and 33B, respectively. The slide 208 matingly engages a corresponding mating surface 226 on the housing 204 of the detachable module 200. For example, when a male slide 208, such as illustrated in FIG. 33A is selected, the mating surface 226 of the housing 204 can be a track 228, such as illustrated in FIG. 34A. Similarly, when a female slide 208 is selected, such as illustrated in FIG. 33B, the corresponding mating surface 226 of the housing 204 can be a rail 230, such as illustrated in FIG. 34B.

Figure 35:
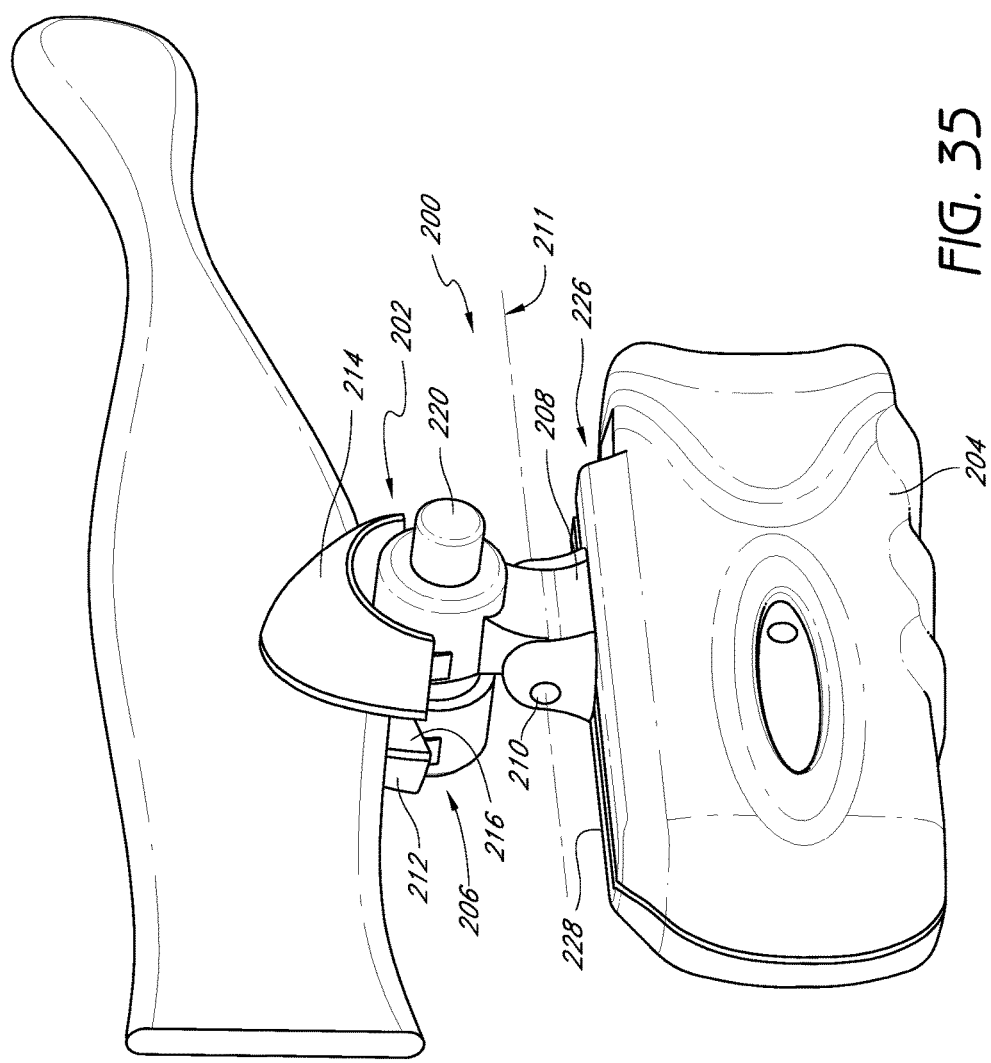
FIG. 35 is a perspective view of the detachable module of FIG. 30 attached to a support.
Figure 47:
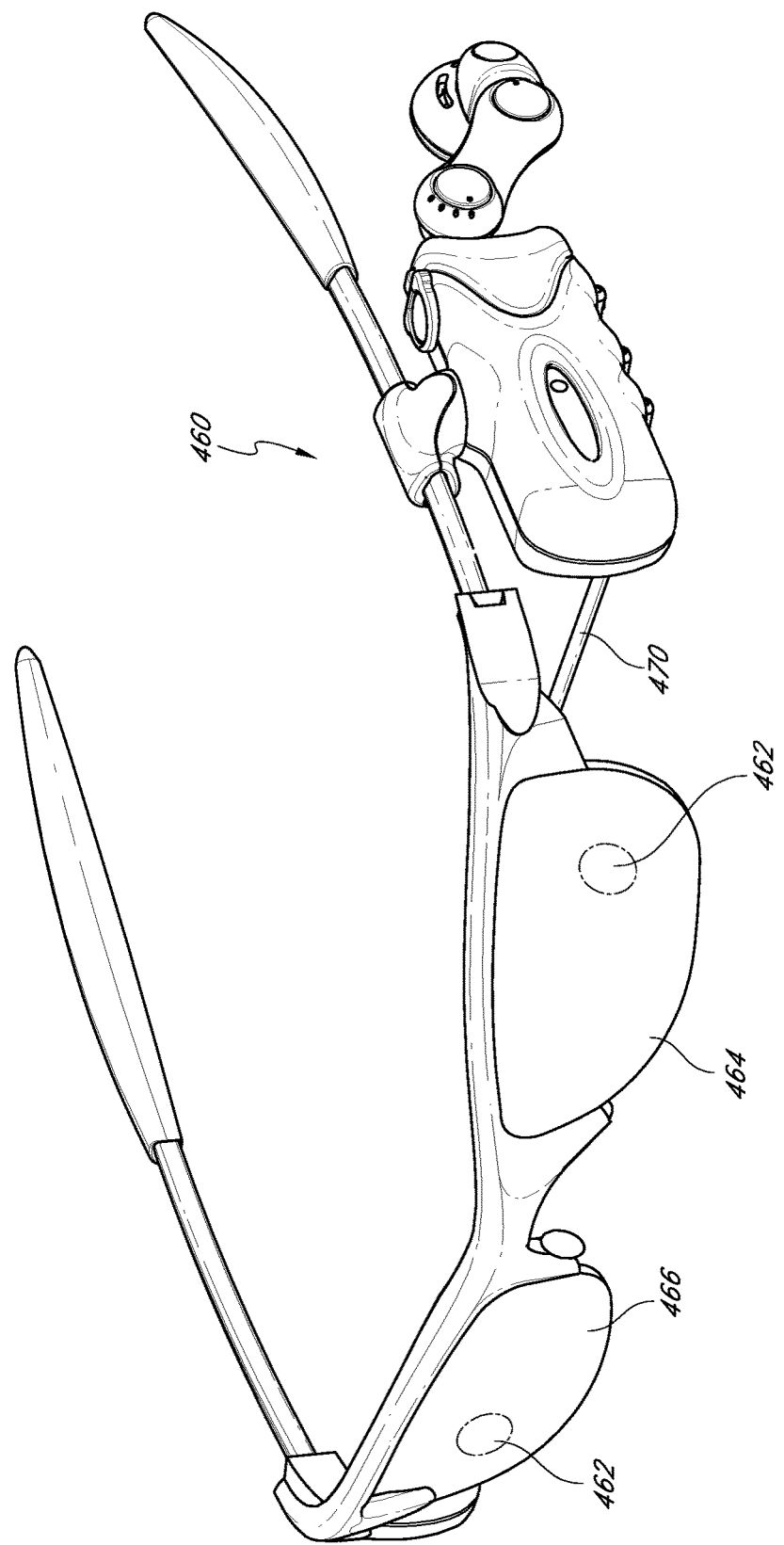
FIG. 47 is a perspective view of a support assembly having a heads-up display component, according to yet another embodiment.

The detachable module 200 can be attached to a support 232 as illustrated in FIG. 35. The support 232 can be any of a variety of wearable items, including a pair of eyeglasses, a hat, belt, ski goggles, etc. The coupling 202 is released by pressing on the release 220, which causes the inside grip 212 and outside grip 214 to separate and move apart from one another. When the inside and outside grips 212, 214 are separated, the coupling 202 can be positioned over the earstem 234 of a support 232. By squeezing the inside and outside grips 212, 214 together, the detachable module 200 can be secured to the earstem 234 of the support 232 as illustrated in FIG. 47. The coupling 202 can be secured to the support 232 in any of a variety of locations as desired by the wearer.

The configuration of the gripping pad 216 can facilitate connectivity between the detachable module 200 and any of a variety of surfaces or shapes of the support earstem 234. For example, the gripping pad 216 can be made from any of a variety of elastomeric materials, including foams, plastics, or any compliant material that can conform to the shape of the earstem 234 when the coupling 202 is attached thereto. In addition, the gripping pad 216 can have any of a variety of surface shapes and textures, including a flat surface, a wavy surface, a rippled surface, a contoured surface, etc. Gripping pads 216 having a contoured surface are illustrated in FIG. 31. In addition, the thickness of the gripping pad 216 can be selected to facilitate connectivity between the coupling 202 and the support 232. In one embodiment, the gripping pad 216 thickness is in the range of about 0.5 mm to 2 mm, about 1 mm to 3 mm, or about 3 mm thick.

An overmold may be provided on the mating surface 226 of the housing 204 to provide additional friction between the housing 204 and slide 208. Additional friction may be desired to prevent accidental or undesired movement of the housing 204 with respect to the slide 208. In addition, the mating surface 226 of the housing 204 can include a detent which prevents the slide 208 of the coupling 202 from unintentionally sliding off of or detaching from the housing 204.

Figure 36A:
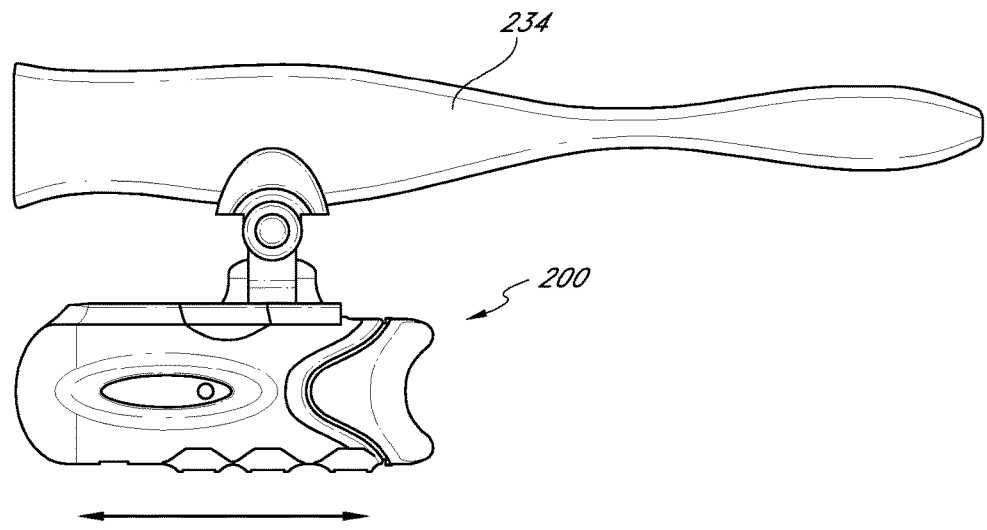
FIGS. 36A-37B are side views of the detachable module of FIG. 30 coupled to a support, showing an anterior-posterior range of motion and a vertical tilt range of motion.
Figure 36B:
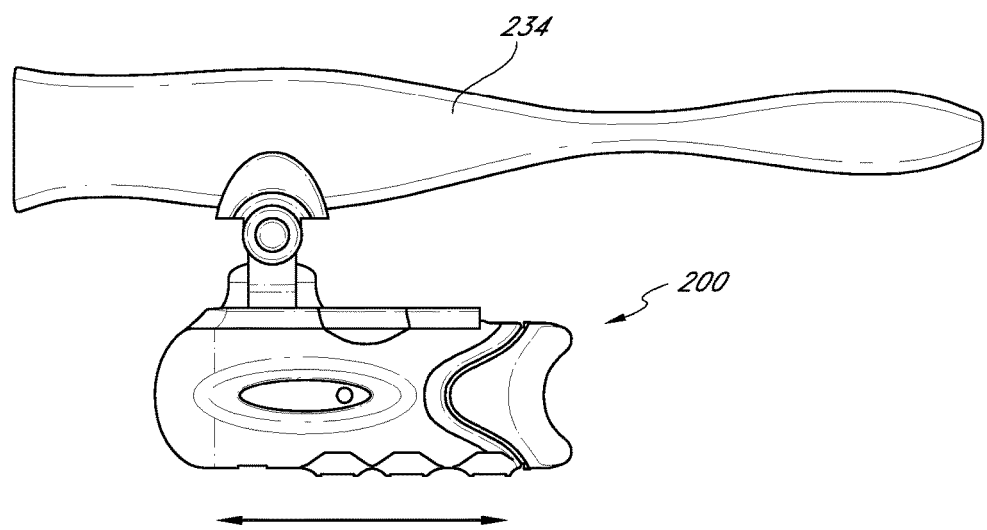

The coupling 202 of the detachable module 200 allows the detachable module 200 to be attached to any of a variety of locations on an eyewear on a support 232 frame. For example, in some embodiments, the support 232 includes a pair of eyeglasses having earstems 234 of a non-uniform shape. One example of such earstem 234 is illustrated in FIGS. 36A and 36B.

This ability to move to a variety of positions can allow the detachable module 200 to be adjusted or moved to a desired position in order to maximize the effectiveness of the heads-up display components, as discussed below.

The detachable module 200 can be moved in anterior and posterior directions with respect to the earstem 234 once the detachable module 200 is attached to the earstem 234. FIG. 36A shows the detachable module 200 moved in an anterior direction and FIG. 36B shows the detachable module 200 moved in a posterior direction. The anterior-posterior travel distance over which the detachable module 200 can be moved with respect to the earstem 234 can be defined by the length of the mating surface 226 of the housing 204 and the length of the slide 208 of the coupling 202. The travel distance is at least about 0.25 inches, generally at least about 0.75 inches and often at least about 1 inch or 1.5 inches or more. This travel distance, or adjustment length, can be selected to provide adjustability of the detachable module 200, not only with respect to the earstem 234, but also with respect to the wearer's ear. An articulating arm, or speaker boom (not shown), is often attached to the detachable module 200 and can include any of a variety of speaker mounts such as though described above or below.

Figure 37A:
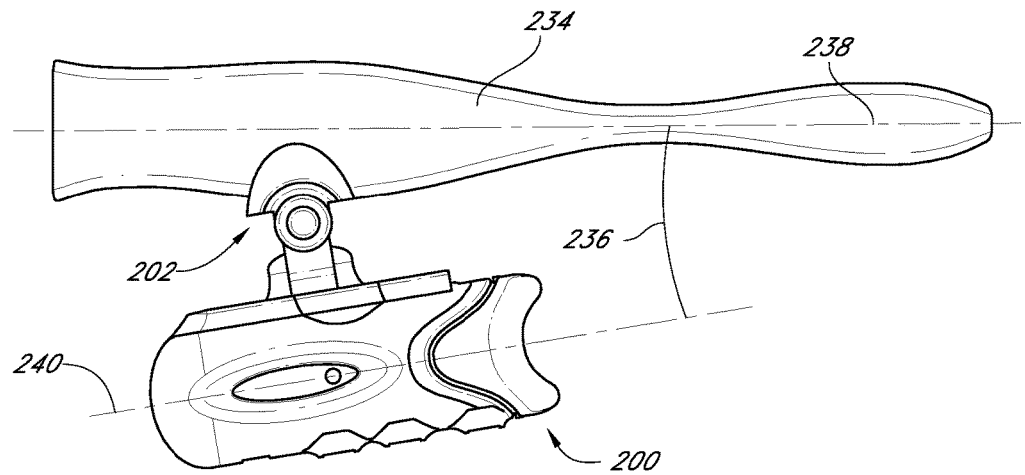
Figure 37B:
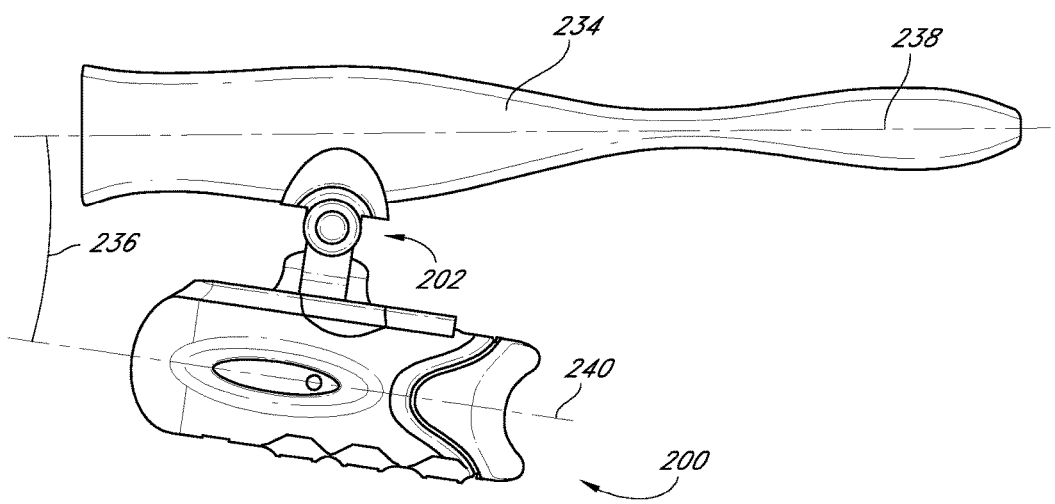

The angular orientation of the detachable module 200 with respect to the earstem 234 may be adjusted as well. For example, as illustrated in FIGS. 37A and 37B, the axial angle 236 formed between the earstem longitudinal axis 238 and the detachable module longitudinal axis 240 may be selected by adjusting the angular orientation of the coupling 202 with respect to the earstem 234 during attachment.

Figure 38A:
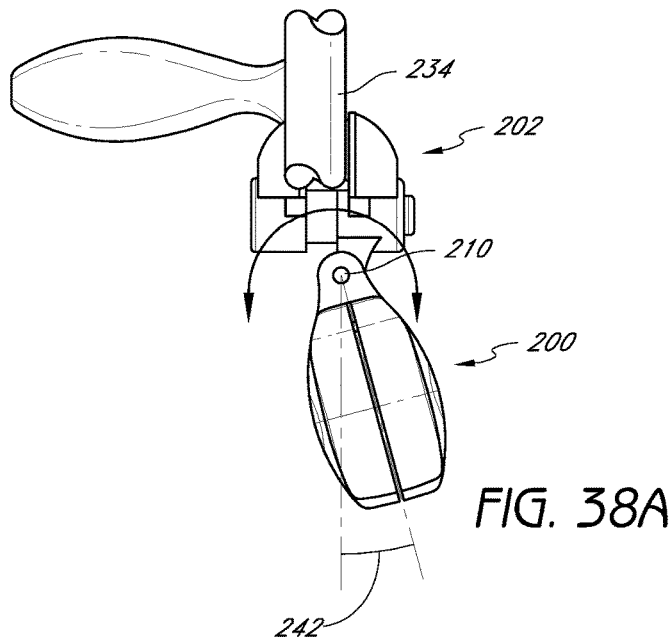
FIGS. 38A-38C are end views of the detachable module of FIG. 35 showing a lateral-medial direction tilt range of motion.
Figure 38B:
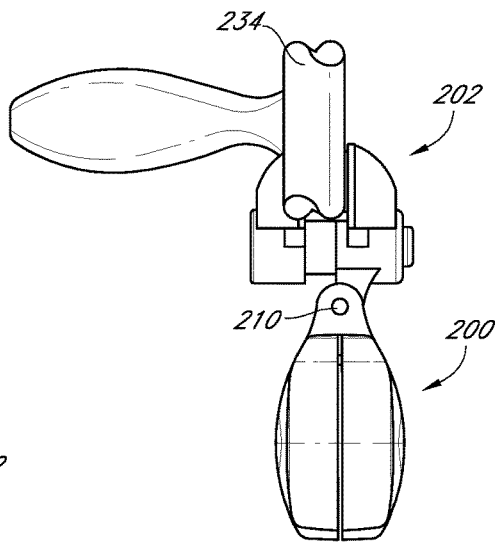
Figure 38C:
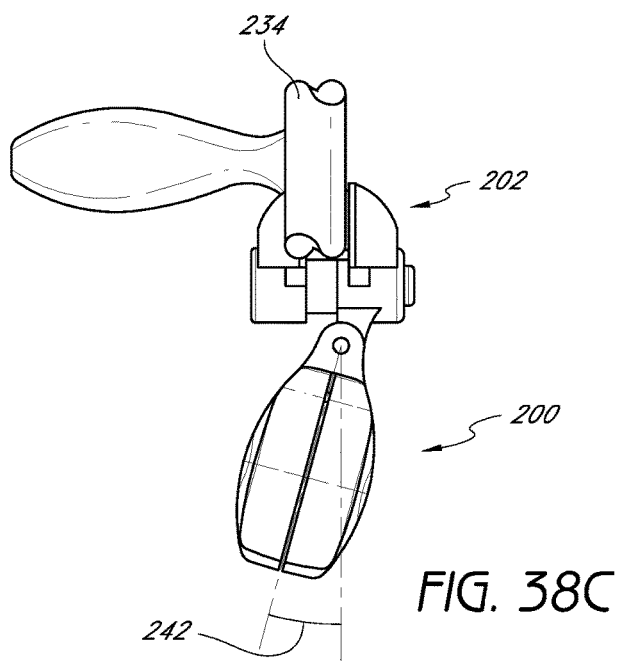

In addition, a tilt angle 242 in the medial-lateral direction can be selected by rotating the housing 204 of the detachable module 200 about an axis such as pin 210. The tilt angle 242, as illustrated in FIGS. 38A-38C, can be at least about plus ±5°, at least about ±10° to 20°, or greater.

Figure 39A:
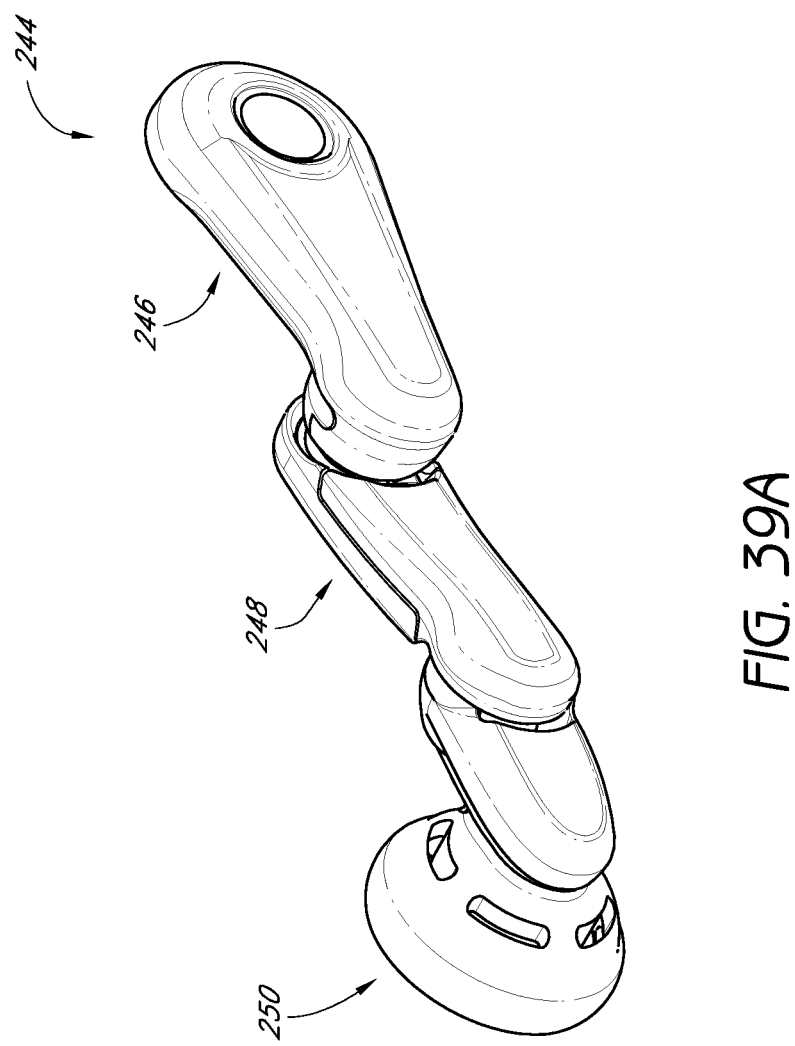
FIG. 39A is one embodiment of an articulating arm suitable to be connected to the detachable module of FIGS. 30-38C or directly to a pair of eyewear.
Figure 39B:
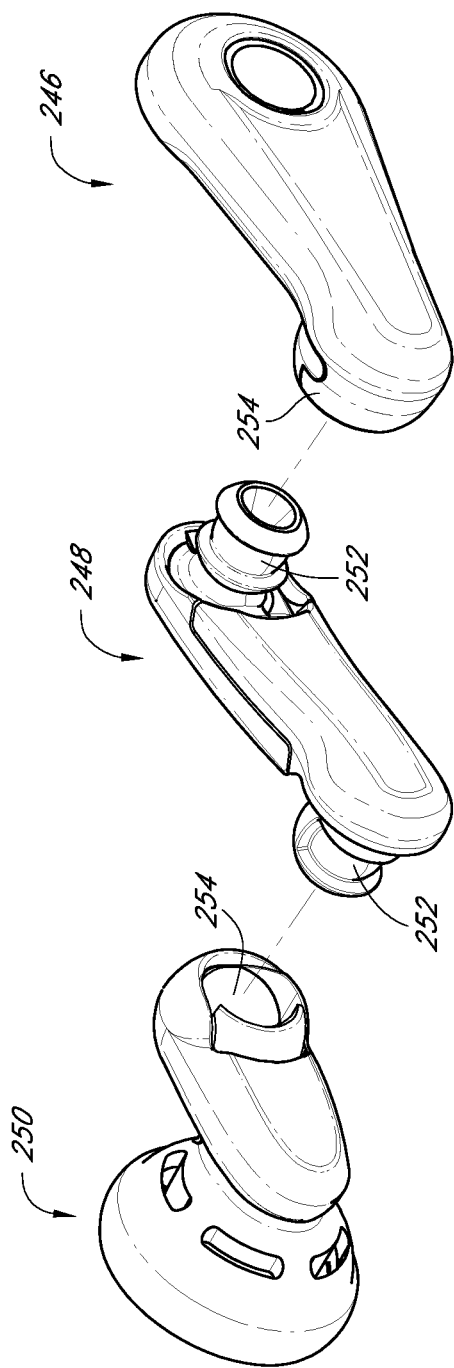
FIG. 39B is an exploded perspective view of the articulating arm of FIG. 39A.

In many embodiments, the detachable housing has an articulating arm 244 such as illustrated in FIGS. 39A and 39B. The articulating arm 244 provides an extension from the detachable housing onto which an electrical component, such as a speaker, may be mounted. For example, the articulating arm 244 can include a first segment 246, a second segment 248, and a third segment 250 that are connected to each other by any of a variety of couplings well known to those of skill in the art. For example, the coupling can be a ball 252 and socket 254 assembly, such as illustrated in FIG. 39B.

The first segment 246 is connected to a housing, such as any of the detachable housings described above, and the second segment 248. The second segment 248 is connected to the first and third segments 246, 250. The third segment 250 is connected at one end to the second segment 248 and at the other end to a speaker (not shown). A conductor or conductor pair (also not shown) extends from the speaker to the detachable housing.

Although the present embodiment describes an articulating arm 244 coupled to a detachable housing, it should be well understood by those of skill in the art that the articulating arm 244 may instead be attached directly to the earstem of a support, such as a pair of eyeglasses, a helmet, goggle straps or others. In such cases, electronic devices, such as MP3 players, cell phones, wireless transceivers, etc. can be embedded or mounted inside of the eyeglass frame instead of being carried by the detachable housing.

Figure 40:
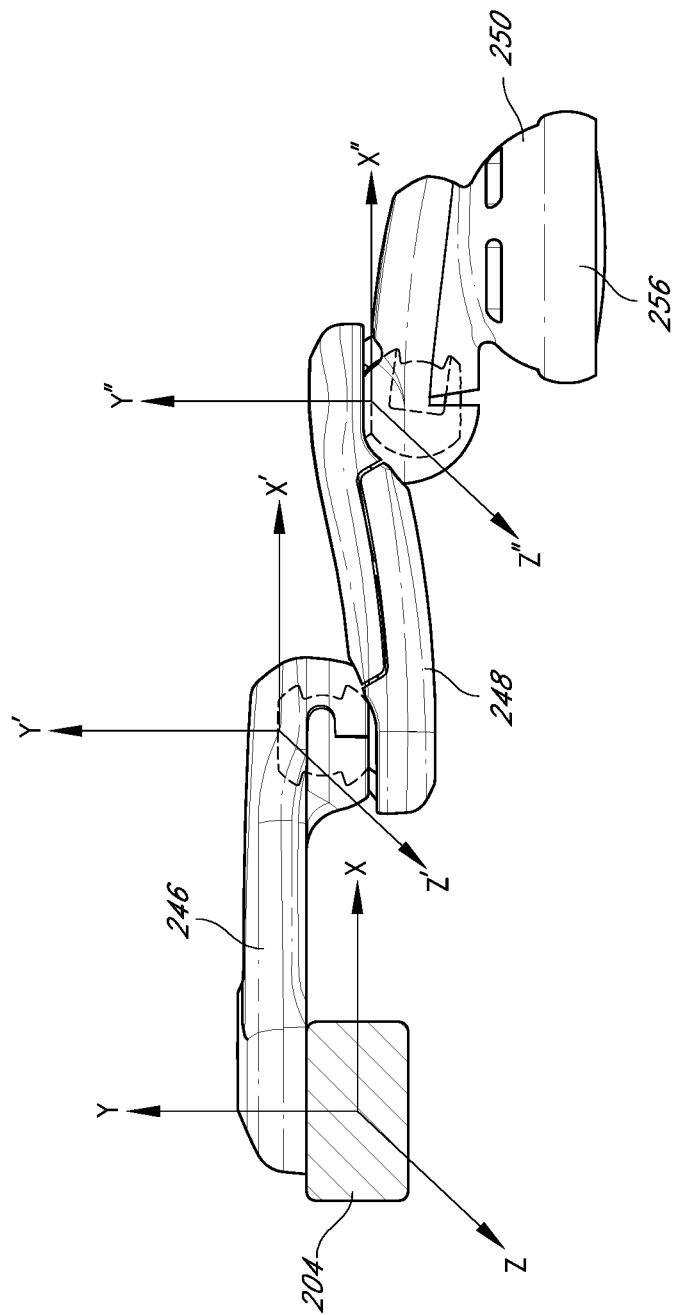
FIGS. 40-41C are side views of the articulating arm of FIG. 39A showing special adjustability of its multiple segments in a lateral-medial direction.

A side view of one embodiment of an articulating arm 244 is illustrated in FIG. 40. FIG. 40 illustrates one orientation of the various segments 246, 248, 250 of the articulating arm 244 with respect to the housing 204 of a detachable module 200. Although the articulating arm 244 is shown coupled to the housing 204 of a detachable module 200, the articulating arm 244 may alternatively be coupled directly to the earstem of a pair of eyeglasses, as discussed above.

Each of the first, second and third segments 246, 248, 250 have a longitudinal axis parallel to a reference axis x, x', x". Each of the reference axes x, x', x" defines one of three dimensions of a reference system for describing the orientation of the particular segment 246, 248, 250. In the illustrated embodiment, the x reference axis is parallel to the longitudinal axis of the first segment 246 and is also perpendicular to a z axis which can define the longitudinal axis of the housing 204 of the detachable module 200. A third axis y is perpendicular to both the x and z axes.

A second reference system includes an x' axis that is parallel to the longitudinal axis of the second segment 248 and which can be tangential to an outside surface of the second segment 248. Similarly, y' and z' reference axes are perpendicular to each other and the x' axis and are parallel to the y and y" axes when the x' axis is oriented parallel to the x axis.

In addition, an x" reference axis extends parallel to the longitudinal axis of the third segment 250 and is generally tangential to an exterior or an outside surface of the third segment 250. Similarly, y" and z" reference axes are perpendicular to each other and to the x" axis as well Like the reference systems described above, the y" axis is parallel to both the y and y' axes when the x" axis is oriented such that it is parallel to both the x and x' axes. Similarly, the z" axis is parallel to both the z and z' axes when the x" axis is oriented parallel to both the x and x' axes. This linear orientation of the articulating arm 244 is illustrated in FIG. 40 where all three reference axes, x, x', x", are oriented parallel to each other.

The articulating arm 244 can be manipulated in a variety of planes and moved and rotated in a variety of manners to change the distance and angular orientation between the housing 204 of the detachable module 200 and a speaker attached to the third segment 250 of the articulating arm 244. For example, in one embodiment, the first segment 246 of the articulating arm 244 can rotate freely about the y axis in the xz plane and is limited in its movement only by contact with the housing 204 of the detachable module 200 or by contact with the support 232 (not shown). The first segment 246 can generally rotate about 340°, about 300° to 350°, or at least 325° about the y axis. The second segment 248 can rotate about the y' axis freely, also generally limited only by contact with the housing 204 of the detachable module 200 or by contact with the support. In addition, the second segment 248 can tilt with respect to the x'z' plane. For example, in one embodiment, the second segment 248 can tilt +15°/−0° with respect to the x'z' plane. In other embodiments, the second segment 248 can tilt at least about ±5°, or about ±10° with respect to the x'z' plane.

The third segment 250 can rotate about the y" axis and is generally limited by the design of the ball 252 and socket 254 joint between the second and third segments 248, 250. In one embodiment, the third segment 250 can rotate about ±85° about the y" axis. In addition, the third segment 250 can tilt with respect to the x'z' plane. For example, in one embodiment, the third segment 250 tilts about +0°/−15°, about ±5°, or about ±10° with respect to the x"z" plane.

Figure 41A:
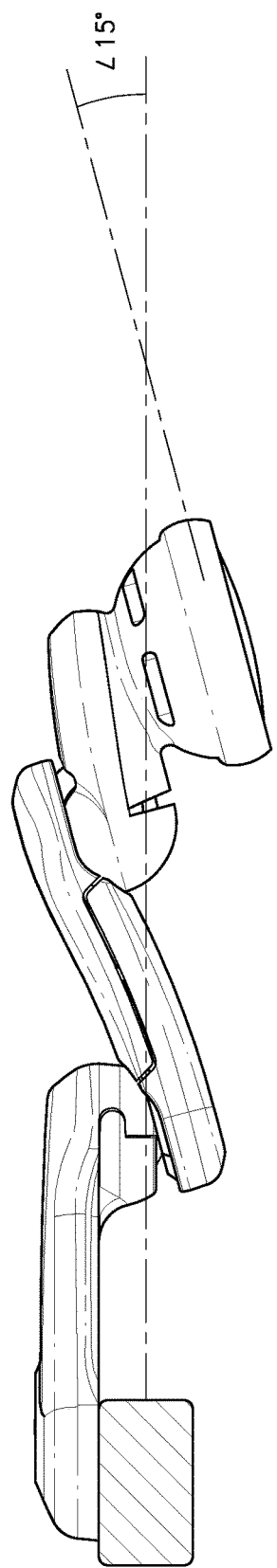
Figure 41B:
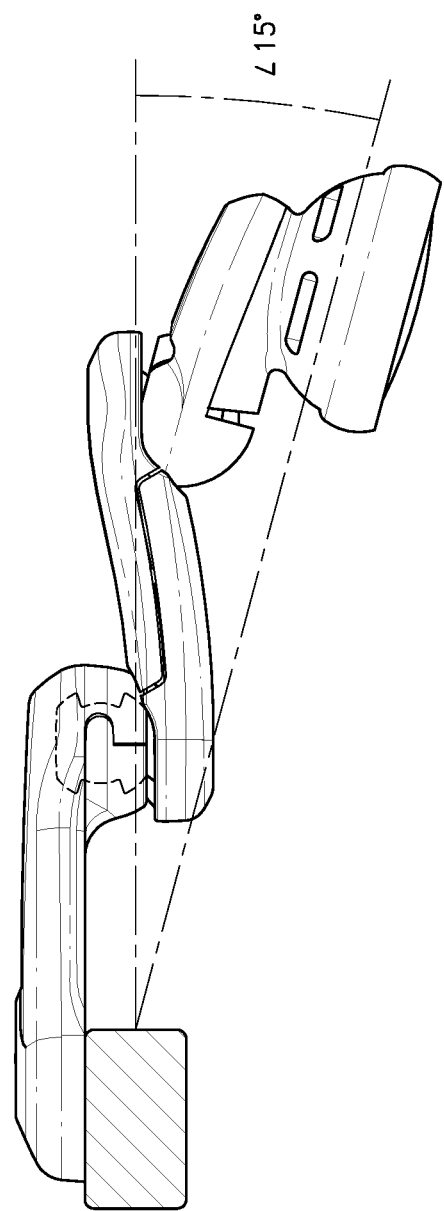
Figure 41C:
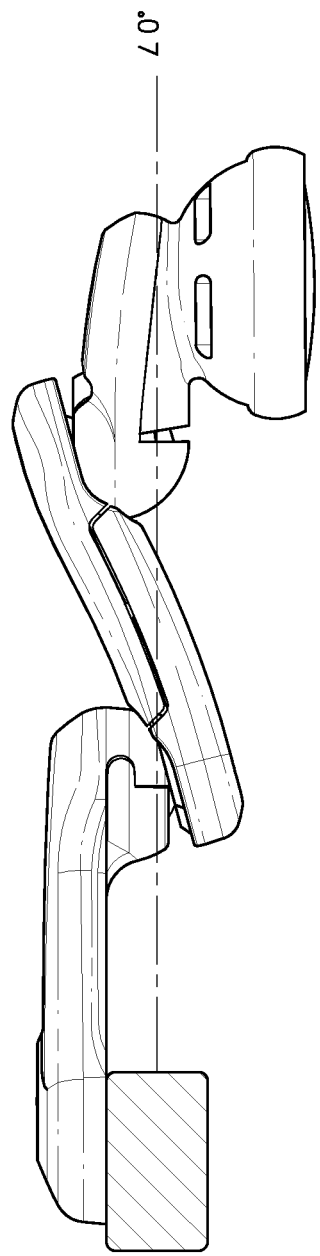

By selecting different angular orientations between the various segments, the angular orientation between the speaker 256 mounted on the third segment 250 of the articulating arm 244 with respect to the housing 204 of the detachable module 200 can be adjusted as well. Examples of such adjustments are illustrated in FIGS. 41A-41C. In FIG. 41A, the second segment 248 is tilted to an angle 151 which is its maximum positive angle with respect to the xz plane, and the third segment 250 is not tilted with respect to the x'z' plane. In such case, the tilt angle between the speaker 256 and the housing 204 is the same as the maximum positive tilt angle 153 of the second segment 248.

In FIG. 41B, the second segment 248 is not tilted, but the third segment 250 is tilted to an angle 153, which is the maximum negative angle with respect to the xz plane. In such case, the tilt angle 153 between the speaker 256 and the housing 204 is equal to the maximum negative tilt angle of the third segment 250.

Finally, in FIG. 41C, the second segment 248 is tilted to its maximum positive angle and the third segment 250 is tilted to its maximum negative angle with respect to the xz plane. In such case, the angle tilt will be equal to the difference between the max tilt angle of the second segment 248 and the maximum negative angle of the third segment 250. When the maximum positive tilt angle of the second segment 248 is equal to the maximum negative angle of the third segment 250, the speaker 256 will generally be oriented about parallel to the xz plane.

Figure 42:
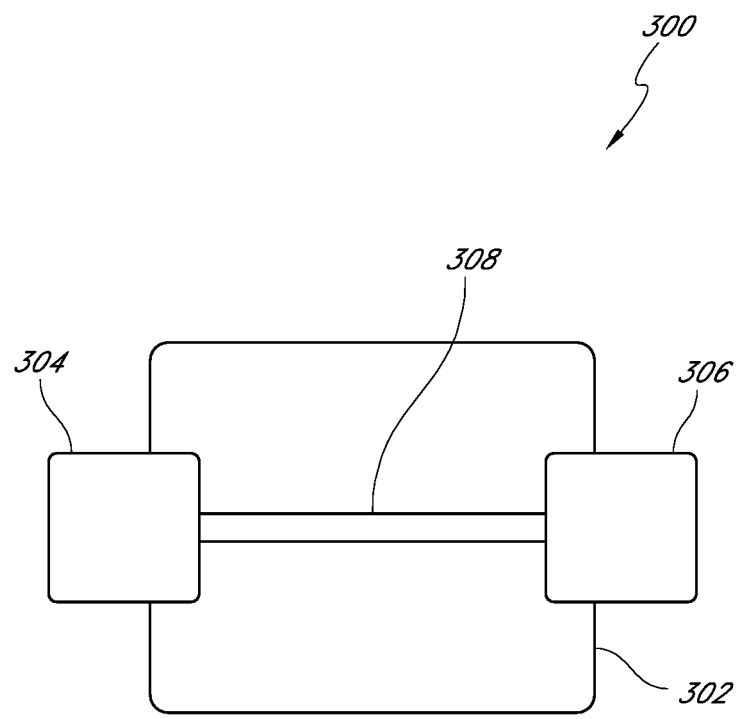
FIG. 42 is a schematic view of a support assembly in accordance with another embodiment of the present invention.

FIG. 42 shows a support assembly 300 in accordance with one embodiment of the present invention. The support assembly is generally any device able to be worn by a user that can carry one or more electronic components thereon. For example, the support assembly 300 can include an article of clothing, such as a hat, a shirt, a belt, jacket, helmet or a pair of eyewear such as goggles or eyeglasses.

The support assembly 300 generally includes a support 302, a first detachable module 304, and a second detachable module 306. The first and second detachable modules 304, 306 communicate with each other via a communication link 308. The detachable modules 304, 306 can be any of the detachable modules described herein. For example, the detachable modules 304, 306 can be a housing including electronics for an MP3 player, an audio storage device, a streaming audio signal receiver, a cellular telephone, a Bluetooth transceiver, or any other electrical device for providing audio or video input or output.

The support 302 is any structure able to be worn by the user such as, for example, a pair of eyeglasses. The communication link 308 is any wired or wireless link able to provide communication between two or more electrical components. For example, the communication link 308 can be a wired link, such as a flexible wire or a preformed wire, which may be permanently connected or unplugable at one or both of its ends. When the communication link 308 is a wire link, it may be unplugable at its ends so that it may be detached from each of the detachable modules 304, 306. The communication link 308 can be provided at any location with respect to the support 302. For example, the communication link 308 can include a wire or conductor located within and/or coupled to the support. For example, the communication link 308 can be a wire that hangs off the back of the support 302.

Figure 43:
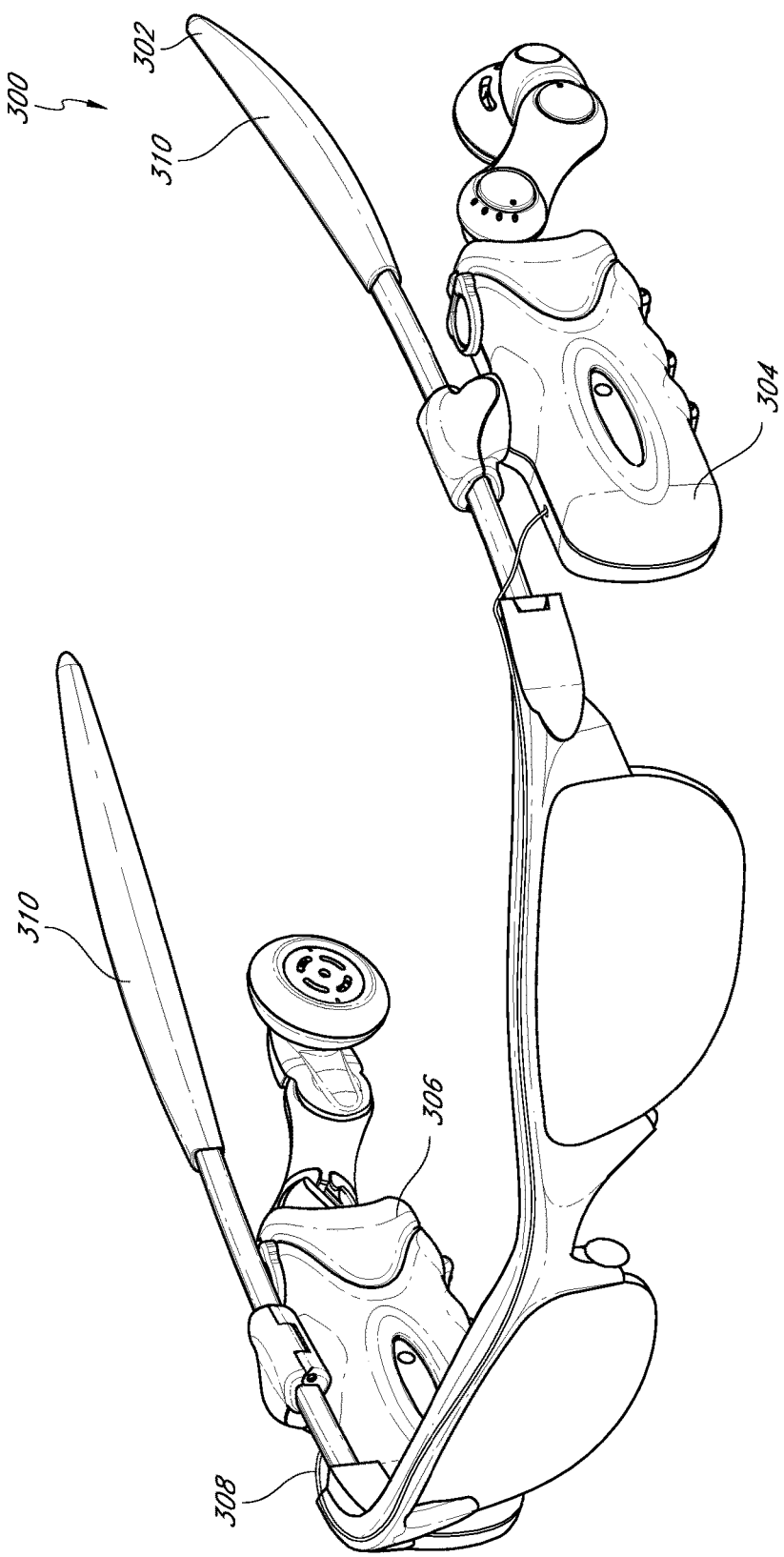
FIG. 43 is a perspective view of one specific embodiment of the support assembly of FIG. 42.

FIG. 43 illustrates one specific embodiment of the support assembly 300. In the illustrated embodiment, the support assembly 300 includes a pair of eyeglasses as the support 302. First and second detachable modules 304, 306 are attached to each of the first and second earstems 310, respectively, of the support 302. The detachable modules 304, 306 are coupled to each other with a wired communication link 308 that in the illustrated embodiment runs along the frame of the support 302. In one embodiment, the communication link 308 spans or traverses a nose bridge formed between the orbitals of the support 302.

The detachable modules 304, 306, as described herein, can include any of a variety of electrical components. In some embodiments, the detachable modules 304, 306 include different components. For example, in one embodiment, the first detachable module 304 carries a cellular telephone, and the second detachable module carries an MP3 player. Alternatively, the first detachable module 304 can include an RF (e.g., Bluetooth) transceiver adapted to communicate with another Bluetooth device, such as a Bluetooth-enabled telephone, and the second detachable module 306 can include an MP3 player or any other audio or video input or output device. In yet another embodiment, both the first and second detachable modules 304, 306 include Bluetooth transceivers and/or both include cellular telephones. It will be apparent to those of skill in the art that the support assembly 300 can therefore provide either dual mono or stereo audio for devices, such as telephones, that have historically provided only single-channel audio signals.

Although the support assemblies 300 are shown in FIG. 43 as having detachable modules 304, 306, in other embodiments, the electronic circuitry of the detachable modules 304, 306 is mounted inside of the support 302 itself. For example, in some embodiments, the electronic devices are mounted inside of the support 302 and the articulated arm described and an articulated arm that is coupled to a speaker is mounted to the support 302 as well. In other embodiments, the electronic components are mounted inside of the articulated arm itself and not inside the articulated arm. In other embodiments, the electronic components are provided inside of the arm and the arm is removably attached to the frame or is removably attached to the support 302. Finally, in yet other embodiments, such as the embodiment illustrated in FIG. 43, the electronic components are provided inside of removable modules 304, 306 which are removably attached to the support 302. In such cases, the detachable modules 304, 306 also include articulating arms, such as described herein. Examples of support assemblies having electronic circuitry mounted within the support itself are taught in U.S. application Ser. No. 10/993,217, filed Nov. 19, 2004 and U.S. application Ser. No. 11/022,367, filed Dec. 22, 2004, which are incorporated by reference herein.

The support assembly 300 can be configured such that the first and second detachable modules 304, 306 each individually communicate with a cellular telephone. For example, each of the first and second detachable modules 304, 306 can each include a Bluetooth transceiver adapted to communicate via the Bluetooth protocol with a cellular telephone, or with more than one cellular telephone. Alternatively, in other embodiments, the first detachable module 304 includes a wireless Bluetooth transceiver adapted to communicate with a cellular telephone, and the second detachable module 306 includes the mechanical and electrical components for supporting and positioning and powering a speaker that is in communication with the electronics of the first detachable module 304. In such case, communication from the cellular telephone is received by the first detachable module 304 and audio signals are provided to a user's first ear by a speaker coupled to the first detachable module 304 and audio signals from the cellular telephone are provided to the wearer's second ear via a speaker coupled to the second detachable module 306 that is in communication with the first detachable module 304.

The support assembly 300 of the present inventions can include any of a variety of additional features for improving and enhancing usability by a wearer. For example, the support assembly 300 can include software that provides the wearer with oral and/or visual popdown-type menus for navigating through the multitude of commands that may be available. For example, by providing voice control over system functionality, the user need not manipulate mechanical buttons, switches or controls on the support assembly 300 in order to select different support assembly communication, audio, video functions. Further, providing visual or video illustration of system commands and status can aid the wearer in navigating and operating the assembly.

In addition, the support assembly 300 can include noise cancellation hardware and/or software to reduce or eliminate noise provided to the wearer of the support assembly 300 during use and communication. In addition, in some embodiments, the support assembly 300 includes a bone conduction microphone to transfer audio information from the wearer. These features are well known to those of skill in the art.

As discussed above, the detachable module can house electronics such as those for an MP3 player, an audio storage device, a streaming audio signal receiver, a cellular telephone, a Bluetooth transceiver, or any other electrical device for providing audio or video input or output, such as an audio recorder, a speaker, a camera, video recorder, video player, and/or video display. These features can be integrated into the player individually or in combination or collectively to provide multi-function capability. Further, the module can provide wireless connectivity with one or more remote devices to stream data to or from the remote device(s).

In some embodiments, the module can comprise visual display and/or optical components. These components can include a display such as a liquid crystal display (LCD), a plasma display, a semiconductor device (LD), a light-emitting diode (LED), an organic light emitting diode (OLED), active OLED, AMOLED, super AMOLED, a projector, direct retinal projection through virtual retinal display (VRD) or retinal scan display (RSD) using a retinal projector (RP), micro-electro-mechanical systems display, an electroluminescence (EL), a cathode ray tube (CRT), a digital micromirror device (DMD), prism(s), lens(es), fiber-optic transmission component(s), mirror(s), a holographic optical element (HOE), laser projection, 3D display components or circuitry, or another emissive, transmissive, or reflective display technology, or the like is preferably used. The system can produce real or virtual images for user perception. Further, the system can provide augmented visuals of natural objects perceived by the user.

The viewing plane for the system can be on a lens of the eyewear (goggles or eyeglasses) or spaced from the lens (either in front or behind the lens). The viewing plane can be real or virtual. Further, the system and/or eyewear can also comprise variable light attenuation features (e.g. electronic variable light attenuation) in the lens(es) or otherwise to enhance video display perception. The viewing plane can incorporate one or more display and/or light attenuation components.

For example, various such video input and output devices, components, circuitry, methods, and structures are disclosed in the following U.S. Patent and Publication Nos. and can be incorporated into embodiments of the system disclosed herein: U.S. Publication No. 2005/0219152 (disclosing a microdisplay with virtual image and an adjustable boom), U.S. Publication No. 2009/0015929 (disclosing a substrate guided relay), U.S. Publication No. 2010/0111472 (disclosing a substrate guided relay), U.S. Publication No. 2010/0053591 (disclosing image projection technology), U.S. Publication No. 2009/0180195 (disclosing heads-up display and imaging systems), U.S. Publication No. 2011/0043644 (disclosing devices and methods for providing localized image enhancements in a heads-up display), U.S. Pat. No. 7,740,353 (disclosing a direct retinal projection heads-up display), U.S. Pat. No. 7,639,209 (disclosing structures and methods related to retinal projection), U.S. Pat. No. 7,631,968 (disclosing devices for heads-up displays), U.S. Pat. No. 7,249,846 (disclosing a heads-up display device), U.S. Pat. No. 7,192,137 (disclosing heads-up display devices), U.S. Pat. No. 7,158,096 (disclosing heads-up display and transmission devices), U.S. Pat. No. 7,023,621 (disclosing images superimposed on field of view), U.S. Pat. No. 5,369,415 (disclosing direct retinal projection), U.S. Pat. No. 5,596,339 (disclosing retinal display using a fiber optic point source), the entireties of each of which are incorporated herein by reference.

Referring now to FIGS. 44-49, various eyewear are illustrated in which embodiments of the system are utilized to provide a heads-up display. The above discussion of the interchangeability, articulation, and structure(s) of above-noted embodiments of the module will not be repeated here for brevity, but further embodiments discussed in FIGS. 44-49 will be understood to be capable of providing the interchangeability, articulation, and structure(s) of those embodiments discussed above. Thus, in some embodiments, a module having a mechanical clamp can be provided with visual display capabilities. Further, in some embodiments the module can be adjustable in three dimensions (XYZ adjustability) to adjust a position of a heads-up display device. Further, in any of the embodiments discussed herein, a heads-up display can comprise one or more display units or devices to provide visual information for one or both eyes of the wearer, whether the eyewear comprises a unitary or dual lens system.

Further, the module can include one or more articulation mechanisms, such as an articulating arm, to allow adjustable positioning of a visual display device and/or and earphone relative to the module. Thus, some embodiments of the modules can incorporate audio or video input or output devices that can be manually adjustable to allow the user fine adjustment to optimize the position of an audio or visual input or output of the module(s).

Figure 44:
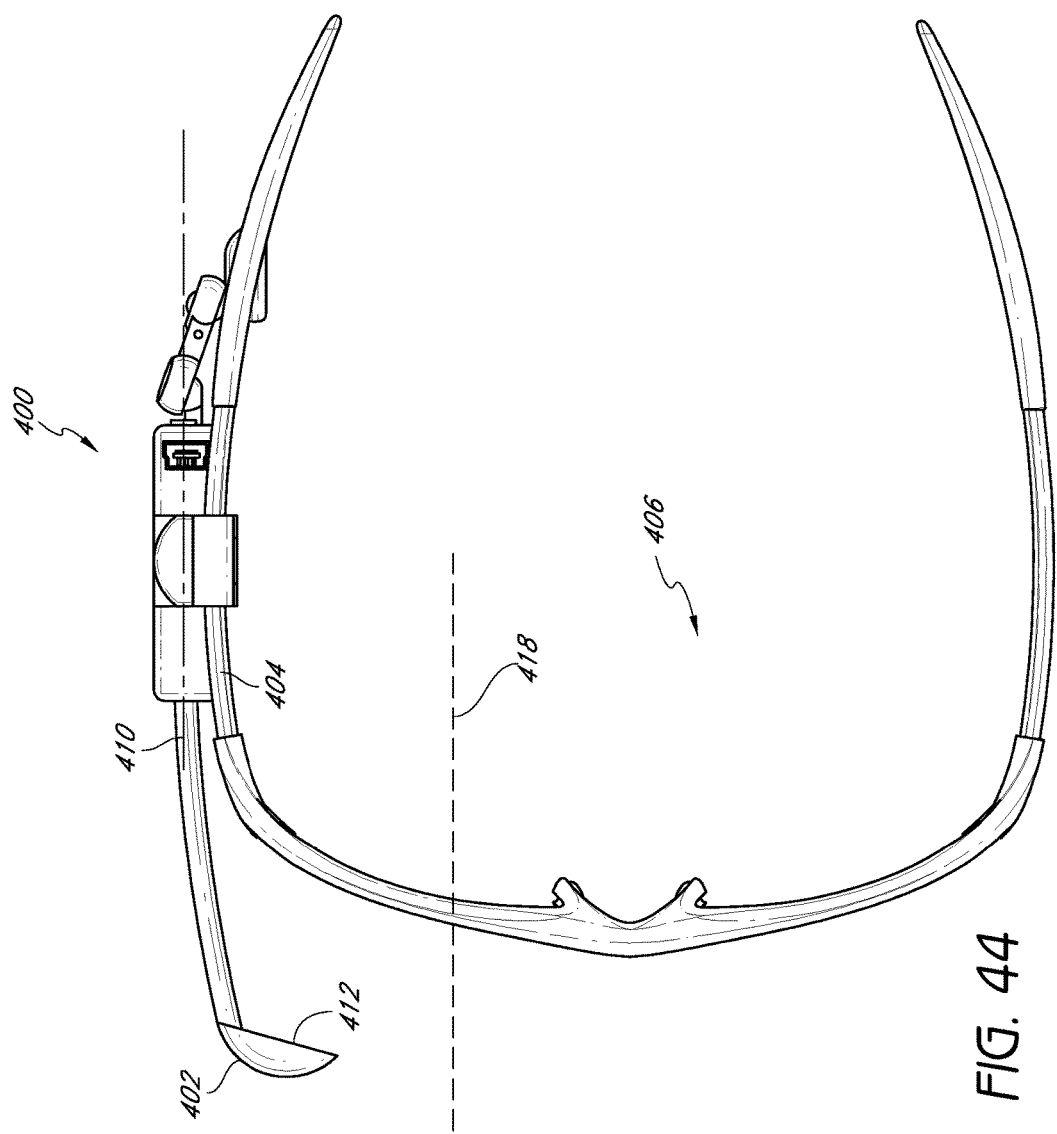
FIG. 44 is a top view of a support assembly having a heads-up display component, according to an embodiment.

For example, in FIG. 44, an embodiment of a module 400 incorporating a heads-up display is shown. As with other embodiments discussed herein, the module 400 can incorporate onboard electronics that are configured to drive a visual display 402 that can be coupled to the module 400. The module 400 can include memory and/or a transceiver configured to send and receive data signals that can be used to provide a visual output through the visual display 402. As discussed above, the module 400 can be removably connected to eyewear, such as to an ear stem 404 of an eyeglass 406, as shown.

Further, the visual display 402 can be interconnected with the module 400 with an articulating arm 410. The articulating arm 410 can comprise any of the structures or capabilities such as those discussed in U.S. Pat. No. 7,740,353, the entirety of which is incorporated herein by reference. As illustrated, the visual display 402 can provide or define a viewing surface or plane 412 at which an image can be displayed and spaced from the wearer's eye. The embodiment shown in FIG. 44 illustrates that the viewing device 412 can be positioned anteriorly relative to a lens of the eyewear. In some embodiments, the viewing device 412 can be adjustable such that it can be spaced at least about 2 inches and/or less than or equal to about 7 inches from the wearer's eye. Further, the viewing device 412 can be spaced at least about 3 inches and/or less than or equal to about 5 inches from the wearer's eye. Further, the viewing device can be adjustable within a radius of at least about 1 inch and/or less than or equal to about 4 inches from the wearer's straight ahead line of sight 418.

Figure 45:
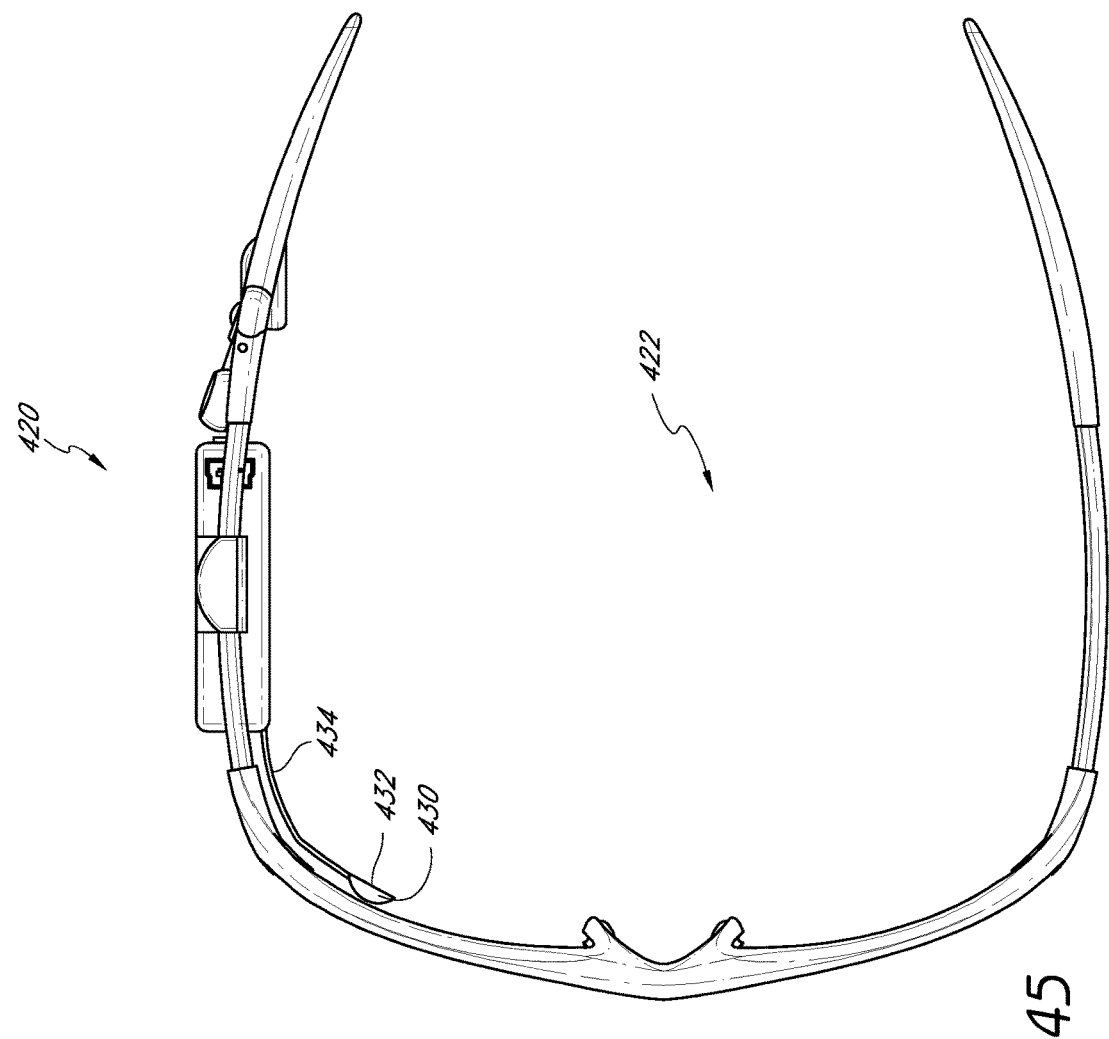
FIG. 45 is a top view of a support assembly having a heads-up display component, according to another embodiment.

FIG. 45 illustrates another embodiment of a module 420 that is capable of providing a heads-up display for an eyeglass 422. Similar to the module 400 discussed above in FIG. 44, the module 420 can provide a visual display 430 having or defining a viewing device 432 that can be interconnected with the module 420 by an articulating arm 434. This embodiment illustrates that the viewing device 432 can be positioned posteriorly relative to a lens of the eyewear. As with the embodiment shown in FIG. 44, the viewing device 432 can also be adjusted within a desirable range per wearer specification.

In addition, the viewing devices 412, 432 can be configured as a display surface or as a beam projector for retinal projection. As noted above, the viewing devices 412, 432 can be adjusted relative to the eyewear in order to allow a viewing plane to be provided in front of or behind a lens of the eyewear. Further, the viewing devices 412, 432 can define a real or virtual viewing plane.

In addition, the articulating arms 410, 434, the visual displays 402, 430, and/or components thereof can be configured to provide movement along and/or rotation about all three dimensional axes. For example, the visual displays 402, 430 can be configured to tilt (rotation about the x-axis), roll (rotation about the z-axis), or pivot (rotation about the y-axis), as well as to move in the direction of any of the x, y, or z axes. This movement can be accomplished through the use of, for example, ball and socket joints, pivot joints, bendable, moldable, or pliant materials, telescoping components, and the like. Further, the articulating arms 410, 434, the visual displays 402, 430, and/or components thereof can be configured to be constrained from movement along and/or rotation about one or more of the three dimensional axes. In some embodiments, one or more degrees of movement can be restrained while permitting movement in another degree(s) of movement.

Figure 46:
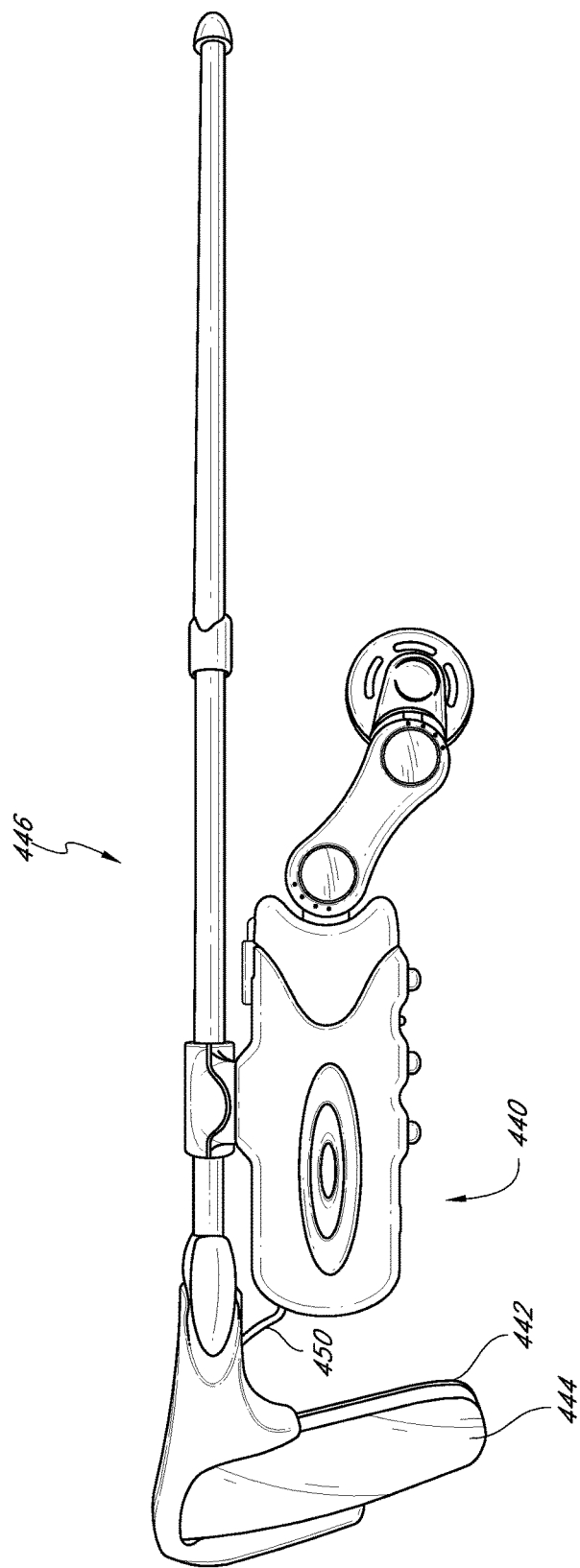
FIG. 46 is a side view of a support assembly having a heads-up display component, according to yet another embodiment.

FIG. 46 illustrates an embodiment of a module 440 that can be configured to drive an optical device 442 that is positioned on, embedded within, or provided as a lens 444 of eyewear, such as an eyeglass 446. This embodiment illustrates that a viewing surface or plane can be positioned along a surface of the lens of the eyewear.

The optical device 442 can comprise one or more visual display units. The visual display unit can comprise a thin display device, such as an OLED display or otherwise, which can provide a real or virtual image for the wearer. The optical device 442 can also incorporate light attenuation technology, such as electronic variable light attenuation. In some embodiments, the optical device 442 can be fitted onto a front or rear surface of the lens 444 to provide a permanent or removable engagement with the lens 444. The optical device 442 can be interconnected with the module 440 by a conduit 450. The conduit 450, as with other conduits used for articulating arms of embodiments discussed above, can comprise optical fiber(s) and/or data cable(s) and the like to drive the optical device 442. The conduit 450 can be interconnected with the eyewear using a jack for transmitting data FIG. 47 illustrates another embodiment of a module 460 in which the module is used to drive one or more display devices 462. The module 460 can be interconnected with the display device(s) 462 using a conduit 470. As with other conduits discussed herein, the conduit 470 can be interconnected with the eyewear using a jack for transmitting data.

Similar to the embodiment illustrated in FIG. 46, the display devices 462 can be positioned on, embedded within, or provided as at least a portion of a lens 464, 466 of the eyewear. In this embodiment, the display device 462 can comprise a projector operative to provide retinal projection. With regard to the placement of the display device, for example, the display device 462 can be positioned at any variety of locations on the lens 464. In some embodiments, the display device 462 can be positioned relative to the straight ahead line of sight within a range of acceptance. For example, the display device 462 can be positioned at least about 0.25 inches and/or less than or equal to about 2 inches from the point at which the wearer's straight ahead line of sight passes through the lens 464. Further, the display device 462 can be positioned along a lower half of the lens 464.

The embodiments illustrated in FIGS. 46-47 also illustrate that a removable module can be used with eyewear that is pre-fitted with visual display equipment. For example, the lens(es) of the eyewear can be provided with visual display device(s) that can provide a display for the user by utilizing electronics, memory, power, and/or data from the module.

Thus, in some embodiments, the module can be removed or mounted onto the eyewear such that the wearer can enjoy the benefit of certain audio and/or visual functions, data, and/or interactive capabilities. Embodiments can be provided in which a plurality of modules can be interchanged with eyewear in order to manipulate or change the functionality of the eyewear. For example, some modules can be preloaded to support gaming activities, such as by allowing the eyewear to access and/or play video, memory, and/or wireless connectivity with other devices. Further, some modules can be configured to receive interchangeable memory cards, such as SD cards and the like, which can allow the module to access different programs or memory, as understood by those of skill in the art.

Figure 48:
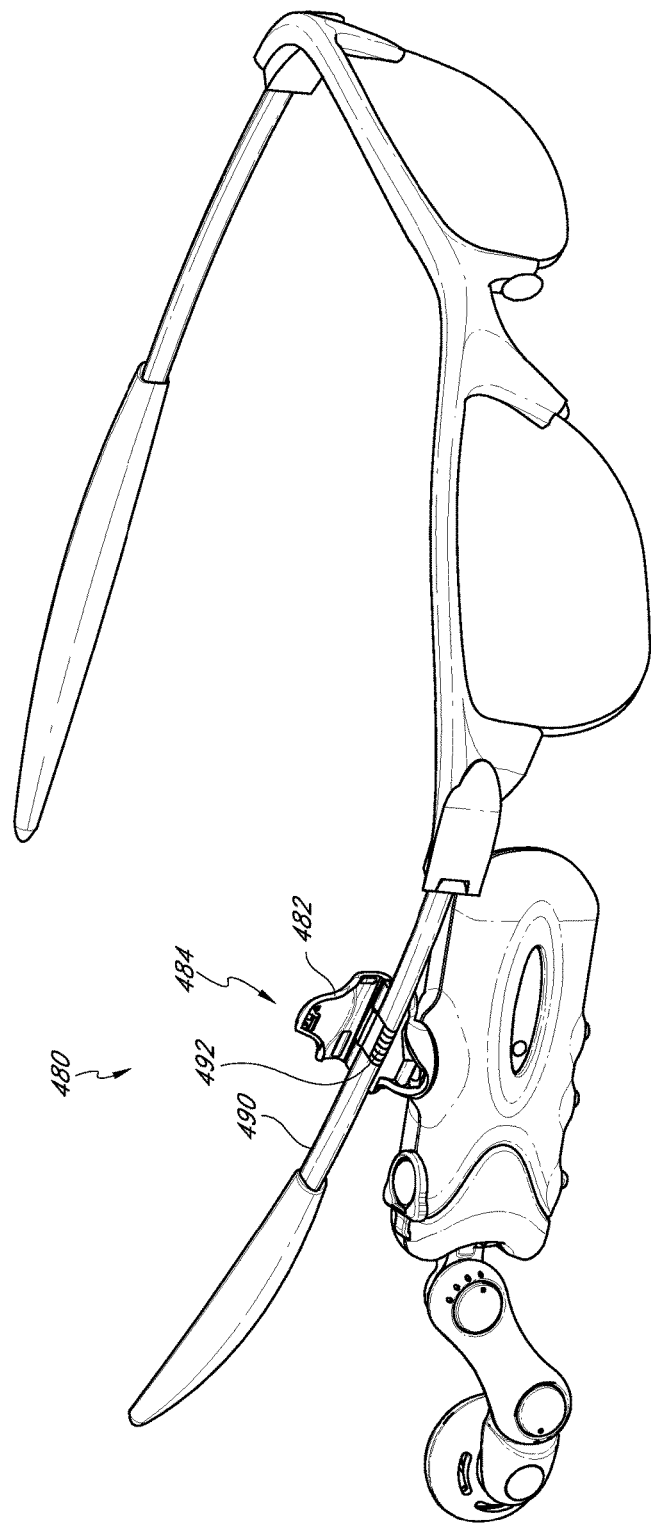
FIG. 48 is a perspective view of a support assembly that can form an electrical interface with eyewear, according to an embodiment.

FIG. 48 illustrates another embodiment of a module 480 in which the module comprises an electronic interconnection device 482. In this embodiment, a clip 484 of the module 480 can be used to not only mount the module 480 onto the eyewear, but can also electronically couple the module 480 with the eyewear. For example, and the ear stem 490 of the eyewear can comprise one or more connection points 492 which extend partially or across the entire length of the ear stem. The electronic interconnection device 482 can be electronically coupled with the connection point 492 when the clip 484 is moved to a closed position in which the module 480 is mounted onto the ear stem 490. Such an embodiment can minimize the presence of conduit or wiring visible on the eyewear. Further, conduit or wiring can be provided that extends intermediate the connection point 492 and one or more display devices of the lens(es).

Some embodiments of the module disclosed herein can also provide image stabilization. The module can comprise an accelerometer device configured to detect movement of the eyeglass. In response to an output of the accelerometer, the module can correspondingly adjust the placement or location of an image or visual produced for the wearer. In general, bouncing or shaking of eyewear is not detected wearers when used in vigorous activities because the lens(es) is transparent and movement of the lens relative to the eye is generally imperceptible. However, wearers using an embodiment of the module providing a visual display could see a shaky display during in a vigorous activity. Thus, some embodiments disclosed herein enable the module to account for shaking or vibration of the eyeglass to ensure that the image or visual display is generally stabilized relative to the straight ahead line of sight of the wearer. Thus, the wearer may detect very little movement of the image or visual display even though the eyeglass is shaking or vibrating during use. Further, the image stabilization can be utilized for displaying or recording an image using the display device(s) or image recording device(s). Various methods and apparatus is have been disclosed for providing optical and/or mechanical image stabilization, such as U.S. Publication Nos. 2011/0013283, 2010/0118402, 2009/0213236, 2009/0128700, 2009/0040361, 2008/0246694, and U.S. Pat. Nos. 7,893,965, and 7,856,173, the entireties of each of which are incorporated herein by reference.

In some embodiments, the module can comprise one or more hardware and/or software components for managing which of a plurality of data sources is connected to the wearable device. In some embodiments, one or more audio-visual data sources can provide audio input through a speaker, and video input through either opaque or see through heads-up display technology which can be incorporated into eyeglasses, helmets or other headwear.

A variety of other data sources are known, which require some form of audio or video input to a user, such as display screens on personal digital assistants, Blackberry® type communication devices, and others.

Each of the foregoing devices require an interface for providing audio or visual data to the user, and, where relevant, for receiving audio information from the user for inputting into the device. At the present time, the use of multiple data sources requires the user to switch between any of a variety of user interfaces, in accordance with the particular device sought to be used at a particular time.

There remains a need for better management of input signals from multiple data sources, which will allow the user to more conveniently select input from any of a variety of sources.

In accordance with a further aspect of some embodiments, there is provided a wearable electronically enabled interface system, for providing audio and or video input to the wearer from at least two sources. The system comprises a wearable support, for carrying at least a portion of the interface. At least one data port is carried by the support, for receiving data from at least a first and optionally a second source. A selector is provided, enabling the wearer to direct data from a desired one of the first and second sources to the interface.

The wearable support may comprise an eyeglass frame, a goggle frame, a helmet, or other user-wearable support structure. The data port may comprise a radiofrequency receiver or transceiver. The interface may comprise at least one speaker, and, in certain implementations, the interface comprises two speakers. The interface may additionally comprise at least one microphone. The interface may further comprise a video display. The selector may comprise a wearer activated control such as a button, switch or voice activated electronic control.

Figure 49:
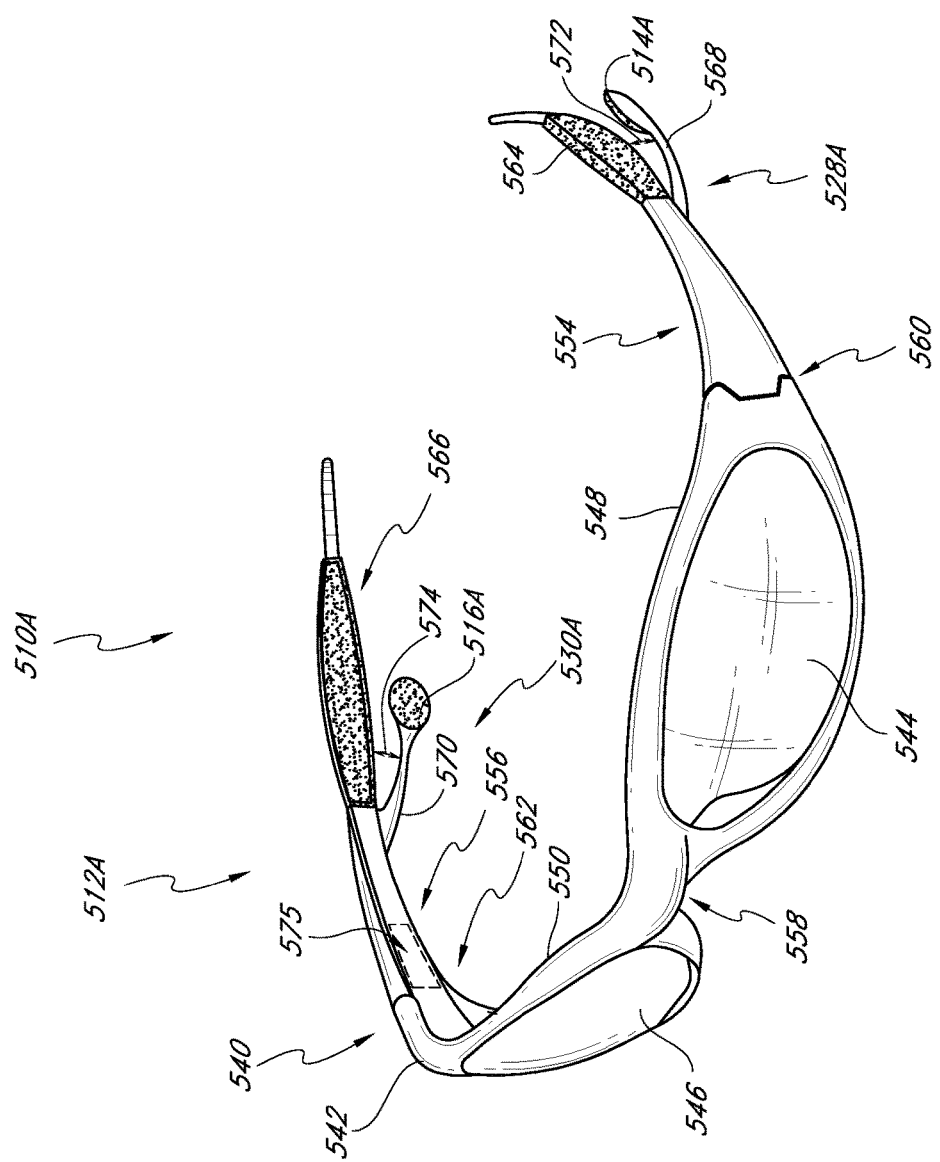
FIG. 49 is a front, left side, and top perspective view of a modification of a wearable audio device, according to an embodiment.

A modification of an audio device 510 is illustrated in FIG. 49, and referred to generally by the reference numeral 510A. Components of the audio device 510A that are the same as the audio device 10 discussed in U.S. Application Publication No. 2006/0132382 (the entirety of which is incorporated herein by reference) have been given the same reference numeral, except that a letter "A" has been added thereto.

In the illustrated embodiment of the audio device 510A, the support 512A is in the form of an eyeglass 540. The eyeglass 540 comprises a frame 542 which supports left and right lenses 544, 546. Although the present audio device 510A will be described with reference to a dual lens eyeglass, it is to be understood that the methods and principles discussed herein are readily applicable to the production of frames for unitary lens eyeglass systems and protective goggle systems as well. Further, the lenses 544, 546 can be completely omitted. Optionally, at least one of the lenses 544, 546 can be in the form of a view finder or a video display unit configured to be viewable by a wearer of the support 512A.

An internal cavity 575, in the illustrated embodiment, is configured to receive electronics such as a printed circuit board 576. In the illustrated embodiment, the printed circuit board 576 includes one switch for each of the buttons 573c, 573d, and 573e. Additionally, the printed circuit board 576 can include an audio and/or video file storage and playback device 577.

Figure 50:
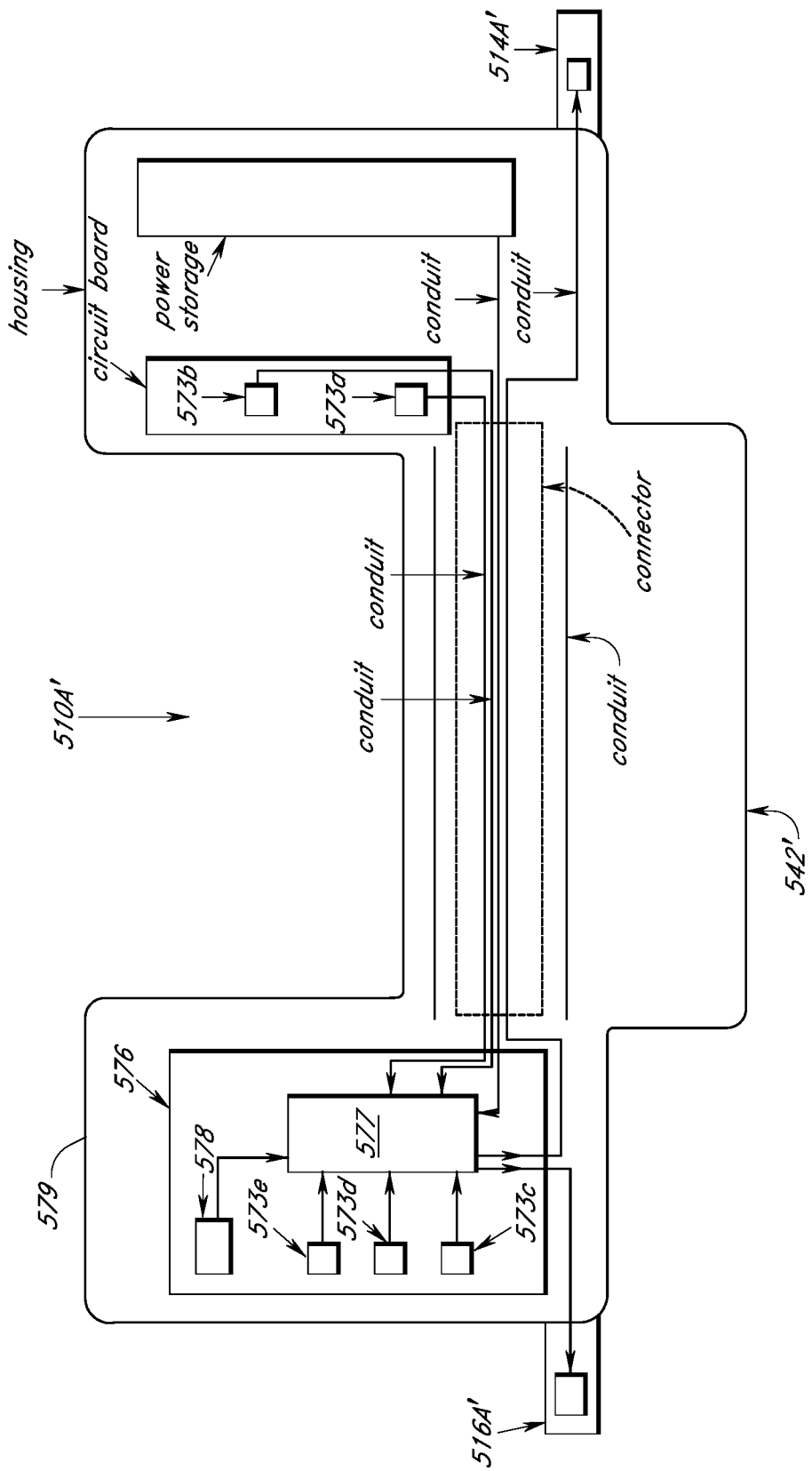
FIG. 50 is a schematic illustration of an audio device, according to an embodiment.

The device 577 [as shown in FIG. 50] can be configured to store and playback any desired type of electronic audio and/or video file. In the illustrated embodiment, the device 577 includes a memory, an amplifier, and a processor. The memory, amplifier, and the processor are configured to operate together to function as an audio storage and playback system. For example, the audio storage and playback system can be configured to store MP3 files in a memory and to play back the MP3 files through the speakers 514A', 516A'. Suitable electronics for enabling and amplifying MP3 storage and playback are well known in the art, and may be commercially available from Sigmatel, Inc. or Atmel, Inc. Thus, further description of the hardware and software for operating the device 286 as a storage and playback device is not necessary for one of ordinary skill in the art to make and use the inventions disclosed herein.

Advantageously, the printed circuit board 576 also includes or is in electrical communication with a data transfer port 578. In the illustrated embodiment, a housing 579 includes an aperture (not shown) disposed in a position similar to the position of the aperture 272 on the housing 250 (as discussed in U.S. Application Publication No. 2006/0132382, the entirety of which is incorporated herein by reference). In the housing 579, however, the aperture is aligned with the data transfer port 578. Thus, when the printed circuit board 576 is received in the internal cavity 575, the data transfer port 578 can be aligned with the aperture.

Figure 51:
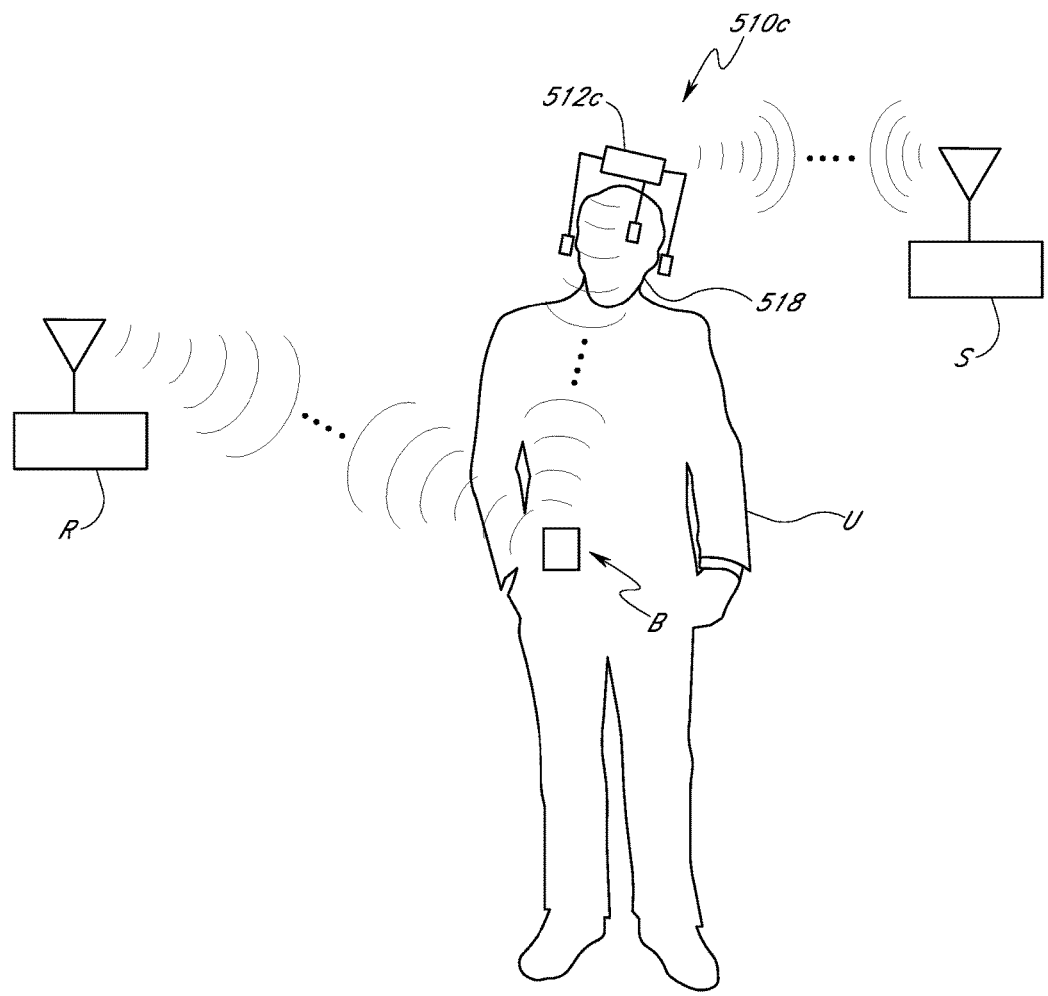
FIG. 51 is a schematic representation of a front elevational view of a further modification of an audio device worn by a wearer and interacting with source electronics, according to an embodiment.

As illustrated in FIG. 51, an audio device 510C can be worn on the head 518 of a user U. Preferably, the audio device 510C is configured to provide one or two-way wireless communication with a source device, or the source device can be incorporated into the audio device 510C. The source device can be carried by the user U, mounted to a moveable object, stationary, or part of a local area or personal area network.

The user U can carry a "body borne" source device B such as, for example, but without limitation, a cellular phone, an MP3 player, a "two-way" radio, a palmtop computer, or a laptop computer. As such, the user U can use the audio device 510C to receive and listen to audio signals from the source device B, and/or transmit audio signals to the source device B. Optionally, the audio device 510C can also be configured to transmit and receive data signals to and from the source device B, described in greater detail below.

Optionally, the device B can also be configured to communicate, via long or short range wireless networking protocols, with a remote source R. The remote source R can be, for example, but without limitation, a cellular phone service provider, a satellite radio provider, or a wireless internet service provider. For example, but without limitation, the source device B can be configured to communicate with other wireless data networks such as via, for example, but without limitation, long-range packet-switched network protocols including PCS, GSM, and GPRS. As such, the audio device 510C can be used as an audio interface for the source device B. For example, but without limitation, where the source device B is a cellular phone, the user U can listen to the audio output of the cellular phone, such as the voice of a caller, through sound transducers in the audio device 510C. Optionally, the user U can send voice signals or commands to the cellular phone by speaking into a microphone on the audio device 510C, described in greater detail below. Thus, the audio device 510C may advantageously be a receiver and/or a transmitter for telecommunications.

In general, the component configuration of FIG. 51 enables the audio device 510C to carry interface electronics with the user, such as audio output and audio input. However, the source electronics such as the MP3 player, cellular phone, computer or the like may be off board, or located remotely from the audio device 510C. This enables the audio device 510C to accomplish complex electronic functions, while retaining a sleek, low weight configuration. Thus, the audio device 510C is in communication with the off board source electronics device B. The off board source device B may be located anywhere within the working range of the audio device 510C. In many applications, the source electronics B will be carried by the wearer, such as on a belt clip, pocket, purse, backpack, shoe, integrated with "smart" clothing, or the like. This accomplishes the function of off loading the bulk and weight of the source electronics from the headset.

The source electronics B may also be located within a short range of the wearer, such as within the room or same building. For example, personnel in an office building or factory may remain in contact with each, and with the cellular telephone system, internet or the like by positioning transmitter/receiver antenna for the off board electronics B throughout the hallways or rooms of the building. In shorter range, or personal applications, the out board electronics B may be the form of a desktop unit, or other device adapted for positioning within relatively short (e.g. no greater than about 10 feet, no greater than about 20 feet, no greater than about 50 feet, no greater than 100 feet) of the user during the normal use activities.

In all of the foregoing constructions of the invention, the off board electronics B may communicate remotely with the remote source R. Source R may be the cellular telephone network, or other remote source. In this manner, the driver electronics may be off loaded from the headset, to reduce bulk, weight and power consumption characteristics. The headset may nonetheless communicate with a remote source R, by relaying the signal through the off board electronics B with or without modification.

Optionally, the audio device 510C can be configured to provide one or two-way communication with a stationary source device S. The stationary source device can be, for example, but without limitation, a cellular phone mounted in an automobile, a computer, or a local area network.

Figure 52:
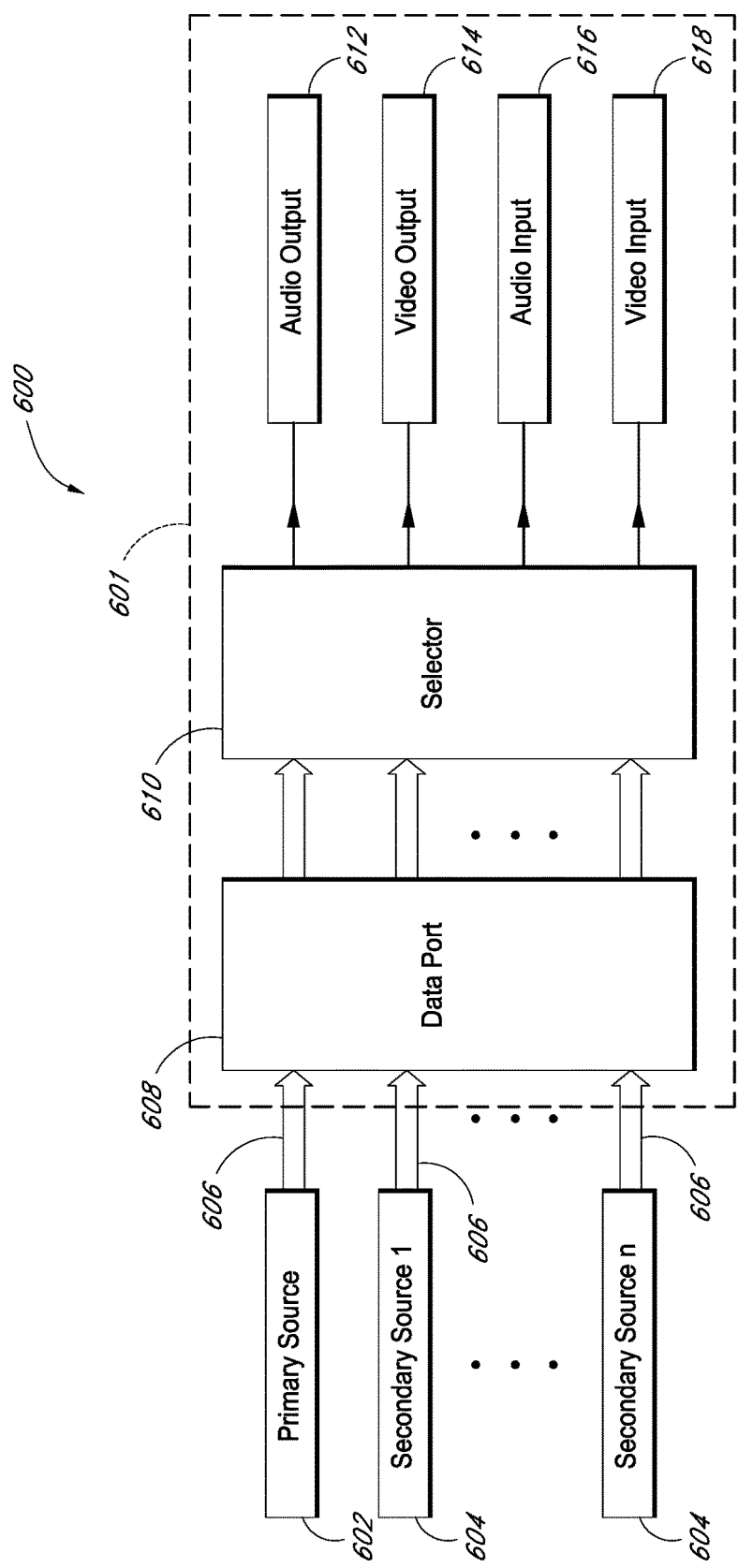
FIG. 52 is a schematic illustration of an input data management system, according to an embodiment.

One embodiment of an input data management system 600 in accordance with the present inventions is schematically illustrated in FIG. 52. The data management system 600 includes a wearable electronic interface 601 for providing data from one or more selected data sources to the wearer. The interface 601 is in communication with a primary data source 602 and optionally at least one secondary source 604. Communication between the primary source 602 and any secondary source 604 and the interface 601 is accomplished via at least one communication link 606. In one embodiment, the wearable electronic interface 601 is in communication with one, two, three, or n secondary sources 604.

In general, the data input management system is configured to allow a user to select one or more data sources, to be placed either simultaneously or one at a time into electrical communication with a single user interface. This allows the wearer to obtain the benefits of multiple input sources, without the need to replace or make any changes to the interface. As will be discussed in greater detail below, the user may select only a single data source for connection to the interface. Alternatively, the user may select one source as a primary input source and a second source as the secondary input source. The interface may toggle between the input sources, to provide input to the user either automatically, or in response to demand by the user or other electronic prioritization system.

The primary source 602 and secondary source 604 may be any source, conduit, or provider of audio, video or audio/video information selected by the wearer or by the manufacturer. The examples identified below will therefore be designated generically as source electronics. For example, the source electronics may include a computing device, such as a computer, a server, a network, drive, RAM, ROM or other non-removable or removable memory chip.

The source electronics may alternatively comprise a digital audio player, such as an mp3 player, an IPOD®, or a multimedia player such as a portable DVD player where the audio track is to be routed to the support.

Any of a variety of current electronic devices can be converted into wireless source electronics for use in the present system. For example, a device such as a portable DVD player is conventionally provided with internal speakers and a headphone jack for enabling wired connection to an external headphone. The portable DVD player can be converted for use as a source in the system of the present inventions by providing a Bluetooth or other radio frequency transmitter and power supply in a small housing, provided with an externally projecting plug of a size corresponding to the earphone jack. The converter can be plugged into the external earphone or external speaker jack of any conventional source of electrical signal, and convert the source into a Bluetooth or other RF enabled signal source for use with the interface with the present invention.

The source electronics may be a microphone or a radio, such as a terrestrial-based or satellite-based radio, including XM® or SIRIUS® brand satellite radios. In other embodiments, the source electronics may be a telephone, a cellular telephone, a personal digital assistant (PDA), a BLACK-BERRY®, or a pager. A variety of currently available devices, for example, a BLACKBERRY®, pager, any of a variety of PDA's and email enabled devices such as notebook computers provide incoming text messages. In one aspect of the present inventions any of these text message devices is provided with text to voice software, enabling the text to be read out loud. This enables the user to listen to a primary source such as music, or the sound track from a portable DVD player, and incoming e-mails will be read out loud to the wearer, while the primary source is either placed on pause, or remains running in the background. Text to voice software can either be carried by the support, or carried by the underlying source such as the BLACK-BERRY® or other PDA.

The source electronics may be external to the wearable electronic interface 601, as illustrated in FIG. 52, in which case the communication link 606 may either be a direct electrical coupling (for example hard wiring, or inductive coupling through the body), or wireless.

Wireless source electronics may be infrared enabled or radiofrequency-communication enabled, such as BLUETOOTH enabled. For example, in one embodiment, the source includes a BLUETOOTH enabled cellular telephone, although any of the source electronics described herein may be radiofrequency-communication enabled.

The source electronics may alternatively be carried by or internal to (carried in a cavity or alternatively embedded within) the wearable electronic interface 601. For example the primary source 602 may include a digital audio player, such as an mp3 player or other memory device, which is attached to or located within the frame of a pair of eyeglasses. Electronically-enabled eyewear as a wearable electronic interface 601 is described in greater detail herein. The secondary source may be a cell phone, GPS device or other external device which is in radio communication as needed, with the interface. The primary and secondary sources can both be completely contained on the wearable interface, such as built into or carried by a pair of eyewear.

The source electronics may provide substantially discrete packets of information, or may provide a substantially continuous stream of information to the wearable electronic interface 601. Information packet sizes may be varied depending upon the communication link 606 used to transfer information from the source to the wearable electronic interface 601.

In further embodiments, the source electronics may include a video source, or an audio/video source. For example, in one embodiment, the source includes a camera for real time viewing of a remote location or viewing direction, or a video playback device such as a DVD or VCR or solid state video storage device. The source electronics may alternatively be a tuner, a television receiver, or any other device capable of providing a signal indicative of still or moving images. In one embodiment, the primary source 602 provides a photograph, a video clip, an email, a videomail or a voicemail message in accordance with any of the embodiments described herein.

Any of the source electronics identified above can be selected as the primary source 602 or secondary source 604. The secondary source 604 communicates with the wearable electronic interface 601 via a communication link 606 as well. Secondary source 604 and primary source 602 may also include any content source 302 described in greater detail below with respect to FIG. 54.

The communication link 606 is any device, technology or information conduit for providing communication between two or more electronic components. For example, in one embodiment, the communication link 606 includes a physical connection, such as a wire, cable, fiberoptic cable, or trace on a PC board. Such communication links 606 include USB, serial, RS-232, IEEE-1394, and FIREWIRE cables.

In another embodiment, the communication link 606 includes a wireless coupling, such as radiofrequency (RF), infrared (IR), acoustic, or optical coupling. Such communication links 606 include BLUETOOTH and other wireless communications protocols and their associated hardware, as is well known to those of skill in the art. Communication link 606 includes any communications link 306 described in greater detail below with reference to FIG. 54.

Referring again to FIG. 52, in one embodiment, the system 600 comprises a wearable electronic interface 601. In one embodiment, the wearable electronic interface 601 is any electronic device that may be worn by a wearer, and that provides an interface between an information source, such as primary source 602 and secondary source 604, and the wearer.

In one embodiment, the wearable electronic interface 601 is electronically enabled eyewear including audio, video or audio-video interface capabilities such as described in greater detail elsewhere herein. However, wearable electronic interface 601 may be any wearable device, and may be in the form of any wearable support structure, including a wristwatch, armband, jewelry, headwear and clothing. Examples of such wearable electronic interface 601 clothing include headphones, ear phones, a hat, helmet, goggles, mask, visor, headband, hair band, shirt, scarf, sweater, jacket, belt, pants, vest, etc.

The wearable electronic interface 601 generally includes a data port 608, a selector 610, and an audio output 612. In addition, in some embodiments, the wearable electronic interface 601 further includes a video output 614, an audio input 616, and/or a video input 618.

The data port 608 is any device capable of receiving information from a primary source 602 (or secondary source 604) via its associated communication link 606. For example, in one embodiment, the data port 608 is a physical connector such as a mini-USB connector depending upon the nature of the communication link 606. In such embodiment, the primary source 602 or secondary source 604 might be coupled to the wearable electronic interface 601 via a USB cable having a mating mini-USB connector on at least one of its ends. In another embodiment, the data port 608 includes a wireless transceiver for providing wireless communication between the primary source 602 (or secondary source 604) and the wearable electronic interface 601. For example, in one embodiment, the data port 608 includes a BLUETOOTH receiver or transceiver. The data port 608 includes any data port 308 described in greater detail below with respect to FIG. 22.

In one embodiment, the data port 608 is able to communicate with multiple source devices 602, 604, either simultaneously, sequentially or serially. For example, in one embodiment, the data port 608 is a BLUETOOTH transceiver that is configured to communicate with more than one BLUETOOTH enabled source device (e.g., a telephone and an mp3 player).

Outputs from data port 608 are provided to a selector 610, which selects the source to be provided to the wearer of the wearable electronic interface 601 at any particular time. The selector 610 may be any of a variety of switching devices suitable for switching between multiple electronic input sources.

The selector 610 may include a mechanical, electrical, or an electro-mechanical switch. For example, in one embodiment, the selector 610 includes a manually operable control such as a toggle switch, a rocker switch, a jumper, a dial, a button, a knob, or a combination thereof. In another embodiment, the selector 610 includes an electronically operable control such as a transistor, a bank of transistors, a relay, a circuit, logic, a RAM, a ROM, a PLD, an EPROM, an EEPROM, a microprocessor, a microcontroller, a multiplexor, a demultiplexer, or a combination thereof. In addition, the selector 610 may be a voice-activated switch, or a voice-activated control that controls selection between primary and secondary sources 602, 604 based upon verbal commands provided by the wearer.

The selector 610 may also be coupled to an audio output 612, a video output 614, an audio input 616, and a video input 618 depending upon the desired functionality of the system. The audio output 612 includes any device suitable for providing an audio signal to the wearer of the wearable electronic interface 601. For example, the audio output 612 may include a speaker, including a bone conduction speaker, a buzzer, a beeper, an alarm, or any other device that produces an audible signal.

The selector 610 may be located on the wearable electronic interface 601, or may be remote from it. For example, in one embodiment, the wearable electronic interface 601 includes a pair of electronically enabled eyeglasses, and the selector 610 comprises a manually activated control such as a button or touch pad located on an earstem, an orbital or the bridge, or on a remote associated component such as the cell phone or a wristwatch. Any other wearable electronic interface 601 or selector 610 location may be utilized.

The video output 614 includes any device suitable for providing a video signal to the wearer of the selector 610. For example, in one embodiment, the video output 614 includes a light, a lamp, an LED, or any of a variety of image displays such as a screen, a display, a monitor, a head-mounted display, or any other device that produces a visible signal or image.

The audio input 616 of the wearable electronic interface 601 includes any device suitable for converting an audible signal into an electronic signal that can be processed or carried by the wearable electronic interface 601. For example, in one embodiment, the audio input 616 includes a microphone, including a bone conduction microphone.

The video input 618 of the wearable electronic interface 601 includes any device suitable for converting an image, or visual information into an electronic signal that can be processed or carried by the wearable electronic interface 601. For example, in one embodiment, the video input 618 includes a camera, a still camera, or a video camera. See generally U.S. Pat. No. 6,349,001 to Spitzer, entitled Eyeglass Interface System, the disclosure of which is incorporated in its entirety herein by reference.

In one embodiment, during operation, the wearer of the wearable electronic interface 601 manually selects which input source 602, 604 is placed in communication with the interface output. The wearer can switch input sources by activation of the selector at any time. In another embodiment, the wearable electronic interface 601 automatically selects the particular input source 602, 604 for communication based upon a prioritization schedule configured by the wearer.

In one embodiment of manual selection operation, the primary source 602 coupled to the wearable electronic interface 601 is an mp3 player, and the secondary source 604 is a BLUETOOTH enabled cellular telephone. In this embodiment, the wearer listens to mp3 audio provided by the primary source 602 through audio output 612 (e.g., speakers) coupled to the wearable electronic interface 601. Various embodiments of such wearable electronic interfaces 601 containing or carrying mp3 or other digital audio players are discussed in greater detail herein.

In manual selection operation, when a telephone call is received via a secondary source 604, the secondary source 604 sends a signal or an alarm to the wearer to inform the wearer that an incoming call is occurring. The signal or alarm may be an audio signal provided by the audio output 612, it may be a visual signal, such as a flashing light, provided by the video output 614, a conventional vibrator or cell phone "ring" or it may be a combination of signals. In one embodiment, the signal includes caller identification information.

If the wearer determines that he would like to answer the incoming telephone call, the wearer activates the selector 610 using any mechanism described above. For example, in one embodiment, the wearer presses a button on the selector 610 to accept the incoming call from the secondary source 604, and to simultaneously pause, stop, mute, or partially decrease the playback volume from the primary source 602.

When the selector 610 is activated, information from the secondary source 604 is provided through the associated communication link 606 and data port 608 to the selector 610. The selector 610 routes the communication from the secondary source 604 to the audio output 612 so that the wearer can hear the incoming call without having to remove or adjust the wearable electronic interface 601.

In addition, the selector 610 includes sufficient logic to know that when an incoming telephone call is being received from a source 602, 604, the audio input 616 (e.g., microphone) of the wearable electronic interface 601 will be activated to provide communication from the wearer back to the secondary source 604. Similarly, if the source electronics selected by the user carries video signals, the selector 610 additionally activates the video display carried by the eyeglasses or other support structure. If the source electronics selected by the user or automatically by the selector 610 includes only an audio signal, the microphone and video display, if present, remain dormant.

When the telephone call is terminated, the wearable electronic interface 601 may be configured to resume playback of the mp3 file, to increase the playback volume to previous levels, or to take no further action. The wearer may customize wearable electronic interface 601 operation as desired.

Figure 53A:
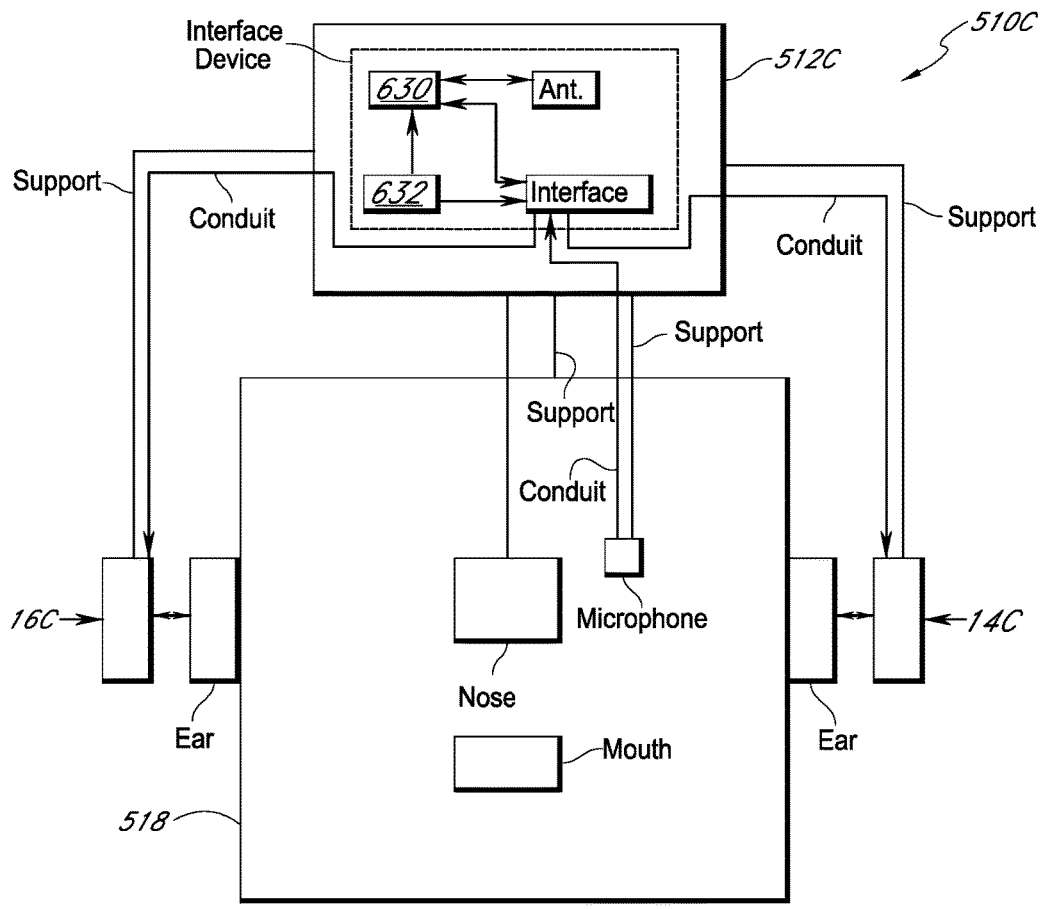
FIG. 53A is an enlarged schematic representation of a front elevational view of the audio device illustrated in FIG. 52.

With reference to FIGS. 51, 53A, and 54B, in another embodiment, the audio device 510C is advantageously adapted to support any of a variety of portable electronic circuitry or devices which have previously been difficult to incorporate into conventional headsets due to bulk, weight or other considerations. For example, but without limitation, the electronics are digital or other storage devices and retrieval circuitry such as for retrieving music or other information from MP3 format memory or other memory devices. The audio device 510C can carry any of a variety of receivers and/or transmitters, such as transceiver 630. For example, but without limitation, the audio device 510C can carry receivers and/or transmitters for music or for global positioning. In another example, the audio device 510C can carry receivers and/or transmitters for telecommunications (e.g., telecommunications devices). As used herein, the term "telecommunications devices" is intended to include telephone components as well as devices for communicating with a telephone. For example, "telecommunications devices" can include one or more transceivers for transmitting an audio signal to a cellular phone to be transmitted by the cellular phone as the speaker's voice, and/or for receiving an audio signal from a cellular phone representing a caller's voice. Of course, other audio, video, or data signals can be transmitted between the audio device 510C and such a cellular phone through such transceivers.

In other embodiments, drivers and other electronics for driving heads-up displays, such as liquid crystal displays or other miniature display technology can also be carried by the audio device 510C. The power source 632 can be carried by the audio device 510C. For example, without limitation, the power source 632 can advantageously be replaceable or rechargeable. Other electronics or mechanical components can additionally be carried by the audio device 510C. In other embodiments, the audio device 510C can also be utilized solely to support any of the foregoing or other electronics components or systems, without also supporting one or more lenses in the wearer's field of view. Thus, in any of the embodiments of the audio devices disclosed herein, the lenses and/or lens orbitals can be omitted as will be apparent to those of skill in the art in view of the disclosure herein.

Figure 53B:
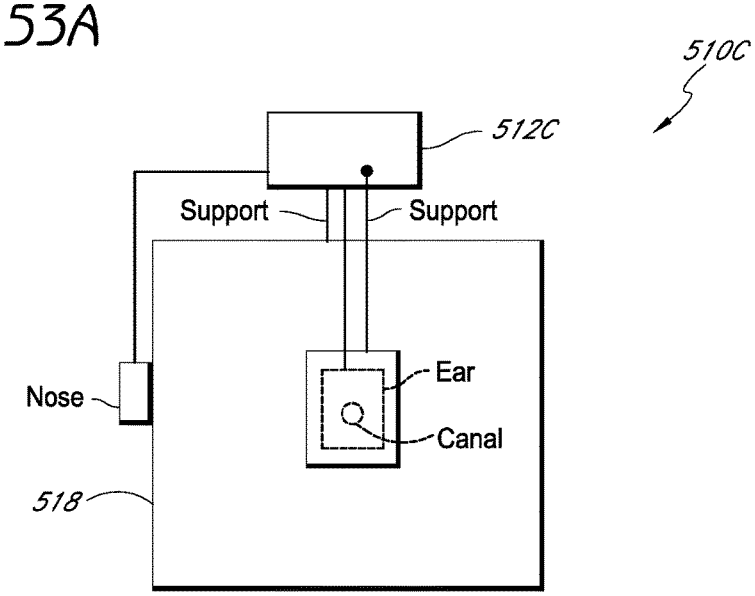
FIG. 53B is a schematic representation of a left side elevational view of the audio device illustrated in FIG. 53A.

With reference to FIGS. 51, 53A, and 53B, in another embodiment, the transceiver 630 is adapted to employ a wide variety of technologies, including wireless communication such as RF, IR, ultrasonic, laser or optical, as well as wired and other communications technologies. In one embodiment, a body-LAN radio is employed. Other embodiments can employ a flexible-circuit design. Many commercially available devices can be used as transceiver 630. For example, without limitation, Texas Instruments, National Semiconductor, Motorola manufacture and develop single RF transceiver chips, which can use, for example, 0.18 micron, 1.8 V power technologies and 2.4 GHz transmission capabilities. Of course, a variety of transceiver specifications are available and usable, depending on the particular embodiment envisioned. In another implementation, other commercially available products operating at 900 MHz to 1.9 GHz or more can be used. Data rates for information transfer to wearable or other type computing devices will vary with each possible design. In a preferred implementation, a data rate is sufficient for text display. RF products, and other products, ultimately will be capable of updating a full-color display and have additional capabilities as well. Thus, heads-up displays, such as liquid crystal displays or other miniature display technology described above can be employed.

Figure 54:
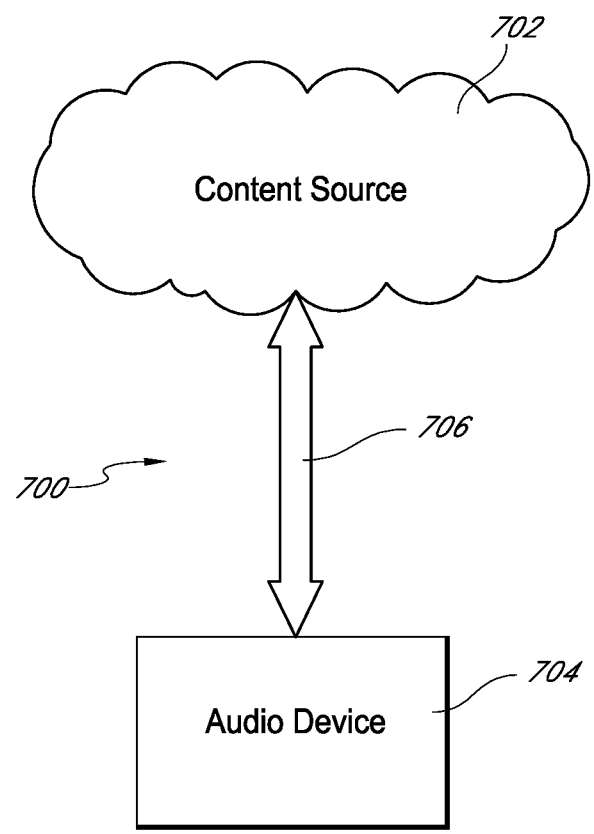
FIG. 54 is a schematic representation of an audio and/or visual network, in accordance with some embodiments.
Figure 55:
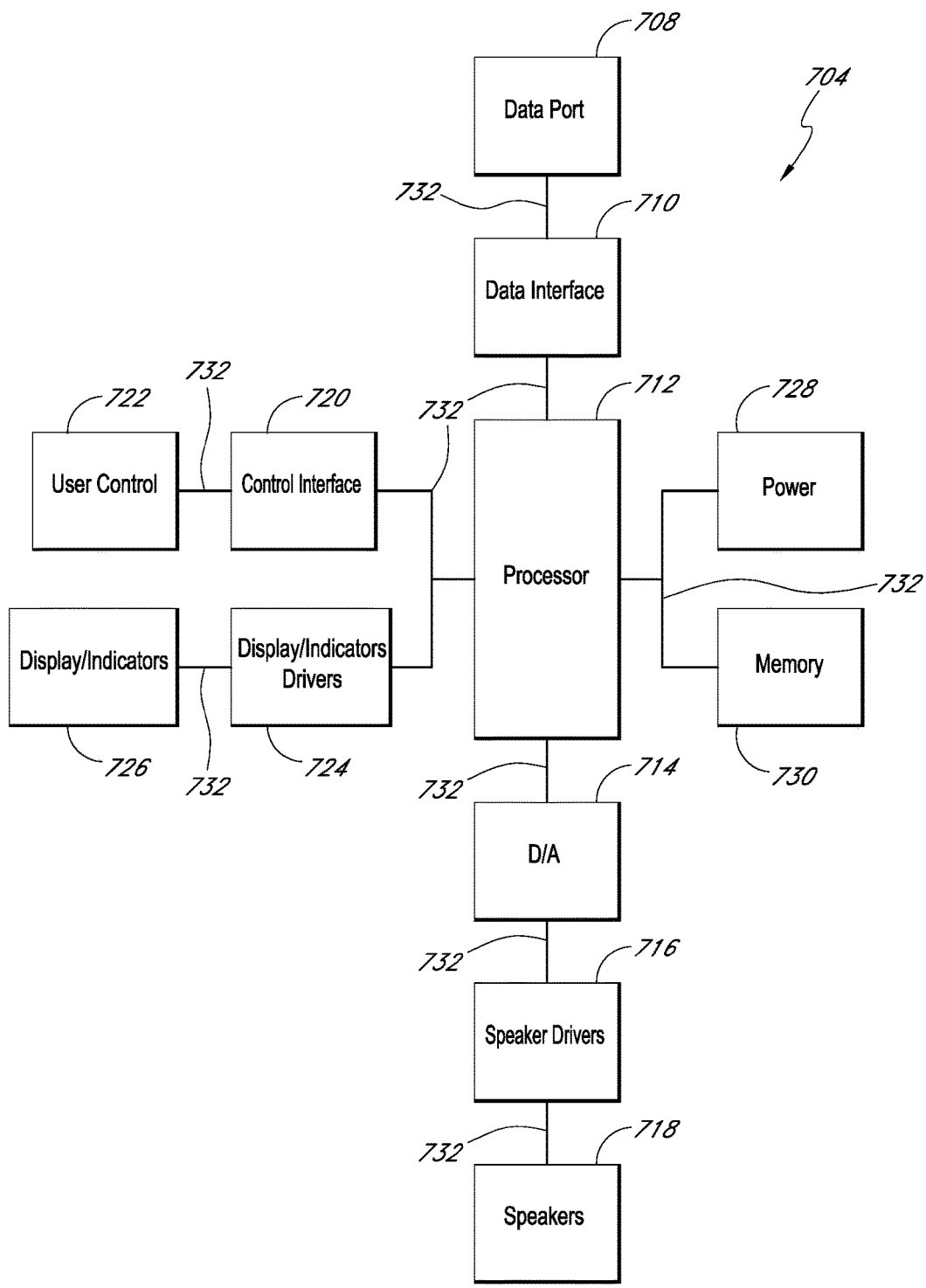
FIG. 55 is a schematic representation of an audio and/or visual device, in accordance with some embodiments of FIG. 54.

An audio network 300 in accordance with another embodiment of the present inventions is illustrated in FIG. 54. Audio network 700 includes a content source 702 coupled to an audio device 704 via communications link 706. The content source 702 is any of a variety of information sources, including, but not limited to, radio stations and/or signals, a satellite radio source, a computer, a network, a storage device, such as a hard drive, a memory card, or a USB (Universal Serial Bus) drive, an audio component (e.g., a stereo receiver, a CD player, a tuner, an MP3 player, a digital audio player, etc.), a database, and/or a communications-enabled device, such as a telephone (including a BLUETOOTH enabled telephone), a PDA, a BLACKBERRY, the Internet, or the like. The content provided by the content source 702 may be any of a variety of information, including but not limited to, audio files, entertainment, news, media, music, photos, videos, advertising, etc.

The audio device 704 may be any of the audio devices described above with respect to FIGS. 1-19 of U.S. Application Publication No. 2006/0132382, the entirety of which is incorporated herein by reference, or may include any of the audio devices described below. In one embodiment, audio device 704 is electronically enabled eyewear, as discussed herein. Audio device 704 is coupled to content source 702 via communications link 706. Communications link 706 may be any of a variety of information conduits known to those of skill in the art, including: a cable, a wire, a conductor, a bus, an RF signal, a radio signal, a satellite signal, a BLUETOOTH signal, etc. In one embodiment, the communications link 706 includes a USB, mini-USB, USB-to-mini-USB, FIREWIRE, IEEE 1394, RS232, SCSI, or any other cable. In one embodiment, the communications link 706 is temporarily attached to the audio device 704 for the transfer of content from the content source 702 to the audio device 704. In another embodiment, the communications link 706 is a retractable cable mounted at least partially inside of the audio device 704.

In one embodiment, the audio network 700 is configured for the downloading of music from the content source 702 (e.g., a user's computer) to the audio device 704. In another embodiment, the audio network 700 is configured for the uploading of content stored within the audio device 704 to the content source 702.

One embodiment of the audio device 704 is illustrated in FIG. 54. Audio device 704 generally includes a data port 708, data interface 710, processor 712, digital-to-analog converter 714, speaker drivers 716, and speakers 718. In addition, audio device 704 generally also includes a control interface 720, user controls 722, display/indicator drivers 724, display/indicators 726, power module 728, and memory module 730; however, any one or more of these components may be combined. For example, in one embodiment, data interface 710, control interface 720, display/indicator drivers 724, digital-to-analog converter 714, and speaker drivers 716 are combined with processor 712 into a single component.

The display/indicator drivers 724 are generally amplifiers or other drivers known to those of skill in the art, useful for driving or activating display/indicators 726. In one embodiment, the display/indicator drivers 724 receive signals from the processor 712 and generate drive signals to turn on or off display elements of the display/indicators 726. In one embodiment, the display/indicators 726 include an LED, LCD, light, tone, sound, beep, vibration, or other such display or indicator, or other indicators known to those of skill in the art. In one embodiment, the display/indicators 726 indicate a song selection, a power level, a volume, a remaining battery life, an artist, a song title, a time remaining during the playback of an audio file, a duration of an audio file's playback, or any other data related to an audio data file.

Although these inventions have been disclosed in the context of a certain preferred embodiments, it will be understood by those skilled in the art that the present inventions extend beyond the specifically disclosed embodiment to other alternative embodiments and/or uses of the inventions and obvious modifications and equivalents thereof. In particular, while the present support assembly, support, detachable module and methods have been described in the context of a particularly preferred embodiment, the skilled artisan will appreciate, in view of the present disclosure, that certain advantages, features and aspects of the support assembly, support, detachable module and method may be realized in a variety of other devices. Additionally, it is contemplated that various aspects and features of the inventions described can be practiced separately, combined together, or substituted for one another, and that a variety of combination and sub-combinations of the features and aspects can be made and still fall within the scope of the invention. Thus, it is intended that the scope of the present inventions herein disclosed should not be limited by the particular disclosed embodiment described above, but should be determined only by a fair reading of the claims that follow.

What is claimed is:

1. An electronically-enabled eyewear configured to provide at least audio media to a wearer, the electronically-enabled eyewear comprising:
    an eyeglass frame configured to support at least one lens, the eyeglass frame comprising a first lateral side and a second lateral side, wherein the second lateral side is laterally opposite the first lateral side;
    a first electronics module separate from and supported by the first lateral side of the eyeglass frame, the first electronics module comprising a first speaker, a first transmitter, and a first receiver; and
    a second electronics module separate from and supported by the second lateral side of the eyeglass frame, the second electronics module comprising a second speaker and a second receiver;
    wherein:
        the first electronics module is configured to receive data from a remote device via the first receiver; and
        the second electronics module is configured to receive data from the first electronics module via a wireless link, the wireless link comprising the first transmitter and the second receiver.

2. The electronically-enabled eyewear of claim 1, wherein the eyeglass frame further comprises a first earstem forming part of the first lateral side of the eyeglass frame and a second earstem forming part of the second lateral side of the eyeglass frame.

3. The electronically-enabled eyewear of claim 2, wherein the first electronics module is separate from and supported by the first earstem and the second electronics module is separate from and supported by the second earstem.

4. The electronically-enabled eyewear of claim 1, wherein:
    the first electronics module further comprises a first arm separate from and supported by the first lateral side of the eyeglass frame, the first arm being rotatable relative to the eyeglass frame; and
    the second electronics module further comprises a second arm separate from and supported by the second lateral side of the eyeglass frame, the second arm being rotatable relative to the eyeglass frame.

5. The electronically-enabled eyewear of claim 1, wherein the first electronics module further comprises a first power source and the second electronics module further comprises a second power source.

6. The electronically-enabled eyewear of claim 1, wherein the wireless link utilizes Bluetooth protocol.

7. The electronically-enabled eyewear of claim 1, wherein the first electronics module further comprises electronics configured to stream audio data from the remote device.

8. The electronically-enabled eyewear of claim 1, wherein the first electronics module further comprises an audio player having an audio storage device.

9. The electronically-enabled eyewear of claim 1, wherein the remote device is a cell phone.

10. An electronically-enabled eyewear configured to provide at least audio media to a wearer, the electronically-enabled eyewear comprising:
    an eyeglass frame configured to support at least one lens, the eyeglass frame comprising a first lateral side and a second lateral side, wherein the second lateral side is laterally opposite the first lateral side;
    a first earstem supported by the first lateral side of the eyeglass frame, the first earstem configured to support a first speaker, a first transmitter, and a first receiver; and
    a second earstem supported by the second lateral side of the eyeglass frame, the second earstem configured to support a second speaker and a second receiver;
    wherein:
        the first receiver is configured to receive data from a remote device; and
        the second receiver is configured to receive data from the first transmitter, the data comprising at least part of the audio media.

11. The electronically-enabled eyewear of claim 10, wherein the first earstem supports a first housing, the first housing comprising the first speaker, the first transmitter, and the first receiver.

12. The electronically-enabled eyewear of claim 11, wherein the second earstem supports a second housing, the second housing comprising the second speaker and the second receiver.

13. The electronically-enabled eyewear of claim 10, wherein the first earstem supports a first power source and the second earstem supports a second power source.

14. The electronically-enabled eyewear of claim 10, wherein wireless communications between the first transmitter and the second receiver utilize Bluetooth protocol.

15. The electronically-enabled eyewear of claim 10, wherein the first earstem supports electronics configured to stream audio data from the remote device.

16. The electronically-enabled eyewear of claim 10, wherein the first earstem supports an audio player having an audio storage device.

17. The electronically-enabled eyewear of claim 10, wherein the remote device is a cell phone.

* * * * *